US012600568B1

(12) United States Patent
Tran

(10) Patent No.: US 12,600,568 B1
(45) Date of Patent: Apr. 14, 2026

(54) INTEGRATED AUTONOMOUS WAREHOUSE ROBOT

(71) Applicant: Bao Tran, Saratoga, CA (US)

(72) Inventor: Bao Tran, Saratoga, CA (US)

(73) Assignee: Bao Tran, Saratoga, CA (US)

( * ) Notice: Subject to any disclaimer, the term of this patent is extended or adjusted under 35 U.S.C. 154(b) by 23 days.

(21) Appl. No.: 19/253,875

(22) Filed: Jun. 29, 2025

(51) Int. Cl.
*B65G 1/06* (2006.01)
*B25J 5/00* (2006.01)
(Continued)

(52) U.S. Cl.
CPC .............. *B65G 1/065* (2013.01); *B25J 5/007* (2013.01); *B25J 9/1664* (2013.01); *B25J 9/1697* (2013.01); *B25J 11/008* (2013.01); *B25J 19/023* (2013.01)

(58) Field of Classification Search
CPC .... B65G 1/0492; B65G 1/065; B25J 5/00–04; B25J 9/08; B25J 9/162;
(Continued)

(56) References Cited

U.S. PATENT DOCUMENTS

2014/0088804 A1* 3/2014 Hyde ...................... B60L 53/12
701/22
2014/0365258 A1* 12/2014 Vestal ............ G06Q 10/063114
901/1
(Continued)

OTHER PUBLICATIONS

Guo, et al., "UWB indoor positioning optimization algorithm based on genetic annealing and clustering analysis", Jul. 26, 2022, Frontiers in Neurorobotics 16 (Year: 2022).*

*Primary Examiner* — Spencer D Patton
(74) *Attorney, Agent, or Firm* — PatentPC

(57) ABSTRACT

An autonomous warehouse robotics system integrates a multi-sensor platform, adaptive payload handling, dynamic task reallocation, advanced navigation, energy management, and comprehensive safety features into one mobile robot chassis. The system utilizes LiDAR, stereo vision, ultrasonic sensors, mmWave radar, thermal cameras, and event cameras to perform complete environmental sensing and obstacle detection. Sensor fusion combines adaptive weighting, multi-modal data integration, and statistical filtering to create high-confidence maps for reactive path planning and collision avoidance. The robot's payload system features machine vision for item recognition, telescopic lifts, variable-width grippers, and real-time toolhead verification to handle a variety of goods. Fleet management is achieved through dynamic task reallocation that considers robot location, battery level, and operational delays, all coordinated by a cross-platform middleware architecture that ensures standardized communication, remote monitoring, and over-the-air updates among diverse robot brands. Energy management optimizes power usage via predictive routing, autonomous return-to-charge, and auction-based scheduling. Safety is maintained through proximity detection, behavior-based intervention, and human-robot cohabitation protocols while advanced localization is enhanced by fusing ultra-wideband positioning with visual landmark alignment, inertial sensing, and machine learning to deliver high accuracy in non-line-of-sight conditions. An onboard edge AI module further refines navigation and task prioritization through neural network inference, ensuring robust, adaptive operation in dynamic, unstructured warehouse environments.

21 Claims, 8 Drawing Sheets

(51) Int. Cl.
    B25J 9/16               (2006.01)
    B25J 11/00            (2006.01)
    B25J 19/02            (2006.01)

(58) Field of Classification Search
    CPC ...... B25J 9/1694; B25J 9/1697; B25J 9/1664;
                     B25J 11/008; B25J 19/023; G05D
                     1/0027; G05D 1/021–0225; G05D
                1/0231; G05D 1/0246; G05D 1/0251;
            G05D 1/0253; G05D 1/0268–0276; G05D
            1/028–0285; G05D 1/0287–0291; G05D
            1/10; G05D 1/244; G05D 1/2446–2465;
              G05D 1/247; G05D 1/249; G05D 1/46;
             G05D 1/467; G05D 1/644; G05D 1/656;
                 G05D 1/661; G05D 1/667; G05D
                              1/69–693
    See application file for complete search history.

(56) References Cited

U.S. PATENT DOCUMENTS

| | | | |
|---|---|---|---|
| 2016/0132059 A1* | 5/2016 | Mason | B65G 1/1373 |
| | | | 701/28 |
| 2020/0286384 A1* | 9/2020 | Borsos | G08G 1/164 |
| 2022/0128998 A1* | 4/2022 | Lin | G01S 17/89 |
| 2023/0098602 A1* | 3/2023 | Cella | B25J 9/1674 |
| | | | 700/248 |
| 2023/0398693 A1* | 12/2023 | Hart | B25J 9/0009 |
| 2024/0199392 A1* | 6/2024 | Hines | B66F 9/07581 |
| 2024/0279008 A1* | 8/2024 | McCalib, Jr. | B25J 9/0084 |

* cited by examiner

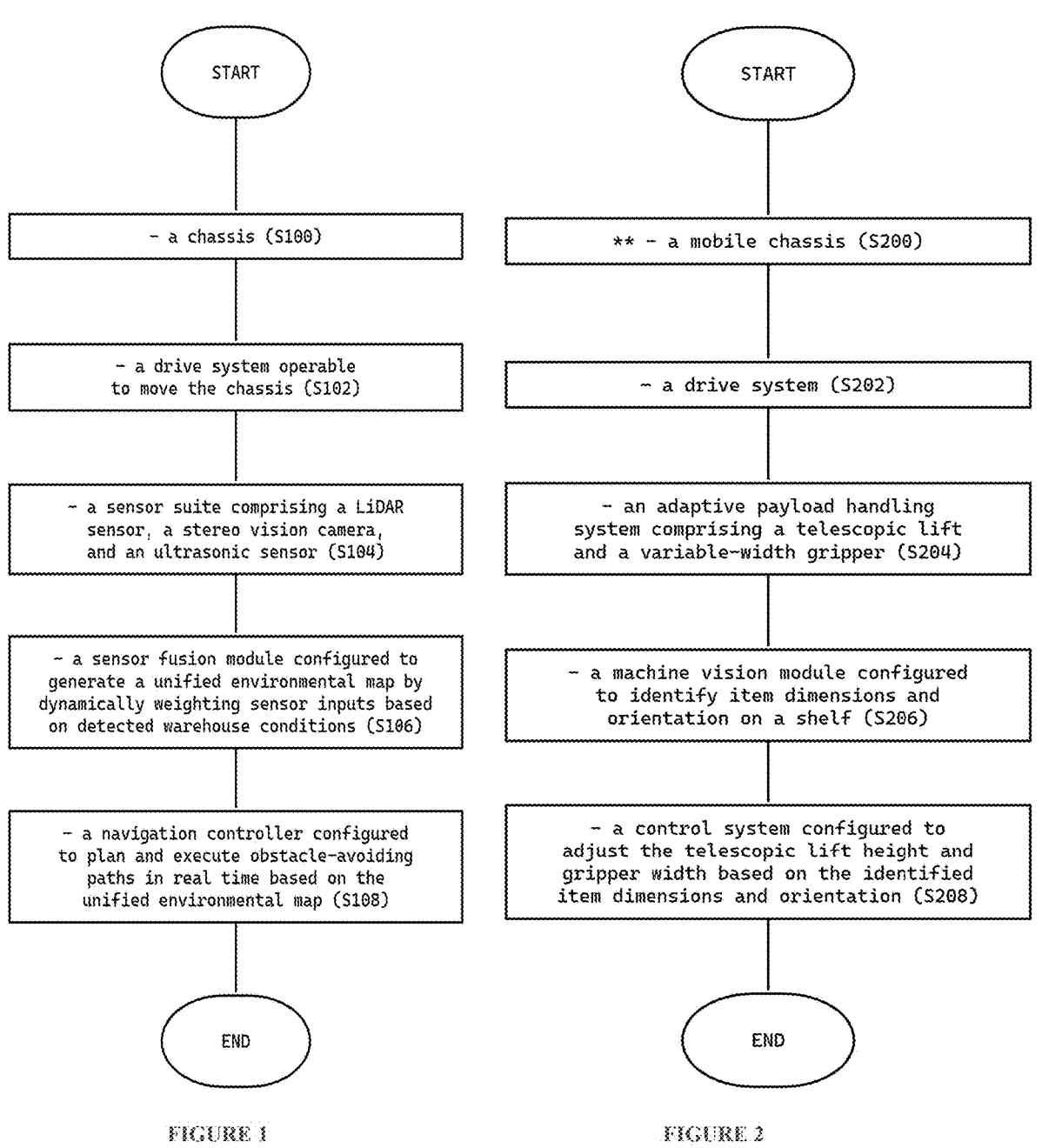
FIGURE 1                              FIGURE 2

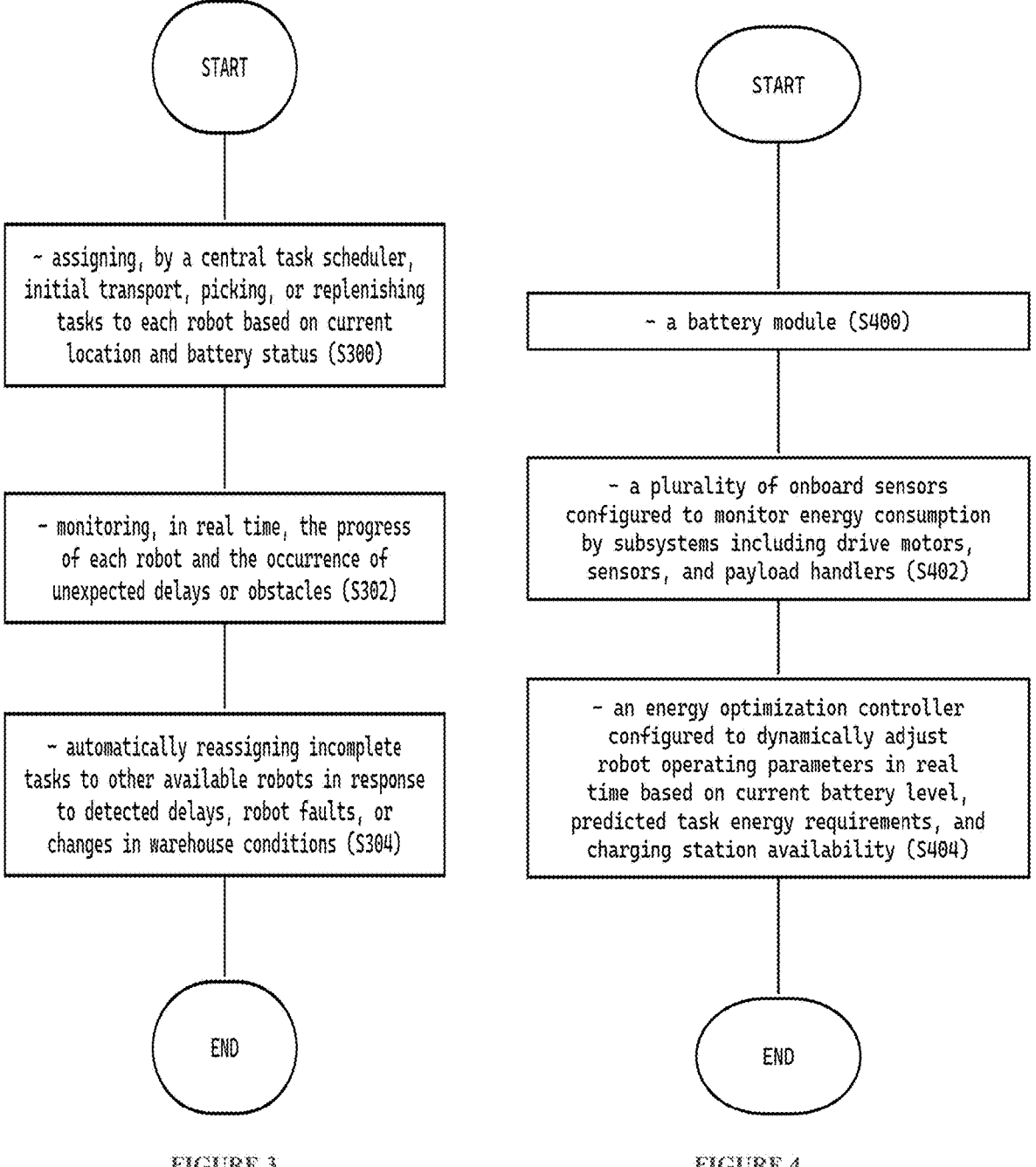

START

~ assigning, by a central task scheduler, initial transport, picking, or replenishing tasks to each robot based on current location and battery status (S300)

~ monitoring, in real time, the progress of each robot and the occurrence of unexpected delays or obstacles (S302)

~ automatically reassigning incomplete tasks to other available robots in response to detected delays, robot faults, or changes in warehouse conditions (S304)

END

FIGURE 3

START

~ a battery module (S400)

~ a plurality of onboard sensors configured to monitor energy consumption by subsystems including drive motors, sensors, and payload handlers (S402)

~ an energy optimization controller configured to dynamically adjust robot operating parameters in real time based on current battery level, predicted task energy requirements, and charging station availability (S404)

END

FIGURE 4

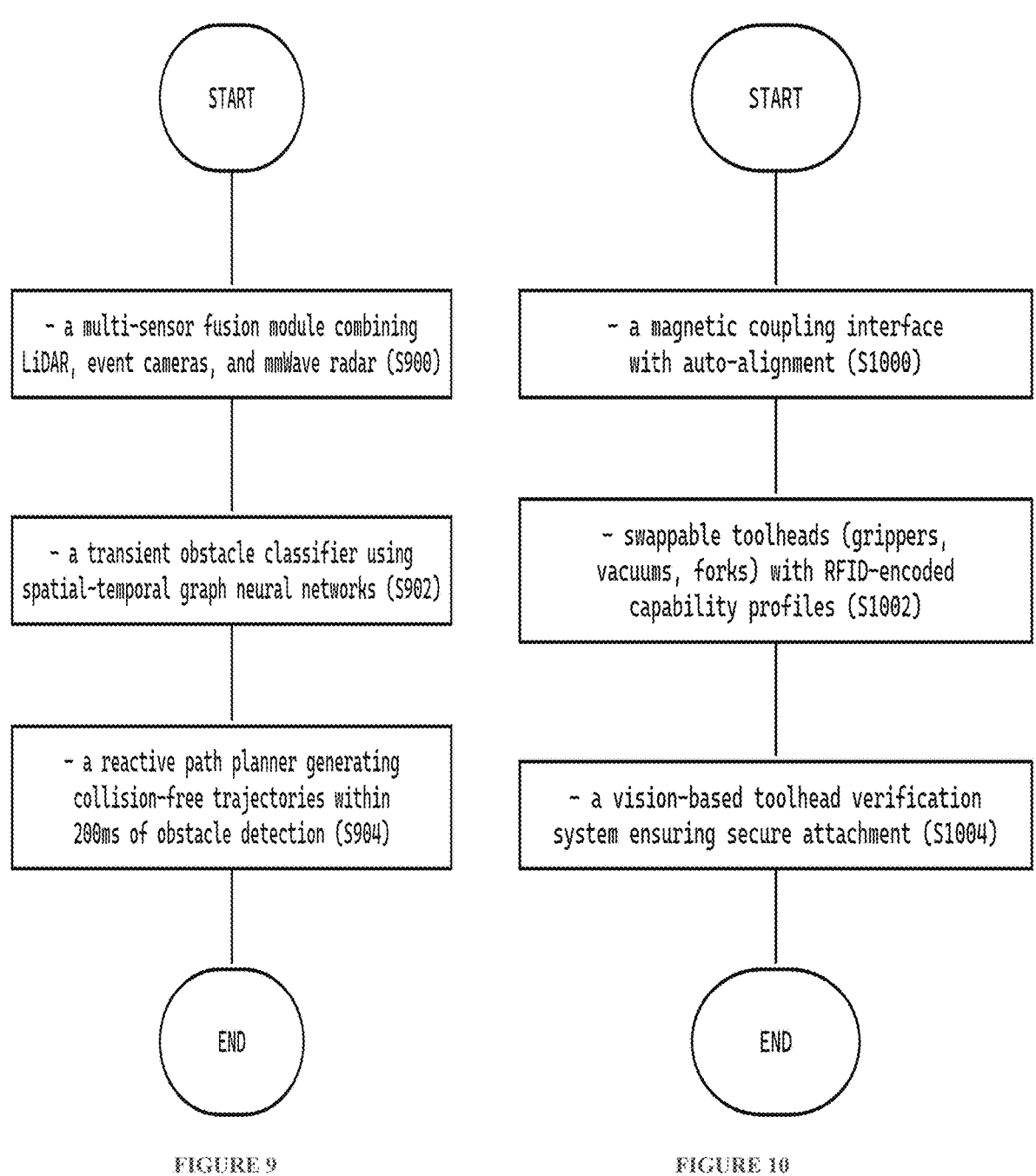
FIGURE 9                    FIGURE 10

INTEGRATED AUTONOMOUS WAREHOUSE ROBOT

BACKGROUND OF THE INVENTION

Modern warehouses have increasingly relied on automation to improve efficiency and maintain competitiveness. Over the years, traditional material handling systems have evolved from simple conveyor belts and basic robotics to advanced systems that utilize integrated sensor fusion and sophisticated control algorithms. Innovations in adaptive payload handling, energy management, and safety interoperability have played essential roles in addressing challenges related to dynamic load variations, energy consumption optimization, and safe operation in environments shared by both automated systems and human operators. As businesses demand faster and more reliable fulfillment services, there has been significant research and development in integrating these technologies to create more autonomous, flexible, and efficient warehouse robotics systems.

SUMMARY OF THE INVENTION

An autonomous mobile robot for warehouse operations is provided comprising a chassis with a drive system, a sensor suite including LIDAR, stereo vision, and ultrasonic sensors, and a sensor fusion module that dynamically weights inputs to create a unified environmental map for real-time, obstacle-avoiding navigation. In addition, a dynamic task reallocation method assigns transport, picking, and replenishment tasks from a central scheduler based on location and battery status while monitoring progress and reassigning tasks as needed when delays or faults occur. An energy management system monitors consumption from drive motors and payload handlers and uses an energy optimization controller to adjust operation based on battery levels, predicted task requirements, and charging station availability. A safety system employing multi-modal sensors such as 360-degree LIDAR, thermal imaging, personnel tags using ultra-wideband technology, and blind-spot sensors detects human presence and automatically initiates responses like speed reduction, audible warnings, or emergency stops. Further aspects include an onboard processor running neural network models for real-time decision making without continuous central communication, a positioning system that fuses ultra-wideband tag data with visual landmark extraction and digital mapping, middleware that translates proprietary protocols for centralized orchestration of heterogeneous robots, a multi-sensor navigation system with a transient obstacle classifier and reactive path planning within 200 milliseconds, and a modular payload system with a magnetic coupling interface, swappable toolheads verified by vision, and an auction-based wireless charging scheduler that minimizes fleet downtime. Other aspects can include one or more of:

1. An autonomous mobile robot for warehouse use, comprising:
   a chassis;
   a drive system operable to move the chassis;
   a sensor suite comprising a LiDAR sensor, a stereo vision camera, and an ultrasonic sensor;
   a sensor fusion module configured to generate a unified environmental map by dynamically weighting sensor inputs based on detected warehouse conditions;
   a navigation controller configured to plan and execute obstacle-avoiding paths in real time based on the unified environmental map.

2. The robot of aspect 1, wherein the sensor fusion module increases reliance on the vision camera in areas of high dust or fog detected by the LiDAR sensor.

3. The robot of aspect 1, wherein the sensor fusion module increases reliance on the ultrasonic sensor when the vision camera detects low ambient lighting.

4. The robot of aspect 1, wherein the sensor fusion module is configured to disregard outlier sensor data based on a statistical confidence threshold.

5. The robot of aspect 1, wherein the navigation controller recalculates the path within 100 milliseconds upon detection of a new obstacle.

6. The robot of aspect 1, wherein the LiDAR sensor operates at a refresh rate of at least 10 Hz.

7. The robot of aspect 1, wherein the stereo vision camera is calibrated for color-based object classification.

8. The robot of aspect 1, wherein the navigation controller assigns a higher avoidance priority to moving obstacles than to static obstacles.

9. The robot of aspect 1, wherein the sensor fusion module is configured to detect reflective floor surfaces and adjust sensor weighting accordingly.

10. The robot of aspect 1, further comprising a sensor health monitor that triggers a fallback navigation mode upon sensor failure.

11. The robot of aspect 1, wherein the unified environmental map includes a confidence score for each detected object.

12. The robot of aspect 1, wherein the navigation controller is configured to share environmental map updates with other robots over a wireless network.

13. The robot of aspect 1, wherein the robot is configured to log sensor data and fusion decisions for post-operation analysis.

14. The robot of aspect 1, wherein the sensor fusion module is implemented on a dedicated hardware accelerator.

15. The robot of aspect 1, wherein the robot is configured to alert a remote operator if the confidence score for obstacle detection falls below a predetermined threshold.

16. The robot of aspect 1, wherein the navigation controller is configured to reduce speed when the confidence score for obstacle detection is below a predetermined value.

17. The robot of aspect 1, wherein the sensor fusion module is updated via over-the-air firmware updates.

18. The robot of aspect 1, wherein the robot is configured to operate in both mapped and unmapped warehouse zones.

19. The robot of aspect 1, wherein the navigation controller is configured to select alternate routes based on historical obstacle data.

20. The robot of aspect 1, wherein the sensor fusion module is configured to suppress false positives caused by warehouse signage or reflective tape.

21. **A mobile robot for transporting mixed inventory items in a warehouse, comprising:
   a mobile chassis;
   a drive system;
   an adaptive payload handling system comprising a telescopic lift and a variable-width gripper;
   a machine vision module configured to identify item dimensions and orientation on a shelf;
   a control system configured to adjust the telescopic lift height and gripper width based on the identified item dimensions and orientation.

21. A method of dynamic task reallocation for a fleet of autonomous mobile robots in a warehouse, comprising:

assigning, by a central task scheduler, initial transport, picking, or replenishing tasks to each robot based on current location and battery status;

monitoring, in real time, the progress of each robot and the occurrence of unexpected delays or obstacles;

automatically reassigning incomplete tasks to other available robots in response to detected delays, robot faults, or changes in warehouse conditions.

22. The method of aspect 21, wherein the central task scheduler receives real-time location updates from each robot at intervals of less than one second.

23. The method of aspect 21, wherein the scheduler prioritizes reassignment to the robot closest to the incomplete task location.

24. The method of aspect 21, wherein battery status below a threshold triggers automatic task handoff before robot shutdown.

25. The method of aspect 21, wherein the scheduler uses predicted task completion times based on historical data.

26. The method of aspect 21, wherein the scheduler accounts for robot payload capacity in task reassignment.

27. The method of aspect 21, wherein the scheduler logs each task reassignment event for audit purposes.

28. The method of aspect 21, wherein the scheduler issues a notification to a human supervisor if a task remains unassigned for more than a predetermined time.

29. The method of aspect 21, wherein the scheduler integrates with a warehouse management system to update task status.

30. The method of aspect 21, wherein the scheduler is configured to avoid assigning tasks to robots operating in manual override mode.

31. The method of aspect 21, wherein the scheduler uses congestion data to avoid assigning tasks through blocked aisles.

32. The method of aspect 21, wherein the scheduler is implemented as a distributed algorithm across multiple servers.

33. The method of aspect 21, wherein the scheduler supports over-the-air updates of task allocation logic.

34. The method of aspect 21, wherein the scheduler is configured to reassign tasks in response to fire alarm or emergency signals.

35. The method of aspect 21, wherein the scheduler uses a weighted scoring system for task-robot pairing.

36. The method of aspect 21, wherein the scheduler can temporarily disable task reassignment for maintenance windows.

37. The method of aspect 21, wherein the scheduler is configured to balance workload evenly across the robot fleet.

38. The method of aspect 21, wherein the scheduler is configured to minimize total task completion time.

39. The method of aspect 21, wherein the scheduler can receive manual override instructions from a supervisor terminal.

40. The method of aspect 21, wherein the scheduler is configured to adaptively adjust reassignment frequency based on real-time warehouse activity levels.

41. An energy management system for an autonomous mobile robot operating in a warehouse, comprising:

a battery module;

a plurality of onboard sensors configured to monitor energy consumption by subsystems including drive motors, sensors, and payload handlers;

an energy optimization controller configured to dynamically adjust robot operating parameters in real time based on current battery level, predicted task energy requirements, and charging station availability.

42. The system of aspect 41, wherein the energy optimization controller reduces drive motor speed when battery level falls below a threshold.

43. The system of aspect 41, wherein the energy optimization controller disables non-essential sensors to conserve energy during low-battery operation.

44. The system of aspect 41, wherein the system predicts remaining operational time based on historical energy usage profiles.

45. The system of aspect 41, wherein the controller schedules autonomous return to a charging station before battery depletion.

46. The system of aspect 41, wherein the controller prioritizes urgent tasks when battery level is low.

47. The system of aspect 41, wherein the controller communicates battery status to a central fleet management system.

48. The system of aspect 41, wherein the controller adjusts payload handler power consumption based on load weight.

49. The system of aspect 41, wherein the controller selects energy-efficient routes to minimize travel distance.

50. The system of aspect 41, wherein the system logs energy consumption data for each completed task.

51. The system of aspect 41, wherein the controller predicts peak charging station demand and staggers robot charging times accordingly.

52. The system of aspect 41, wherein the controller triggers a low-battery alert to a remote operator.

53. The system of aspect 41, wherein the controller enters a hibernation mode if the robot is idle for a predetermined period.

54. The system of aspect 41, wherein the controller adapts energy usage strategies based on ambient temperature detected by onboard sensors.

55. The system of aspect 41, wherein the controller supports over-the-air updates to energy management algorithms.

56. The system of aspect 41, wherein the controller disables high-power operations, such as vertical lifts, during critical low-battery conditions.

57. The system of aspect 41, wherein the controller provides predictive maintenance alerts based on abnormal energy consumption patterns.

58. The system of aspect 41, wherein the controller can receive manual override commands for energy management from a supervisor interface.

59. The system of aspect 41, wherein the controller balances energy consumption across a fleet of robots to optimize overall system uptime.

60. The system of aspect 41, wherein the controller uses machine learning to refine energy optimization strategies based on operational history.

61. A safety system for an autonomous mobile robot operating in a warehouse, comprising:

a multi-modal proximity detection suite including a 360-degree LiDAR sensor and at least one thermal imaging sensor;

a safety controller configured to detect human presence within a predefined safety zone;

an intervention module configured to execute at least one of speed reduction, audible warning, or emergency stop in response to detected human proximity.

62. The system of aspect 61, wherein the safety controller dynamically adjusts the size of the safety zone based on robot speed.

63. The system of aspect 61, wherein the intervention module activates a visual warning light when a human is detected within the safety zone.

64. The system of aspect 61, wherein the safety controller logs all human proximity events.

65. The system of aspect 61, wherein the intervention module issues a pre-recorded verbal warning via a speaker.

66. The system of aspect 61, wherein the safety controller is configured to detect human gestures indicating manual override.

67. The system of aspect 61, wherein the safety controller prioritizes emergency stop over speed reduction when a human is detected within a critical distance.

68. The system of aspect 61, wherein the proximity detection suite is calibrated to distinguish between humans and inanimate obstacles.

69. The system of aspect 61, wherein the safety controller is configured to communicate safety events to a central monitoring system.

70. The system of aspect 61, wherein the intervention module resumes normal operation only after the safety zone is clear for a predetermined period.

71. The system of aspect 61, wherein the safety controller supports over-the-air updates for safety algorithms.

72. The system of aspect 61, wherein the safety controller disables payload handling when a human is detected within the safety zone.

73. The system of aspect 61, wherein the safety controller is configured to escalate warnings if a human remains within the safety zone for an extended period.

74. The system of aspect 61, wherein the proximity detection suite includes redundant sensors for fail-safe operation.

75. The system of aspect 61, wherein the safety controller records video footage during safety events for incident analysis.

76. The system of aspect 61, wherein the intervention module is configured to send a notification to a supervisor terminal.

77. The system of aspect 61, wherein the safety controller is configured to adapt safety zone parameters based on warehouse congestion.

78. The system of aspect 61, wherein the safety controller supports manual override by authorized personnel.

79. The system of aspect 61, wherein the intervention module is configured to trigger an emergency stop if the robot loses communication with the safety controller.

80. The system of aspect 61, wherein the safety controller is configured to perform periodic self-tests of the proximity detection suite.

81. An edge AI module for an autonomous mobile robot operating in a warehouse, comprising:

an onboard processor configured to execute a neural network model for real-time task prioritization and navigation decisions;

a sensor interface for receiving data from LiDAR, vision, and inertial sensors;

a decision engine configured to select optimal actions based on current sensor data and task queue without requiring continuous communication with a central server.

82. The module of aspect 81, wherein the neural network model is trained to recognize dynamic obstacles and reroute accordingly.

83. The module of aspect 81, wherein the decision engine prioritizes tasks based on predicted completion times.

84. The module of aspect 81, wherein the onboard processor supports hardware acceleration for neural network inference.

85. The module of aspect 81, wherein the decision engine is configured to update task priorities in response to new sensor inputs every 200 milliseconds or less.

86. The module of aspect 81, wherein the module stores a local copy of the warehouse map for offline operation.

87. The module of aspect 81, wherein the neural network model is updated via secure over-the-air firmware updates.

88. The module of aspect 81, wherein the decision engine logs all decisions for post-operation analysis.

89. The module of aspect 81, wherein the module supports fallback to rule-based logic if neural network inference fails.

90. The module of aspect 81, wherein the decision engine is configured to balance task urgency with energy efficiency.

91. The module of aspect 81, wherein the module supports real-time anomaly detection in sensor data.

92. The module of aspect 81, wherein the decision engine is configured to request human intervention when confidence in a decision falls below a threshold.

93. The module of aspect 81, wherein the neural network model is trained on warehouse-specific operational data.

94. The module of aspect 81, wherein the module is configured to share learned navigation strategies with other robots in the fleet.

95. The module of aspect 81, wherein the module supports encrypted communication for data privacy.

96. The module of aspect 81, wherein the decision engine is configured to adapt to changes in warehouse layout without retraining.

97. The module of aspect 81, wherein the module supports multi-modal sensor fusion for robust decision making.

98. The module of aspect 81, wherein the module can be remotely monitored and diagnosed via a supervisor interface.

99. The module of aspect 81, wherein the decision engine is configured to escalate alerts for unresolved navigation conflicts.

100. The module of aspect 81, wherein the module supports periodic self-assessment of neural network performance.

101. A robot positioning system for warehouse automation, comprising:

an ultra-wideband (UWB) tag mounted on a mobile robot;

a plurality of UWB anchors deployed in a warehouse environment;

an onboard camera capturing real-time image data;

a digital map storing structural features of the warehouse;

a fusion processor configured to:

(a) calculate UWB-based coordinates using time-difference-of-arrival (TDoA) measurements between the tag and anchors;

(b) extract visual landmarks from the image data;

(c) align the visual landmarks with corresponding features in the digital map;

(d) generate corrected robot coordinates by fusing UWB-based coordinates with landmark alignment data.

102. The system of aspect 101, wherein the UWB anchors are positioned at heights of 2.5 to 5 meters and spaced at intervals of 25 meters or less within the warehouse.

103. The system of aspect 101, wherein the fusion processor applies a genetic annealing algorithm to minimize non-line-of-sight (NLOS) errors in UWB data using landmark-matched visual feedback.

104. The system of aspect 101, wherein the digital map includes predefined high-interference zones where the fusion processor prioritizes image data over UWB data for positioning accuracy.

105. The system of aspect 101, further comprising an inertial measurement unit (IMU), wherein the fusion processor integrates IMU data to maintain positioning during UWB signal loss or landmark misalignment.

106. The system of aspect 101, wherein the UWB tag and anchors operate at a center frequency of approximately 4 GHz with a bandwidth of about 1 GHz.

107. The system of aspect 101, wherein the fusion processor updates the digital map in real time by incorporating newly detected visual landmarks.

108. The system of aspect 101, wherein the system achieves positioning accuracy within 10 centimeters under non-line-of-sight conditions.

109. The system of aspect 101, wherein the onboard camera is a 360-degree stereo vision sensor calibrated for depth estimation.

110. The system of aspect 101, wherein the fusion processor triggers collision alerts when deviations between UWB and image-based positioning exceed a predefined safety threshold.

111. The system of aspect 101, further comprising an RFID reader on the robot, wherein item-level RFID data is fused with robot coordinates for enhanced inventory tracking.

112. The system of aspect 101, wherein the UWB anchors synchronize clocks via Ethernet or WiFi connections and transmit timestamps to a central real-time location system (RTLS).

113. The system of aspect 112, wherein the RTLS generates heatmaps of robot paths to facilitate warehouse layout optimization.

114. The system of aspect 101, wherein the fusion processor employs particle filtering to dynamically weight UWB versus visual data based on ambient lighting conditions.

115. The system of aspect 101, wherein the digital map includes geofenced areas where UWB anchors dynamically switch between active time-of-flight (ToF) and passive time-difference-of-arrival (TDoA) roles.

116. The system of aspect 101, wherein the mobile robot is an autonomous mobile robot (AMR) performing goods transport, and the corrected coordinates optimize the robot's route planning.

117. The system of aspect 101, wherein the system reduces navigation time by at least 40% compared to simultaneous localization and mapping (SLAM)-only positioning systems.

118. The system of aspect 101, wherein the fusion processor employs deep reinforcement learning to adapt positioning and navigation strategies in response to dynamic obstacles.

119. The system of aspect 101, wherein the UWB anchors self-calibrate their positions using fixed visual landmarks identified in the digital map.

120. The system of aspect 101, wherein the corrected robot coordinates are visualized on a user interface dashboard overlaid with real-time inventory locations for operator monitoring.

121. A system for enabling cross-platform interoperability in a warehouse robot fleet, comprising:

a middleware translation layer configured to convert proprietary robot control protocols into a standardized communication format;

a central orchestration engine that dynamically assigns tasks to heterogeneous robots based on real-time capability, location, and workload data;

an API gateway providing bidirectional data exchange between warehouse management systems (WMS) and robots from different vendors.

122. The system of aspect 121, wherein the middleware supports ROS, MODBUS, and OPC UA protocols.

123. The system of aspect 121, wherein the orchestration engine prioritizes tasks requiring collaboration between robot types.

124. The system of aspect 121, further comprising a digital twin simulating robot interactions before deployment.

125. The system of aspect 121, wherein the API gateway normalizes sensor data from disparate robots.

126. The system of aspect 121, wherein the middleware includes machine learning to predict protocol conflicts.

127. The system of aspect 121, wherein the orchestration engine redistributes tasks during robot failures. 8. The system of aspect 1, supporting real-time firmware updates across robot brands.

128. The system of aspect 121, wherein the standardized format is JSON-RPC over MQTT.

129. The system of aspect 121, including role-based access control for vendor-specific parameters.

130. The system of aspect 121, wherein robots self-report capabilities via the API gateway. 12. The system of aspect 1, with congestion-aware task routing to avoid traffic jams.

131. The system of aspect 121, wherein the orchestration engine optimizes energy consumption fleet-wide. 14. The system of aspect 1, integrating blockchain for auditable cross-vendor operations.

132. The system of aspect 121, wherein the middleware auto-detects new robot types. 16. The system of aspect 1, supporting hybrid cloud-edge deployment. 17. The system of aspect 1, with anomaly detection in cross-robot communications.

133. The system of aspect 121, wherein robots negotiate task ownership via smart contracts.

134. The system of aspect 121, including a sandbox environment for protocol testing.

135. The system of aspect 121, wherein the API gateway compresses data for low-bandwidth environments.

136. A robot navigation system for unstructured warehouses, comprising:

a multi-sensor fusion module combining LiDAR, event cameras, and mmWave radar;

a transient obstacle classifier using spatial-temporal graph neural networks;

a reactive path planner generating collision-free trajectories within 200 ms of obstacle detection.

137. The system of aspect 136, wherein the classifier distinguishes humans from inanimate objects with greater than 99% accuracy.

138. The system of aspect 136, wherein the path planner uses velocity obstacles for dynamic collision avoidance. 24. The system of aspect 21, with predictive modeling of obstacle movement patterns.

139. The system of aspect 136, wherein sensors are mounted on articulated joints for occlusion mitigation.

140. The system of aspect 136, including acoustic sensors for detecting obscured obstacles.

141. The system of aspect 136, wherein the planner prioritizes escape paths during deadlock scenarios. 28. The system of aspect 21, with automatic recalibration after sensor impacts.

142. The system of aspect 136, wherein the neural network is trained on synthetic warehouse obstacle datasets. 30. The system of aspect 21, generating 3D occupancy grids updated at 30 Hz.

143. The system of aspect 136, including haptic feedback for obstacle proximity.

144. The system of aspect 136, wherein the planner minimizes jerk during evasive maneuvers. 33. The system of aspect 21, with fail-safe freezing when confidence drops below 90%. 34. The system of aspect 21, integrating warehouse digital twin data for context.

145. The system of aspect 136, wherein the classifier identifies spill types (liquid/solid).

146. The system of aspect 136, including drone-assisted overhead obstacle mapping. 37. The system of aspect 21, with collaborative obstacle marking between robots. 38. The system of aspect 21, adapting lighting conditions for sensor performance.

147. The system of aspect 136, wherein the planner respects human social distancing zones. 40. The system of aspect 21, with self-diagnosis for sensor degradation.

148. A modular payload system for warehouse robots, comprising:
  a magnetic coupling interface with auto-alignment;
  swappable toolheads (grippers, vacuums, forks) with RFID-encoded capability profiles;
  a vision-based toolhead verification system ensuring secure attachment.

149. The system of aspect 148, wherein toolheads self-calibrate upon attachment. 43. The system of aspect 41, with force/torque sensing for adaptive grip control.

150. The system of aspect 148, wherein toolheads include energy harvesting during operation. 45. The system of aspect 41, supporting hot-swapping without robot downtime. 46. The system of aspect 41, with predictive toolhead recommendations based on upcoming tasks.

151. The system of aspect 148, wherein grippers use jamming transition materials for shape adaptation.

152. The system of aspect 148, including anti-vibration mounts for fragile items.

153. The system of aspect 148, wherein vacuum toolheads adjust suction based on surface porosity. 50. The system of aspect 41, with toolhead health monitoring via embedded sensors.

154. The system of aspect 148, wherein magnetic coupling operates at greater than 150 N holding force.

155. The system of aspect 148, including autonomous toolhead storage/retrieval stations. 53. The system of aspect 41, supporting 3D-printed custom toolheads. 54. The system of aspect 41, with collision-avoidance for attached toolheads.

156. The system of aspect 148, wherein toolheads share power/data via the coupling.

157. The system of aspect 148, including electrostatic adhesion for non-ferrous items. 57. The system of aspect 41, with toolhead sanitization cycles.

158. The system of aspect 148, wherein verification uses thermal imaging for contact integrity. 59. The system of aspect 41, supporting underwater toolheads for cold storage. 60. The system of aspect 41, with toolhead leasing inventory management.

159. An energy management system for warehouse robots, comprising:
  wireless charging pads at strategic workflow pause points;
  a digital twin simulating energy consumption patterns;
  an auction-based charging scheduler minimizing total fleet downtime.

160. The system of aspect 159, wherein charging pads use capacitive coupling. 63. The system of aspect 61, with solar-recharging docking stations.

161. The system of aspect 159, wherein robots bid charging slots based on task urgency.

162. The system of aspect 159, including kinetic energy recovery during deceleration. 66. The system of aspect 61, with battery health-aware charging protocols.

163. The system of aspect 159, wherein the digital twin predicts energy bottlenecks. 68. The system of aspect 61, supporting battery-swapping in less than 90 seconds. 69. The system of aspect 61, with ambient temperature compensation for battery performance.

164. The system of aspect 159, including hydrogen fuel cell range extenders.

165. The system of aspect 159, wherein charging pads double as data upload points. 72. The system of aspect 61, with regenerative braking for elevated conveyors.

166. The system of aspect 159, including piezoelectric floor tiles in high-traffic zones.

167. The system of aspect 159, wherein the scheduler reserves energy for critical operations. 75. The system of aspect 61, with battery preconditioning before peak loads.

168. The system of aspect 159, including predictive maintenance alerts for batteries. 77. The system of aspect 61, supporting vehicle-to-grid energy sharing. 78. The system of aspect 61, with dynamic power throttling during grid constraints.

169. The system of aspect 159, including carbon footprint tracking per robot.

170. The system of aspect 159, wherein charging pads detach for flood/emergency safety.

171. A safety system for human-robot warehouse cohabitation, comprising:
  ultra-wideband (UWB) personnel tags with haptic feedback;
  robot-mounted thermal/ToF sensors detecting humans in blind spots;
  a behavior-based safety governor overriding robot actions near humans.

172. The system of aspect 171, wherein uWB tags create dynamic exclusion zones. 83. The system of aspect 81, with predictive path conflict modeling.

173. The system of aspect 171, including emergency stop gesture recognition.

174. The system of aspect 171, wherein robots emit directional audible warnings. 86. The system of aspect 81, with worker fatigue monitoring via tag sensors.

175. The system of aspect 171, including augmented reality visibility aids.

176. The system of aspect 171, wherein the safety governor enforces ISO/TS 15066 limits. 89. The system of aspect 81, with incident replay using onboard black boxes.

177. The system of aspect 171, including ventilation control for airborne hazards.

178. The system of aspect 171, wherein robots reduce speed proportional to human proximity. 92. The system of aspect 81, with RFID-based tool safety interlocks.

179. The system of aspect 171, including panic button integration.

180. The system of aspect 171, wherein tags vibrate when entering danger zones. 95. The system of aspect 81, with privacy-preserving human tracking.

181. The system of aspect 171, including safety certification blockchain ledgers.

182. The system of aspect 171, wherein robots perform safety drills with workers. 98. The system of aspect 81, with electromagnetic field shielding for medical devices.

183. The system of aspect 171, including near-miss analytics for process improvement.

184. The system of aspect 171, wherein the governor allows temporary safety rule relaxation during emergencies.

Advantages of one implementation may include one or more of the following:

1. Improved Navigation and Obstacle Avoidance—By dynamically fusing data from LIDAR, stereo vision, ultrasonic sensors, and additional modalities, the system generates a unified environmental map that enables real-time, highly responsive obstacle detection and avoidance.

2. Enhanced Energy Efficiency—The energy management system, which incorporates an energy optimization controller, continuously monitors energy consumption and adjusts operations based on battery levels, task predictions, and charging station availability. This helps reduce power consumption and extends operational uptime.

3. Adaptive Task Management—A dynamic task reallocation method ensures that transport, picking, and replenishment tasks are optimally distributed according to current robot locations and battery status. This real-time reassignment of tasks minimizes delays and maintains workflow efficiency even in the event of faults or unexpected delays.

4. Robust Safety Features—The inclusion of a comprehensive safety system that incorporates 360-degree LIDAR, thermal imaging, ultra-wideband personnel tags, and blind-spot sensors ensures the rapid detection of human presence. Automated responses, such as speed reduction, audible warnings, or immediate stops, significantly enhance safety in environments shared by both automated systems and human operators.

5. Onboard Real-Time Decision Making—Utilizing neural network models on the onboard processor allows the robot to make decisions locally, reducing reliance on continuous central communication and enabling immediate responses to dynamic environmental changes.

6. Precise Localization—The fusion of ultra-wideband tag data, visual landmark extraction, and digital mapping improves positioning accuracy, which is essential for effective navigation in complex warehouse environments.

7. Modular and Flexible Payload Handling—The design features a modular payload system with a magnetic coupling interface and swappable toolheads. Vision-verified tool replacement increases operational flexibility, allowing the robot to adapt to various tasks and payload types.

8. Optimized Fleet Downtime—An auction-based wireless charging scheduler coordinates charging cycles in a manner that minimizes downtime and increases overall fleet efficiency, ensuring that robots are available to perform tasks as needed.

These advantages together contribute to a more autonomous, flexible, and efficient warehouse robotic system capable of adapting to dynamic operational demands while maintaining high levels of safety and energy optimization.

BRIEF DESCRIPTION OF DRAWINGS

FIG. 1 depicts a process flow for an autonomous warehouse robot system.

FIG. 2 illustrates a flowchart of an autonomous mobile robot system components.

FIG. 3 illustrates a flowchart for a dynamic task reallocation method for warehouse robots.

FIG. 4 depicts the energy management process for a warehouse robot.

FIG. 9 illustrates the process flow for a multi-sensor fusion module integrating LiDAR, event cameras, and mmWave radar with obstacle classification and path planning.

FIG. 10 depicts a flowchart illustrating a modular payload system with steps involving magnetic coupling, toolhead swapping with RFID profiles, and vision-based toolhead verification.

DETAILED DESCRIPTION OF THE INVENTION

Figures 5, 6:
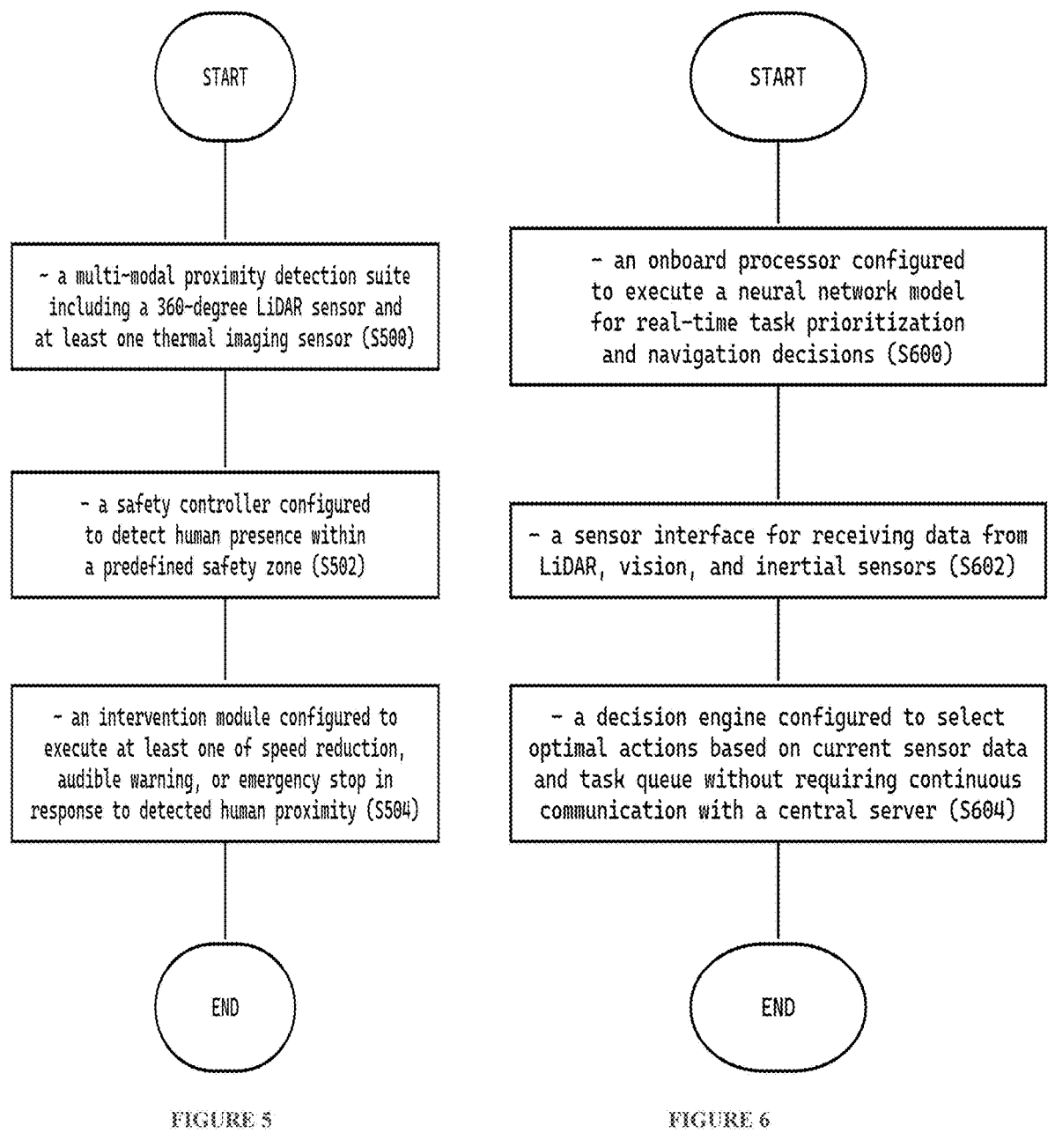
FIG. 5 illustrates a safety system process flow for a mobile robot with proximity detection and intervention modules.
FIG. 6 illustrates a flowchart for a neural network-based decision-making process in a robot system.

FIG. 1 shows a process for a warehouse robot, whose details and contemplated operations/configurations are detailed in Ser. 63/832,078 filed Jun. 28, 2025 and 63/832,086 filed Jun. 28, 2025, the contents of which are incorporated by reference. In FIG. 1, a chassis, designated as S100, constitutes the primary structural framework of the autonomous mobile robot. In one embodiment, the chassis S100 serves as a robust platform upon which the drive system, sensor suite, energy management components, and additional modules are mounted. The design of the chassis S100 is optimized for the operational demands of a warehouse environment, ensuring that the robot maintains stability and alignment during dynamic maneuvers. Materials and construction techniques for the chassis S100 are selected to resist wear and impact, thereby facilitating reliable performance over extended periods and allowing for seamless integration with other robotic subsystems.

An autonomous mobile robot is provided for dynamic warehouse applications. The robot features a robust chassis that incorporates, among other components, a drive system operable to move the chassis (S102). This drive system is designed to effectively impart motion to the chassis and is configured to provide precise control over speed and direction, enabling the robot to navigate complex warehouse layouts with efficiency. The drive system achieves coordinated movement through the integration of power delivery mechanisms, actuators, and control circuitry that respond to real-time navigational commands and sensor feedback.

The sensor suite S104 includes a LiDAR sensor that produces precise distance measurements and three-dimensional mapping data, a stereo vision camera that captures depth and color information in fine resolution for scene analysis, and an ultrasonic sensor that provides dependable proximity detection for objects in its immediate vicinity. This combination strengthens the robot's ability to accurately perceive and interpret its environment for navigation and obstacle avoidance.

The sensor fusion module, identified as S106, processes input from various sensors to generate a unified environmental map. It dynamically adjusts the weighting of sensor inputs based on prevailing warehouse conditions, ensuring that the most reliable data is emphasized. By integrating information from sensors such as LiDAR, stereo vision, and ultrasonic sensors, the module continuously updates the environmental map to reflect real-time conditions. This approach enhances the accuracy of obstacle detection and supports efficient path planning for autonomous navigation.

One implementation provides an autonomous mobile robot designed for efficient and dependable warehouse operations through advanced navigation and sensor fusion capabilities. A key element of the system is the navigation controller S108, which is configured to plan and execute obstacle-avoiding paths in real time based on the unified environmental map. The controller S108 receives the integrated map generated by the sensor fusion module and processes data from various sensors to detect obstacles, dynamically adjusting the robot's trajectory to ensure secure passage even in congested or unpredictable environments.

By continually evaluating the surroundings, the navigation controller S108 facilitates rapid adaptation to changes in warehouse conditions. It effectively translates the environmental map into precise navigation decisions, thereby enabling the robot to maneuver through complex layouts while avoiding collisions. This real-time responsiveness underpins the overall operational flexibility and safety of the warehouse robotic system.

FIG. 2 illustrates a flowchart of the components in an autonomous mobile robot system. It starts with a mobile chassis (S200), followed by a drive system (S202). The system includes an adaptive payload handling system (S204) that comprises a telescopic lift and a variable-width gripper. A machine vision module (S206) is configured to identify item dimensions and orientation on a shelf. The control system (S208) is configured to adjust the telescopic lift height and gripper width based on the identified item dimensions and orientation. The process concludes at the end.

The autonomous mobile robot includes an adaptive payload handling system (S204), which features a telescopic lift and a variable-width gripper. The telescopic lift allows for vertical adjustment, enabling the robot to access items at various heights. The variable-width gripper is designed to adjust its grip based on the size of the item, providing secure handling and transport within the warehouse environment.

The machine vision module, denoted as S206, is configured to identify the dimensions and orientation of items located on a shelf. This module uses advanced imaging techniques to precisely analyze and determine the spatial arrangement and size of the objects it observes. By accurately assessing these parameters, the module assists the autonomous mobile robot in making informed decisions regarding item handling and manipulation tasks, enhancing the robot's operational efficiency within the warehouse environment.

The control system, designated as S208, is engineered to adjust the height of the telescopic lift and the width of the gripper. This adjustment is based on the item dimensions and orientation identified by the machine vision module. This ensures precise handling of items on a shelf, allowing for efficient and accurate picking and placement operations.

FIG. 3 illustrates a flowchart for a dynamic task reallocation method for warehouse robots. Initially, a central task scheduler assigns transport, picking, or replenishing tasks to each robot based on their current location and battery status (S300). The progress of each robot is then monitored in real time, checking for unexpected delays or obstacles (S302). If any incomplete tasks are detected, they are automatically reassigned to other available robots in response to delays, robot faults, or changes in warehouse conditions (S304).

The reference label S300 pertains to a method in which a central task scheduler assigns initial tasks to each robot. These tasks include transport, picking, or replenishing, and the assignment is based on the robots' current location and battery status. The centralized approach ensures that tasks are efficiently allocated according to the robots' positions and energy availability, promoting streamlined operations within the warehouse environment.

The mobile robot system incorporates a method for continuously tracking the progress of each unit throughout its assigned tasks. This process involves real-time assessment to identify any unforeseen delays or obstacles that arise during operations. Such monitoring ensures that the efficiency and effectiveness of the robot's performance are maintained, allowing for prompt adjustments when disruptions occur.

The reference label S304 refers to a component in the autonomous mobile robot system designed for warehouse operations. It describes the functionality where incomplete tasks are automatically reassigned to other available robots if delays, faults, or changes in warehouse conditions are detected. This dynamic task reallocation ensures operational efficiency by redistributing tasks to maintain workflow continuity even when unexpected issues arise.

FIG. 4 illustrates the energy management process for a warehouse robot. It begins with a battery module (S400), which supplies power for the robot's operations. The process involves a plurality of onboard sensors (S402) that monitor energy consumption by various subsystems, including drive motors, sensors, and payload handlers. This data is used by an energy optimization controller (S404) to dynamically adjust the robot's operating parameters in real time. Adjustments are based on factors such as current battery level, predicted task energy requirements, and charging station availability.

The reference label "a plurality of onboard sensors configured to monitor energy consumption by subsystems including drive motors, sensors, and payload handlers S402" pertains to sensors integrated within the warehouse robot. These sensors are designed to track the energy usage across various components such as drive motors, sensors, and payload handlers. Their purpose is to provide real-time data on energy consumption, enabling the system to optimize power usage based on the current operational demands, ensuring efficient energy management and prolonging battery life.

The reference label "S404" pertains to an energy optimization controller. This component is configured to dynamically adjust the operating parameters of the robotic system in real time. These adjustments are made by considering the current battery level, the predicted energy requirements for upcoming tasks, and the availability of charging stations within the operating environment.

FIG. 5 illustrates a safety system process flow for a mobile robot, incorporating proximity detection and intervention modules. It begins with a multi-modal proximity detection suite (S500), which includes a 360-degree LiDAR sensor and at least one thermal imaging sensor. This setup feeds data to a safety controller (S502), configured to detect human presence within a predefined safety zone. Upon detection, an intervention module (S504) can execute actions such as speed reduction, audible warning, or an emergency stop in response to human proximity.

The described one implementation incorporates a multi-modal proximity detection suite, equipped with a 360-degree LiDAR sensor and at least one thermal imaging sensor. This assembly is configured to continuously monitor the surrounding environment for enhanced operational performance. By providing comprehensive coverage, the proximity detection suite ensures that the mobile robot can effectively detect objects or individuals within its operational area. The integration of both LiDAR and thermal imaging technologies facilitates robust obstacle recognition and human presence identification under various environmental conditions, which is essential for maintaining reliable operations in dynamic warehouse settings.

A safety controller is implemented to detect human presence within a predefined safety zone. This controller processes data from various sensors to identify when a person enters a specific area around the autonomous mobile robot. Upon detection, the system can trigger appropriate safety responses to ensure a secure operating environment.

The reference label "S504" pertains to an intervention module integrated into the safety system of an autonomous mobile robot designed for warehouse operations. This module is configured to execute measures such as speed reduction, issuing audible warnings, or initiating an emergency stop. These actions are triggered in response to the detection of human proximity, ensuring enhanced safety by mitigating potential risks when humans are present within predefined safety zones.

FIG. 6 illustrates a flowchart for a neural network-based decision-making process in a robot system. It starts with an onboard processor configured to execute a neural network model for real-time task prioritization and navigation decisions (S600). The process involves a sensor interface for receiving data from LiDAR, vision, and inertial sensors (S602). Based on the gathered sensor data, a decision engine is configured to select optimal actions, relying on the current sensor data and task queue, without requiring continuous communication with a central server (S604). The flowchart concludes with the decision-making process.

The autonomous mobile robot incorporates an onboard processor, denoted as reference S600, which is tasked with executing a neural network model. This model facilitates real-time decision-making for task prioritization and navigation. The processor operates independently, enhancing the robot's ability to make timely and accurate decisions without relying on constant communication with a central server.

The sensor interface labeled S602 is a component designed to receive data from multiple types of sensors, including LiDAR, vision, and inertial sensors. This interface plays an essential role by collecting and integrating data from these varied sources to facilitate informed decision-making and navigation by the robot system. This data stream enables the robot to better understand its environment and react appropriately in real-time through its onboard processor and decision engine.

Is configured to select optimal actions by analyzing current sensor data and the task queue. It operates autonomously without the need for continuous communication with a central server, allowing for real-time decision-making and task execution.

Figures 7, 8:
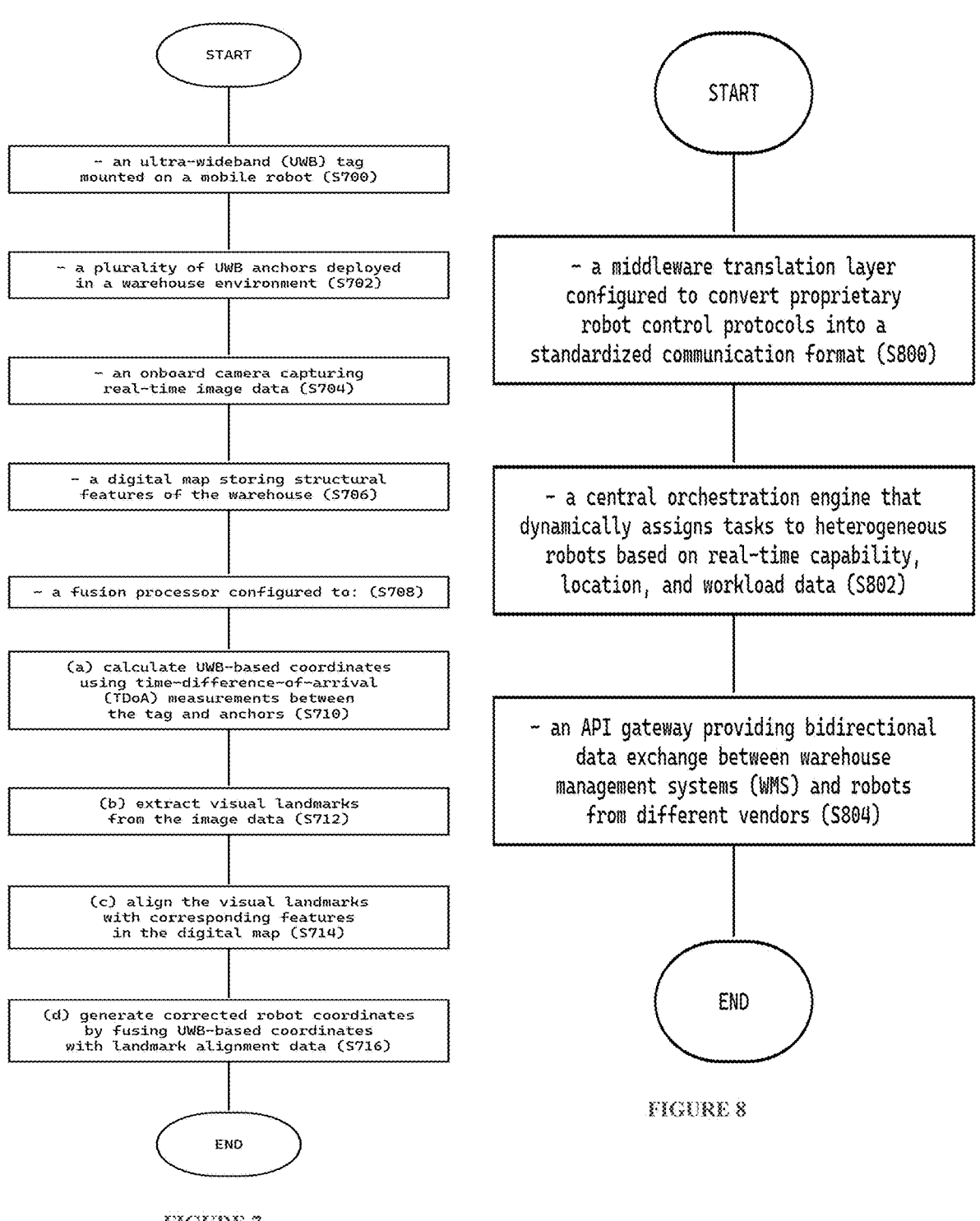
FIG. 7 illustrates a flowchart for a robot positioning system within a warehouse using UWB and visual landmarks to correct coordinates.
FIG. 8 illustrates a process flow for a middleware translation layer in a warehouse robot fleet.

FIG. 7 illustrates a flowchart for a robot positioning system in a warehouse using ultra-wideband (UWB) and visual landmarks to correct coordinates. Initially, an ultra-wideband (UWB) tag is mounted on a mobile robot (S700) which operates in an environment with multiple UWB anchors deployed throughout the warehouse (S702). The robot is equipped with an onboard camera that captures real-time image data (S704). This setup is complemented by a digital map storing the warehouse's structural features (S706). A fusion processor is configured to perform several tasks: it calculates UWB-based coordinates using time-difference-of-arrival (TDoA) measurements between the tag and anchors (S710), extracts visual landmarks from the image data (S712), aligns these landmarks with corresponding features in the digital map (S714), and finally generates corrected robot coordinates by fusing UWB-based coordinates with landmark alignment data (S716).

The ultra-wideband (UWB) tag, designated as S700, is mounted on a mobile robot. This tag is an integral component of the robot's positioning system, interacting with a network of UWB anchors that are strategically placed throughout the warehouse. Utilizing time-difference-of-arrival (TDoA) measurements between the tag and the anchors, the UWB system computes precise robot coordinates. By fusing UWB-derived location data with additional sensor information, the system enables the robot to navigate the warehouse environment effectively in real time.

The system includes S704, an onboard camera designed to capture real-time image data. This camera is instrumental in enabling the autonomous mobile robot to navigate and interact with its environment. By continuously capturing images, the camera supplies essential visual information that is integrated with other systems, allowing the robot to perform tasks like obstacle avoidance and landmark recognition accurately.

The digital map identified as S706 stores key structural features of the warehouse. It plays a vital role in the positioning system by providing a detailed reference to align visual landmarks captured by onboard cameras. Additionally, integrating the digital map with ultra-wideband (UWB) coordinates ensures precise navigation and positioning within the warehouse environment.

The process involves extracting visual landmarks from the image data (S712). This includes capturing key features within the images that help determine the robot's precise location within the warehouse environment. By analyzing the images in real time, the system can detect recognizable patterns or objects that serve as reference points. These visual landmarks play an essential role in enhancing the accuracy of the robot's navigational capabilities. The extraction process ensures that the robot can maintain consistent and up-to-date positional awareness by regularly comparing these landmarks with known features stored in a digital map.

In the flowchart, the step labeled "(c) align the visual landmarks with corresponding features in the digital map S714" involves taking visual landmarks identified from real-time image data and matching them to the structural features stored in the digital map. This alignment process ensures that visual data points are accurately integrated within the map framework, aiding in precise localization and navigation of the mobile robot within the warehouse environment.

The fusion processor is configured to generate corrected robot coordinates by integrating ultra-wideband (UWB) based coordinates with data from aligned visual landmarks. This process involves merging the UWB-derived positional information with the alignment results from visual landmarks identified in the warehouse environment. The resulting coordinates provide enhanced accuracy for the mobile robot's position within the warehouse, ensuring precise navigation and positioning.

FIG. 8 illustrates a process flow for a middleware translation layer in a warehouse robot fleet. The process begins with a middleware translation layer, shown in step S800, that converts proprietary robot control protocols into a standardized communication format. Next, a central orchestration engine in step S802 dynamically assigns tasks to heterogeneous robots by considering real-time capability, location, and workload data. Finally, an API gateway, in step S804, facilitates bidirectional data exchange between warehouse management systems (WMS) and robots from different vendors.

The reference label "S802" pertains to a central orchestration engine designed to manage warehouse operations by dynamically assigning tasks to various robots. This engine evaluates real-time capability, location, and workload data of the heterogeneous robots to optimize task distribution. It ensures efficient use of the robotic fleet, adapting to changes instantly and facilitating seamless coordination. This orchestration function is integral to maintaining smooth operations within a dynamic warehouse environment.

The API gateway is configured to enable bidirectional data exchange between warehouse management systems (WMS) and robots from various vendors. This functionality ensures seamless communication across different platforms, facilitating effective coordination and task management within the warehouse environment. The gateway translates and manages data flows, ensuring that diverse robotic systems can interact with the WMS, thereby improving operational efficiency and flexibility.

FIG. 9 illustrates the process flow for a multi-sensor fusion module integrating LiDAR, event cameras, and mmWave radar. It begins with a multi-sensor fusion component (S900), which combines data from these sources to enhance perception capabilities. Following this, a transient obstacle classifier (S902) employs spatial-temporal graph neural networks to accurately identify and categorize obstacles. Finally, a reactive path planner (S904) generates collision-free trajectories, ensuring responsive navigation by processing information within 200 ms of obstacle detection.

The reference label S900 pertains to a multi-sensor fusion module within the autonomous mobile robot designed for warehouse operations. This module combines various sensors, including LiDAR, event cameras, and mmWave radar. The integration of these sensors enables the system to gather comprehensive environmental data, enhancing its capacity to perceive and navigate complex warehouse environments efficiently.

The reference label S902 denotes a transient obstacle classifier that utilizes spatial-temporal graph neural networks. This component is engineered to analyze and classify temporary obstacles within the environment. Through the use of advanced neural network techniques, it dynamically interprets spatial and temporal data, enabling accurate obstacle classification that is essential for reliable navigation.

The reference labeled S904 pertains to a reactive path planner designed to generate collision-free trajectories swiftly, within 200 milliseconds of detecting an obstacle. This system utilizes data from various sensors to ensure real-time adjustments in the robot's navigation path, allowing for immediate reaction to dynamic changes in the environment, thus maintaining operational efficiency and safety.

FIG. 10 illustrates a flowchart representing a modular payload system. The process begins with a magnetic coupling interface featuring auto-alignment (S1000), facilitating the initial connection. Next, it involves swappable toolheads, such as grippers, vacuums, and forks, each equipped with RFID-encoded capability profiles (S1002) to ensure proper functionality. The final step includes a vision-based toolhead verification system (S1004) that confirms secure attachment, enhancing reliability and safety in operations.

The modular payload system is designed with a magnetic coupling interface, denoted as S1000, which features an auto-alignment capability. This interface facilitates the secure attachment of various toolheads, enabling seamless and efficient swapping.

The reference label enumerated as S1002 pertains to swappable toolheads integrated into the modular payload system. These toolheads include various types such as grippers, vacuums, and forks. Each toolhead is equipped with RFID-encoded capability profiles, facilitating the identification and verification of the tool's features and functions. This system allows the autonomous robot to adapt its payload operations efficiently by swapping the toolheads as needed for specific tasks.

The diagram illustrates a vision-based toolhead verification system (S1004) integral to ensuring secure attachment in the modular payload system of an autonomous mobile robot. This system uses visual recognition techniques to confirm that the toolheads—including grippers, vacuums, and forks—are properly aligned and securely attached. The verification process is part of a broader workflow involving magnetic coupling and RFID capability profiling for toolhead interaction, thereby enabling flexible and efficient operations within the warehouse environment.

Figures 11, 12:
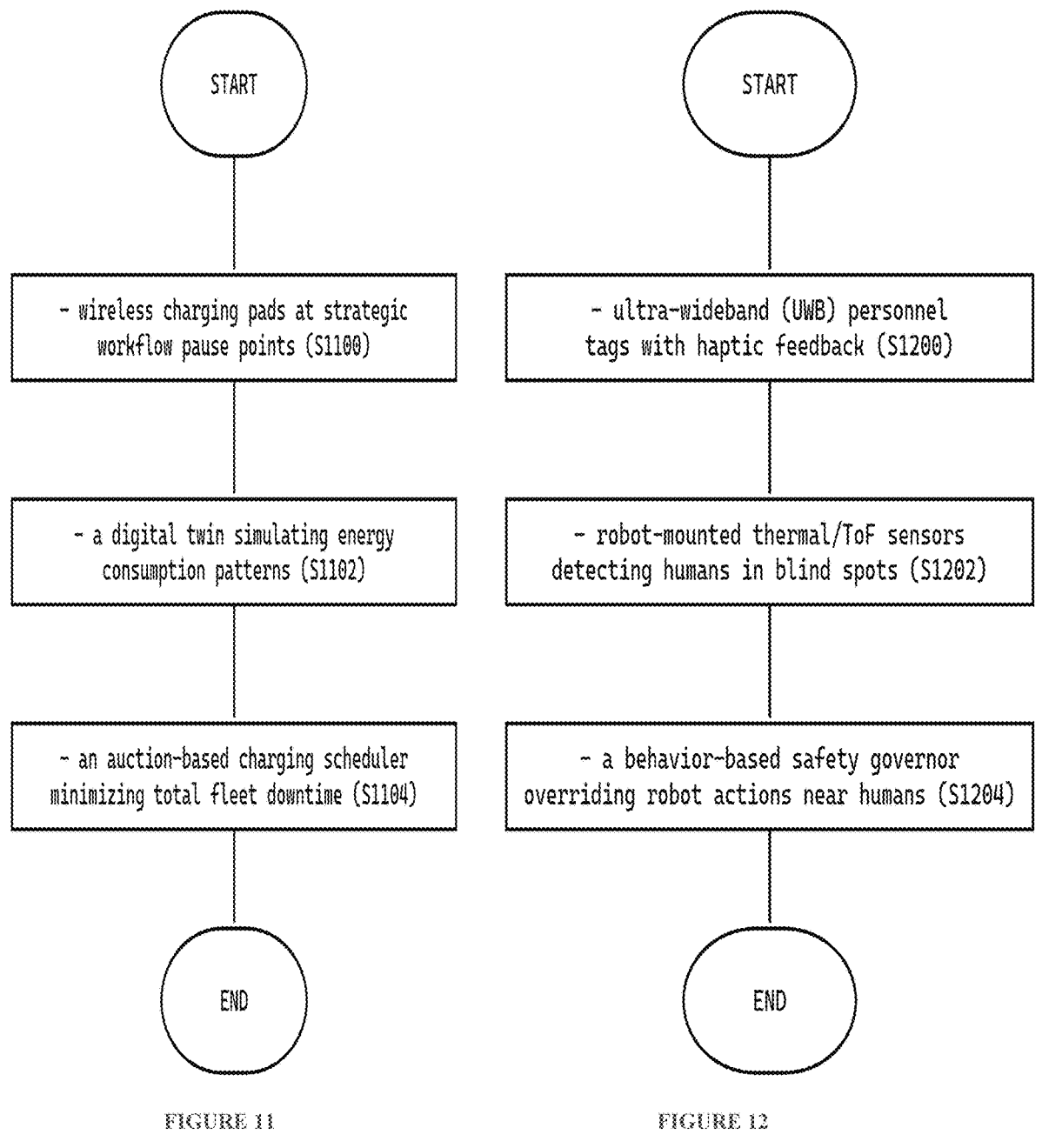
FIG. 11 illustrates a flowchart of an energy management system for warehouse robots.
FIG. 12 illustrates a process flow chart for a safety system in a warehouse robot, starting with UWB personnel tags and ending with a safety governor.

FIG. 11 illustrates a flowchart of an energy management system for warehouse robots. It begins with the implementation of wireless charging pads at strategic workflow pause points (S1100). Following this, a digital twin simulates energy consumption patterns (S1102) to enhance system understanding and prediction. The process concludes with an auction-based charging scheduler that minimizes total fleet downtime (S1104), thereby optimizing overall efficiency.

One implementation includes wireless charging pads positioned at strategic workflow pause points. These pads (S1100) are designed to enable efficient charging of the mobile robotic units during natural operational pauses within the warehouse environment, thereby optimizing energy replenishment without disrupting ongoing tasks.

The reference label "S1102" designates a digital twin, which is a virtual representation used to simulate energy consumption patterns within the autonomous mobile robot system for warehouse operations. This digital twin is instrumental in forecasting and managing energy usage across the robotic fleet, thereby optimizing operational efficiency and ensuring effective energy distribution. By modeling real-time energy demands and projecting future consumption, the digital twin enables informed decision-making in energy management strategies, ensuring continuous and efficient functioning of the robot fleet with minimal downtime.

The auction-based charging scheduler is designed to efficiently manage the charging process for warehouse robots by organizing charging sessions in an auction format, where robots submit bids for available charging slots. This system assesses parameters such as battery levels, task urgency, and anticipated workflow requirements. By prioritizing robots with immediate needs, the scheduler reduces overall fleet downtime, ensuring continuous operations and improving overall efficiency within the warehouse environment.

FIG. 12 illustrates a process flow chart for a safety system in a warehouse robot. It begins with ultra-wideband (UWB) personnel tags equipped with haptic feedback (S1200), which enhance human detection. Next, robot-mounted thermal and Time of Flight (ToF) sensors are employed to detect humans in blind spots (S1202). Finally, a behavior-based safety governor is implemented to override robot actions near humans, ensuring safety (S1204).

The reference label S1200 pertains to the implementation of ultra-wideband (UWB) personnel tags equipped with haptic feedback mechanisms. These tags are designed to enhance safety by providing real-time alerts to personnel, ensuring they remain aware of the robot's presence and actions. The haptic feedback serves as a proactive measure to mitigate potential accidents within the warehouse environment.

The system comprises robot-mounted thermal and time-of-flight (ToF) sensors, engineered to detect human presence in regions not in direct line-of-sight, commonly identified as blind spots. The sensors (S1202) play a pivotal role in enhancing safety by delivering real-time data regarding human proximity, which enables the robot to make informed decisions regarding its movements and actions within a warehouse environment.

The reference label "S1204" describes a behavior-based safety governor within the robotic system. This governor is designed to override the robot's actions when it detects human presence nearby. By doing so, it ensures that the robot operates safely in environments where human interaction is possible, prioritizing safety over regular operational directives.

Collectively, these components form an integrated system wherein the chassis, drive system, sensor suite, sensor fusion module, and navigation controller function cooperatively to provide a robust, reliable, and adaptable autonomous mobile robot capable of efficiently operating in complex warehouse environments.

In one embodiment, the sensor fusion module S106 is configured to adjust the relative weighting of inputs received from the sensor suite S104 based on detected environmental conditions. When the LiDAR sensor within S104 detects characteristics associated with an elevated concentration of dust or fog—such as attenuated signal returns or increased scattering—the sensor fusion module S106 interprets these conditions as detrimental to the reliability of LiDAR-based measurements. In response, S106 dynamically increases the reliance on the vision camera included in S104. This increased reliance is implemented by modifying the sensor fusion algorithm to prioritize the stereo vision camera's output over that of the LiDAR sensor under such adverse conditions. The adjustment involves scaling factors applied to the sensor data so that the stereo vision camera's input contributes a greater portion to the unified environmental map generated by S106. In alternative embodiments, S106 employs predetermined threshold levels for sensor signal quality, wherein exceeding these thresholds triggers an automatic reallocation of weightings. As a result, the system maintains robust obstacle detection and navigational accuracy by compensating for performance degradation of the LiDAR sensor when operating in environments with elevated levels of dust or fog.

In one embodiment, the navigation controller S108 continuously monitors the surroundings by receiving updated sensor data from the sensor suite S104 and the sensor fusion module S106. When a new obstacle is detected, the navigation controller S108 initiates a recalculation of the obstacle-avoiding path, completing this recalculation within 100 milliseconds. This quick reaction is achieved by leveraging fast processing capabilities and optimized algorithm routines integrated within the navigation controller S108, which dynamically weigh sensor inputs and update the unified environmental map in real time. Upon detecting a new obstacle, the controller retrieves the most recent environmental data, processes the information to assess potential collision risks, and generates a revised trajectory that maintains adequate separation from the obstacle. The recalculated path is then communicated directly to the drive system S102 to promptly adjust the chassis movement, ensuring continuous navigation in a dynamically changing environment.

In one embodiment, the LiDAR sensor included in the sensor suite (S104) is set to operate at a refresh rate of at least 10 Hz, thereby enabling the rapid acquisition of environmental data essential for real-time mapping and obstacle detection. By functioning at this minimum refresh rate, the LiDAR sensor completes enough scanning cycles per second to accurately capture transient environmental changes, which increases the fidelity of the unified environmental map generated by the sensor fusion module (S106). In this configuration, the LiDAR sensor's data output is synchronized with inputs from the stereo vision camera and ultrasonic sensor, allowing the navigation controller (S108) to compute obstacle-avoiding paths with greater precision and timeliness. The system is designed so that any temporary reduction in the LiDAR sensor's refresh rate is offset by adaptive weighting algorithms within the sensor fusion module, which dynamically adjust the relative influence of each sensor based on current detection and operational conditions. This design ensures that the overall performance of the robotic system continues to meet real-time operational requirements, facilitating efficient and reliable navigation even under varying warehouse conditions.

The system includes a sensor suite comprising a LiDAR sensor, a stereo vision camera, and an ultrasonic sensor, wherein the stereo vision camera is calibrated for color-based object classification. In one embodiment, the stereo vision camera is equipped with an imaging sensor array and an optical lens assembly that, together with dedicated calibration circuitry, enable the capture of image data with accurately balanced color components. The calibration process involves imaging a standardized color reference target under controlled lighting conditions. The captured image data is then analyzed to determine color correction parameters that are applied to subsequent images, ensuring consistent representation of hue, saturation, and brightness across varying ambient lighting conditions. These calibrated parameters allow the stereo vision camera to accurately classify objects based on their color, providing reliable differentiation between object types in a complex environment.

In one embodiment, the system further includes a sensor health monitor integrated with the sensor suite S104 and the sensor fusion module S106. The sensor health monitor continuously evaluates the performance and status of individual sensors, including but not limited to the LiDAR sensor, stereo vision camera, and ultrasonic sensor. Upon detecting a malfunction or degradation in one or more of these sensors, the sensor health monitor triggers a fallback navigation mode. In this mode, the navigation controller S108 is instructed to modify its path planning strategy by reducing reliance on the compromised sensor inputs. The system compensates for sensor failure by employing alternative sensor data sources, such as redundant inputs from an onboard processor S600 or multisensor inputs from the fusion processor S708, to generate a corrected and reliable environmental map. The fallback mode further involves dynamically adjusting the weightings of sensor data within the sensor fusion module S106 so that the overall navigation decisions remain robust even when some sensor inputs are compromised. Additionally, the sensor health monitor communicates directly with the decision engine S604 to invoke a revised navigation algorithm that is optimized for enhanced operational continuity under degraded sensing conditions. Thus, by incorporating the sensor health monitor, the system ensures continued operation by automatically transitioning to a fallback navigation mode upon sensor failure, thereby mitigating risks associated with unreliable or missing sensor data.

In one exemplary embodiment, the navigation controller (S108) receives and processes sensor data from the sensor suite (S104) and sensor fusion module (S106) to generate a unified environmental map that reflects the real-time warehouse environment. The navigation controller is further configured to share these environmental map updates with other robots over a wireless network, thereby enabling a distributed system of inter-robot situational awareness. In operation, after the unified environmental map is computed, the navigation controller periodically broadcasts map updates via an onboard wireless communication module, which can be integrated with or functionally associated with an onboard processor (S600). The shared map updates include information regarding the location and movement of obstacles, dynamic changes in the environment, and any detected hazards, ensuring that all interconnected robots maintain an up-to-date representation of their surroundings. This inter-robot communication is supported by a middleware translation layer (S800) that standardizes the communication protocol, allowing heterogeneous robots to interpret and integrate the shared environmental information seamlessly. As a result, each robot adjusts its navigation path in real time, thereby improving obstacle avoidance, reducing the likelihood of collisions, and enhancing overall operational efficiency within the warehouse environment. In an alternative embodiment, the navigation controller prioritizes the transmission of urgent updates, such as sudden changes in obstacle positions or emergent safety hazards, to ensure that immediate corrective action is taken by the fleet. Such prioritization is achieved through a dynamic weighting algorithm that factors in the severity and immediacy of detected changes. The shared environmental map thus serves not only as a guide for individual navigation but also as a foundation for collaborative decision-making among robots, leading to more efficient multi-robot task execution and enhanced coordination of fleet activities.

The robot comprises a sensor suite (S104) and a sensor fusion module (S106) that dynamically weights sensor inputs based on detected warehouse conditions, and is further configured to log sensor data and fusion decisions for post-operation analysis. In embodiments thereof, an onboard processor (S600) executes a neural network for real-time task prioritization and navigation decisions while concurrently recording both raw sensor data and the corresponding fusion decisions produced by the sensor fusion module (S106) and/or decision engine (S604). Such logging facilitates tracking of sensor input values from the sensor interface (S602) and captures the real-time adjustments made to sensor weighting imposed upon generating the unified environmental map. The logged data, stored in a non-volatile memory, is subsequently available for post-operation analysis to evaluate system performance, verify the accuracy of environmental mapping, and calibrate decision-making strategies. The archival of sensor data and fusion decisions further supports diagnostic analyses, enhances the tuning of control algorithms, and assists in refining operating parameters based on retrospective assessments of the robot's behavior under varying warehouse conditions.

In one embodiment, the robot continuously monitors sensor data from sensor suite S104 and multi-modal proximity detection suite S500 to identify obstacles and determine their characteristics. A sensor fusion module, such as S106, aggregates input signals and calculates a confidence score for the detected obstacles. In certain embodiments, an onboard processor like S600 executes neural network models that process raw sensor data and produce a confidence score reflecting the reliability of obstacle detection. When the computed confidence score falls below a predetermined threshold, the control system initiates an alert routine. The navigation controller S108, in conjunction with the decision engine S604 receiving inputs via sensor interface S602, triggers a protocol to notify a remote operator of the obstacle detection event with a diminished confidence score. This notification is transmitted via established communication channels, for example, using an API gateway such as S804 to ensure interoperability with external systems. During the alert process, the system can adjust operational parameters to enhance safety—for example, reducing speed or modifying the trajectory based on reactive path planning elements like S904. The alert message includes the current sensor readings and the corresponding confidence score, thereby providing the remote operator with sufficient information for further intervention. Additionally, in some embodiments the energy optimization controller S404 concurrently manages power allocations for sensor operations while ensuring that the alert mechanism receives adequate power to operate reliably during essential situations.

In one embodiment, the sensor fusion module S106 is updated via over-the-air firmware updates to allow for continuous improvement and adaptation of sensor input processing and weighting. In this embodiment, the sensor fusion module S106 includes an onboard processor that can store and execute firmware update routines, and a communications interface that receives data over a wireless network from an authorized update server. Upon reception of an update command, the sensor fusion module S106 begins a secure update process by verifying the digital signature of the new firmware image to ensure its integrity and authenticity. The module then performs a self-diagnostic sequence to confirm that current operations can be safely interrupted or placed in a dormant state before commencing the firmware update. During the over-the-air update, the module employs error-checking and redundancy protocols to ensure that, in the event of data corruption or a communication disruption, the update process is either paused or safely rolled back to the last known stable firmware version. Once the update is successfully validated, the sensor fusion module S106 reinitializes and loads the updated firmware, thereby modifying its sensor weighting algorithms and control strategies in accordance with the latest software improvements. This dynamic update mechanism allows the sensor fusion module S106 to adjust its unified environmental map generation in response to changing warehouse conditions without necessitating manual intervention or physical access to the unit.

In unmapped zones, the robot primarily relies on data acquired from its onboard sensors. Real-time image data captured by, for instance, an onboard camera similar to S704 and inertial measurements provided via S602 are processed to generate an environmental map on the fly. This dynamically generated map enables the navigation controller S108 to implement reactive path planning strategies and maintain operational integrity in regions that lack prior mapping. Additionally, the robot's onboard processor, such as S600, executes neural network models that integrate sensor inputs to determine optimal navigation decisions while ensuring that obstacle detection and collision avoidance are consistently maintained.

Overall, by leveraging both stored digital map data and real-time sensor information, the robot is versatile enough to maintain operational continuity in both well-characterized mapped zones and previously uncharted or dynamically changing unmapped zones.

In certain embodiments, the robot further incorporates a sensor fusion module configured to integrate data from multiple onboard sensors to create a unified environmental map. This sensor fusion module is specifically configured to suppress false positives caused by extraneous factors such as warehouse signage or reflective tape. By employing dynamic weighting algorithms and filtering techniques, the sensor fusion module effectively distinguishes between true obstacles and benign reflective artifacts, thereby improving the accuracy of environmental perception and ensuring reliable navigation through complex warehouse layouts.

The method operates by first establishing a central task scheduler configured to assess incoming work orders along with the real-time status of each robot within the fleet. In operation, the central task scheduler (for example, as generally represented by reference sign S300) assigns initial tasks selected from transport, picking, or replenishing operations. This initial assignment is based on various factors including each robot's geographic location within the warehouse and the current battery status as monitored via onboard energy modules. The scheduling process evaluates the relative capabilities and current operational state of each robot to ensure efficient task distribution.

After task assignment, a monitoring function continuously gathers operational data detailing the progress of each robot. A monitoring system, such as that generally depicted by reference sign S302, tracks progress in real time. This system records data including, but not limited to, positional updates, task execution statuses, and the detection of unusual conditions within the warehouse environment. The collected operational data is used to detect unexpected delays or hindrances, such as obstacles, temporary blockages, or mechanical faults that impede the completion of an assigned task.

In one embodiment, a central task scheduler is configured to receive real-time location updates from each robot at intervals of less than one second. The robots, each equipped with location-determining sensors and communication modules, transmit positional data over a wireless network to the central task scheduler. Implemented as part of element S300, the scheduler incorporates a processor capable of rapid operation along with associated software routines to continuously handle the incoming updates. By receiving such timely updates, the task scheduler maintains an accurate and near real-time global view of the positions of all robots within the warehouse environment. This accelerated update cycle permits the scheduler to optimize task assignments—such as initial transport, picking, or replenishing tasks—by considering both the current robot locations and their dynamic statuses. The sub-second intervals between updates reduce the delay between data acquisition and task execution decisions, thereby enhancing task coordination and system responsiveness. In embodiments where additional sensor inputs are available, such as energy levels, obstacle information, or environmental conditions, the scheduler employs these inputs to further refine the task allocation process in real time. The wireless communications infrastructure, potentially incorporating a middleware translation layer as defined in S800, ensures compatibility and near-instantaneous data exchange between heterogeneous robots and the central orchestration engine outlined in S802. The precision provided by updates at intervals of less than one second, when combined with the scheduling algorithm, diminishes the risk of task conflicts resulting from outdated position data and permits dynamic reassignment of tasks—such as in response to unexpected delays, robot faults, or sudden changes in the warehouse environment. In some embodiments, the central task scheduler integrates these updates with additional positional data extracted from digital maps (e.g., S706) and sensor fusion outputs, thereby enabling collision avoidance and route optimization routines that further enhance the reliability and efficiency of the overall robotic system.

In embodiments where the system detects that an assigned task remains incomplete because of unforeseen obstacles, robot faults, or other deviations from the planned workflow, the scheduler—integrated within a central task management system—is configured to reassign the incomplete task to another available robot. In these embodiments, the scheduler first identifies the current positions of the robots by processing location data generated from onboard sensors, UWB tag measurements, and fusion processors that combine positional inputs with digital map features. It then calculates the Euclidean distance between the location of the incomplete task and the positions of the available robots to establish a proximity ranking. Based on this ranking, the scheduler prioritizes reassigning the incomplete task to the robot nearest to the task location, ensuring that the reassigned task can be executed with minimal transit time.

In one embodiment, the reassignment decision also incorporates additional operational parameters—such as battery status and predicted energy requirements, obtained respectively from a battery module and an energy optimization controller—to ensure that the selected robot can perform the task without compromising its operational endurance. Once the nearest suitable robot is selected, the scheduler instructs that robot's navigation and drive systems to update its route, incorporating real-time obstacle avoidance strategies derived from a sensor fusion module and a navigation controller.

Thus, by integrating proximity-based prioritization into the task reassignment algorithm, the system achieves greater efficiency in task completion while maintaining a responsive level of operation in dynamic warehouse conditions.

In one embodiment, battery module S400 continuously monitors battery status and, when the charge drops beneath a predetermined threshold, generates a control signal to initiate an automatic task handoff ahead of any shutdown sequence. Onboard sensors S402 constantly record energy consumption for various subsystems—including the drive system, sensor suite, and payload handling components—to supply real-time battery status data to energy optimization controller S404. When controller S404 determines that the battery charge is insufficient for sustaining ongoing operations, it communicates with the central task scheduler, which is responsible for assigning tasks as disclosed in S300, to initiate a reallocation protocol. This automatic task handoff protocol ensures that any incomplete transport, picking, or replenishing tasks are transferred seamlessly to another robot possessing adequate battery charge before the affected robot begins shutdown procedures. The system architecture further reinforces task reallocation by leveraging real-time monitoring from S302 and S304, which continuously assesses task progress to pinpoint the optimal moment for initiating the handoff. Additionally, the decision engine uses current robot location, workload data, and the overall energy optimization framework to select an alternate robot from the fleet in a manner that minimizes workflow disruption. This configuration prevents productivity loss associated with unexpected robot shutdowns from battery depletion, thereby ensuring continuous operational efficiency within the robotic system.

In one embodiment, the scheduler is configured to utilize predicted task completion times based on historical data to enhance task allocation efficiency. The scheduler collects historical performance data corresponding to completed tasks, including recorded durations, delays encountered during execution, and any variance between planned and actual completion times. It then processes the historical data to generate predictive models that estimate the expected completion time of new tasks. For example, when assigning a transport, picking, or replenishing task as described in S300, the scheduler analyzes historical execution metrics specific to the task type and, when available, robot-specific performance trends. The scheduler incorporates statistical analysis techniques such as averaging task durations over multiple prior instances, calculating standard deviations, and applying regression analysis to correlate task complexity factors with overall completion times. In at least one implementation, the scheduler integrates the predicted task completion times into its task prioritization algorithm to dynamically assign tasks to available robots in a manner that minimizes total idle time and balances workload across the fleet. The predicted task completion times then serve to inform subsequent reassignments as described in S304, whereby incomplete tasks that exceed predicted durations are reallocated to robots exhibiting faster or more reliable performance metrics based on the historical data profile. In this manner, the scheduler continuously refines its prediction accuracy over time through a feedback loop where actual task outcomes are compared to the predictions, thereby updating the historical data repository for future scheduling decisions. Consequently, the operational efficiency of the robot fleet is enhanced as tasks are assigned based not only on robot availability and battery status but also on anticipated performance derived from prior operational history.

In one embodiment, the central task scheduler is further configured to account for robot payload capacity when reassigning tasks. In this embodiment, each robot is preprogrammed with payload capacity parameters that define its maximum load-bearing capability and the dimensional constraints of its payload handling system. These parameters, correlated with elements such as S204, are transmitted in real time to the scheduler along with other status information including current location, battery level, and workload. The scheduler then compares the payload requirements of pending tasks with the available payload capacity of each robot. For instance, a task involving the transport of an object with a specified weight and size is only allocated to a robot whose reported payload capacity meets or exceeds the task requirements. In scenarios where a robot initially assigned a task is later determined to have reached its payload handling limits, the scheduler automatically identifies an alternative robot that simultaneously satisfies spatial proximity, battery status, and payload capacity criteria. Furthermore, the scheduler can adjust task parameters or subdivide tasks based on available payload capacity thresholds. This approach ensures that task reassignment is dynamically optimized, thereby minimizing delivery delays and reducing the likelihood of overload conditions on individual robots. The payload capacity data is updated continuously through the robot's onboard processors, ensuring that the scheduler works with the most current and accurate information. As a result, the system is capable of intelligently reassigning and scheduling tasks in a manner that respects both physical constraints and operational efficiency in a warehouse environment.

In one embodiment of one implementation, the scheduler is configured to log each task reassignment event for audit purposes. When a task initially assigned to a mobile robot is determined to be incomplete, the central task scheduler evaluates various factors such as current robot location, battery status, and task progress as monitored in real time by onboard sensors and control modules. Upon detecting delays, robot faults, or obstacles, the scheduler promptly initiates a reassignment of the task to another available mobile robot, as described in earlier embodiments. Concurrently, the scheduler records detailed information regarding each reassignment event into a secure, tamper-resistant log. The logged data includes parameters such as the identifier of the mobile robot originally assigned the task, the identifier of the robot to which the task is reassigned, timestamps corresponding to the start, detection of delay, and reassignment event, as well as the underlying reasons, which encompass detection of unexpected obstacles, changes in environmental conditions, or fault indications from onboard diagnostic modules. In addition, the log entries incorporate supplementary information such as battery levels as reported by associated energy modules, and any relevant energy consumption indicators received from the energy optimization controller. This detailed record facilitates subsequent analysis, enabling system operators to verify the chain of custody for each task, pinpoint potential issues in real-time task management, and ensure compliance with safety and regulatory requirements. The recorded data is also used for trend analysis, predictive maintenance, and as a feedback mechanism to enhance the central orchestration engine's overall task assignment strategy in future operations. Moreover, the audit log is designed to be accessible to authorized personnel via a secure interface, thereby providing a complete audit trail for each reassignment event, which assists in troubleshooting, regulatory audits, and liability assessments.

In one embodiment the scheduler continuously monitors the task queue and tracks the duration each task remains unassigned. When the elapsed time for any task exceeds a predetermined threshold, the scheduler automatically issues a notification to a human supervisor. The predetermined threshold is set based on factors including task urgency, system load, or environmental conditions within the operational environment. The notification is communicated through one or more interfaces such as wireless messaging systems, integration with a central orchestration engine, or an API gateway that enables bidirectional data exchange between the robot control system and warehouse management systems. In certain embodiments the notification mechanism integrates with safety monitoring and energy optimization subsystems so that it also informs the human supervisor with additional context on system performance and operational delays. The scheduler further adjusts the predetermined time interval using real-time feedback including changes in task priority, resource availability, and the presence of unexpected delays or obstacles as detected by onboard sensor suites. Moreover, the notification includes details such as the identification of the affected task, its priority level, and the elapsed time since assignment, thereby enabling the human supervisor to make informed decisions regarding task reassignment or intervention.

In one embodiment, the scheduler communicates directly with a warehouse management system to maintain an up-to-date record of all task statuses assigned to mobile robots. The scheduler is configured to send and receive data through an API gateway that enables bidirectional communication between the warehouse management system and the fleet of robots. As tasks are initiated, modified, or completed, the scheduler transmits updated status information to the warehouse management system, thereby ensuring that centralized logistics data remains current. Similarly, the warehouse management system provides feedback regarding task progress, unexpected delays, or changes in workflow, which the scheduler uses to reassign tasks among available robots. This integration is implemented using a middleware translation layer that converts disparate proprietary control protocols into a standardized communication format, thus facilitating seamless data exchange. The scheduler further leverages this integration to dynamically track individual robot energy levels, location data, and sensor inputs in real time to optimize task allocation and progress monitoring based on both operational status and charging station availability.

In certain embodiments, the central task scheduler is configured to continuously monitor the operating mode of each robot and to avoid assigning tasks to any robot operating in manual override mode. The scheduler obtains manual override status information from the robot's control system or from a dedicated signaling module, which indicates a state in which operator intervention has temporarily superseded autonomous control. In one embodiment, the scheduler receives a manual override flag via a data interface integrated with the onboard safety controller and communications module. The flag is set when the robot enters a state in which manual inputs override automated commands, and the scheduler accordingly excludes that robot from the pool of candidates for task allocation. Furthermore, the scheduler continuously reviews data provided by sensors and controllers, such as those associated with the drive system or control system, to validate the robot's operating mode before dispatching any new tasks. When a robot is detected to be in manual override mode, any tasks previously assigned to that robot are reallocated through the scheduler's task reassignment protocols, ensuring that no conflict arises between manual operation and automated processing. The scheduler is further configured to reassess the operating status of robots at predetermined intervals so that once a robot exits manual override mode and re-enters its autonomous operational state, it becomes eligible for task assignments in accordance with predetermined task prioritization algorithms. This configuration minimizes the risk of operational conflicts and enhances the overall safety and efficiency of automated logistics operations, particularly in dynamic environments where manual intervention is required.

In one embodiment, the scheduler is configured to support over-the-air updates of the task allocation logic. In this embodiment, the central task scheduler is operable to receive logic updates via a secure wireless communication channel from an external update server. The scheduler includes a dedicated update module that receives a task allocation logic package comprising updated parameters, algorithms, and associated executable code designed to optimize task assignment based on real-time system inputs such as robot location, battery status, and workload. The update module is further configured to verify the authenticity and integrity of the received update package by executing digital signature verification and version comparison against the currently installed logic. Upon successful verification, the scheduler dynamically integrates the new task allocation logic into its operational framework without interrupting ongoing operations. In some embodiments, the system incorporates a rollback mechanism whereby, if the new logic fails to perform as expected or introduces operational anomalies, the scheduler reverts to a previously validated task allocation logic configuration to maintain system stability. The over-the-air update functionality is scheduled during periods of reduced operational load to minimize potential process disruptions and enhance overall system reliability, ensuring that the task allocation methodology remains current with evolving warehouse conditions and demands.

In one embodiment, the scheduler is configured to reassign tasks in response to fire alarm or emergency signals received from external systems or onboard sensors. The central task scheduler, which initially assigns transport, picking, or replenishing tasks to each robot based on factors including current location and battery status, continuously monitors for emergency indicators associated with a fire or other hazardous condition. When such signals are detected, the scheduler evaluates the ongoing and pending tasks across the robotic fleet and dynamically reallocates these tasks to alternative robots or suspends noncritical operations so that emergency protocols are promptly enacted. In this regard, the scheduler employs predetermined rules and decision criteria that prioritize tasks in protected zones and avoid areas affected by the incident. Communication of the reassigned tasks is executed over secure channels to ensure that robots immediately receive updated instructions consistent with revised emergency guidelines. In some embodiments, the scheduler coordinates with a central orchestration engine, which further integrates real-time data regarding robot location, available battery power, and proximity to emergency exits or designated protection areas, thereby optimizing the reassignment process. Moreover, the scheduler initiates additional actions, such as triggering audible warnings or speed reductions, to further enhance protection during emergency conditions. The overall system ensures that when a fire alarm or emergency signal is detected, noncritical operations are minimized and the robotic fleet is rapidly redirected to support emergency response measures while reducing the risk to personnel and equipment.

In one embodiment, the central task scheduler is configured to temporarily disable task reassignment during maintenance windows. Under normal operating conditions, the scheduler assigns initial tasks based on current location and battery state, and it monitors real-time progress, reassigning incomplete tasks among available robots when delays or obstacles are detected. However, during scheduled maintenance windows, the scheduler overrides the reassignment functionality so that tasks are not redistributed while individual robots undergo calibration, repairs, or software updates. This temporary disablement is enforced by a state flag recorded in non-volatile memory, which the scheduler continually monitors to uphold the maintenance condition. Communication of the maintenance window status is achieved by interfacing with a middleware translation layer or an API gateway, ensuring that both the scheduler and any automated task reassignor operate with full awareness of the maintenance state. Pending tasks that have not been fully executed are preserved in a queue and are considered for reassignment only after the maintenance window concludes. In some embodiments, the scheduler distinguishes between routine and essential tasks so that a subset of these essential tasks continues during maintenance periods to ensure the continuity of necessary operations. The temporary disabling of task reassignment in this manner reduces the probability of conflicts in control commands, minimizes robot instability, and ensures that maintenance activities proceed without interruption by extraneous operational directives.

The middleware translation layer S800 is configured to convert proprietary robot control protocols into a standardized communication format that supports multiple industrial and robotics communication protocols, including ROS 2, MODBUS, and OPC UA. In one embodiment, the middleware leverages ROS 2 to enable modular, scalable, and real-time communication among distributed robotic nodes, facilitating inter-module communication and integration with sensor data processing, navigation controllers, and task assignment modules. Additionally, the middleware supports MODBUS, which is useful for interfacing with industrial devices and process controllers that require deterministic communication in manufacturing and automation environments. Moreover, the middleware's support for OPC UA provides a secure, platform-independent, and flexible framework for seamless data exchange between robotic systems and higher-level warehouse management systems or enterprise resource planning systems. By incorporating these communication protocols, the middleware translation layer is capable of real-time translation and bidirectional data exchange, thereby ensuring that robotic subsystems such as the central orchestration engine S802 and the API gateway S804 can effectively coordinate heterogeneous robotic agents from multiple vendors. The integrated support for these protocols enhances the ability of the system to adapt to different network configurations and operational requirements by enabling dynamic protocol switching, message standardization, and error handling across diverse communication channels. As a result, the middleware facilitates robust, secure, and efficient communications while maintaining the flexibility required to interface with a wide range of automated systems in a dynamic warehouse or industrial environment.

In one embodiment, the orchestration engine (S802) is configured to dynamically assign tasks to heterogeneous robots based on real-time capability, location, and workload data, wherein the orchestration engine prioritizes tasks requiring collaboration between different robot types. In one implementation, the orchestration engine identifies that certain tasks demand the joint effort of multiple robot platforms—for example, tasks that involve transporting substantial payloads while also requiring precise manipulation or inspection functions—and accordingly assigns these tasks to robots whose combined functionalities optimally satisfy the task requirements. The orchestration engine continuously monitors the status of each robot, including battery levels from the battery module (S400), operational parameters of the drive system (S102, S202), and sensor feedback from the sensor suite (S104) and machine vision module (S206), among others, enabling it to evaluate in real time the suitability of one or more robots for collaborative task execution.

By dynamically prioritizing tasks requiring inter-robot collaboration, the orchestration engine not only optimizes overall fleet efficiency but also ensures that specialized capabilities across different robot types are effectively harnessed, thereby enhancing the responsiveness and adaptability of the automated system in handling complex, real-world warehouse operations.

In some embodiments, the robot further comprises a digital twin configured to simulate robot interactions prior to deployment. The digital twin models one or more aspects of the robot's operational behavior by generating a virtual replica of key subsystems such as the chassis (S100), drive system (S102 or S202), sensor suites (S104, S500), and control modules (S108, S208, S304), thereby enabling prediction of dynamic interactions within a representative operating environment. The digital twin simulates various scenarios, including obstacle-rich environments, inter-robot communications mediated by the middleware translation layer (S800) and central orchestration engine (S802), and energy consumption patterns as monitored by the battery module (S400) and optimized by the energy optimization controller (S404). In certain embodiments, the simulation incorporates advanced algorithms, including neural network models executed by the onboard processor (S600), to replicate real-time task prioritization and navigation decisions based on input from sensor interfaces (S602) and decision engines (S604). The digital twin also generates simulation outputs corresponding to potential failure modes and safety-related events, allowing calibration of safety controllers (S502, S504) prior to physical deployment. Additionally, simulation results are used to update and refine control strategies such as reactive path planning (S904) and obstacle detection using multi-sensor fusion modules, thereby enhancing the robustness of the robot's operational strategies. This pre-deployment simulation framework facilitates early validation of system behaviors under varying conditions, ensuring optimized integration between digital models and physical operations and providing a basis for updating operational parameters dynamically before actual deployment.

In one embodiment, the middleware translation layer (for example, S800) incorporates a machine learning module configured to predict protocol conflicts. The middleware translation layer receives proprietary robot control protocols and converts them into a standardized communication format designed for disparate robots, such as those interfaced via S802. The machine learning module analyzes communication data streams to identify patterns indicative of potential conflicts between competing protocol signals. Techniques including neural networks, decision trees, and reinforcement learning are employed to evaluate historical and real-time communication data, thereby forecasting conflicts before they occur. The middleware continuously monitors parameters associated with protocol transmission—such as message timing, frequency, and payload content—and dynamically adjusts translation logic in response to detected anomalies. When an impending protocol conflict is predicted, the machine learning module triggers adaptive responses within the middleware that include reordering data packets, buffering messages, or temporarily suspending noncritical communications. The middleware is further configured to integrate feedback from additional subsystems, such as those managed by a central orchestration engine (S802), to continuously refine its predictive model. This configuration ensures that the translation layer maintains communication integrity, optimizes throughput, and prevents operational disruptions in heterogeneous robotic environments. The disclosed system consequently benefits from reduced latency in data exchange and increased system reliability by dynamically mitigating protocol conflicts through the integration of machine learning within the middleware.

In one embodiment, the system includes a central orchestration engine that continually monitors the operational status of a plurality of robots. The orchestration engine collects real-time data such as battery levels, positional information, and task progress from robots that include elements such as the onboard processor, network interfaces, and energy monitoring sensors. When the orchestration engine detects a robot failure—whether resulting from mechanical malfunction, sensor faults, or communication interruptions—it immediately initiates a task redistribution protocol. This protocol reassigns the tasks originally allocated to the failed robot to one or more available robots within the system, ensuring that ongoing tasks such as transport, picking, or replenishing continue without significant interruption. The reallocation is performed using predetermined criteria including current location, available battery power, and the real-time workload of alternate robots, thereby maintaining operational continuity throughout the fleet.

In an alternative embodiment, the system supports real-time firmware updates across robots from different brands, ensuring interoperability and up-to-date functionality throughout the allocated fleet. Firmware update packages are designed to accommodate the varying communication protocols of different robot vendors and are transmitted using a secure communication channel. The central orchestration engine coordinates these updates by scheduling maintenance windows during periods of minimal operational demand. During these windows, firmware updates are deployed simultaneously to eligible robots, each of which verifies the integrity of the update upon receipt using onboard processor checks. If an update fails or results in operational instability, the system automatically reverts to a prior firmware version, thereby preserving functionality. This approach enables heterogeneous robots to remain synchronized in terms of system capabilities while ensuring a consistent level of performance and security, thus supporting cross-brand integration in dynamic warehouse environments.

In one embodiment, the communication between subsystems of the robotic system is achieved via a standardized messaging framework, wherein the standardized format is JSON-RPC over MQTT. In this embodiment, a middleware translation layer (S800) is configured to convert proprietary robot control protocols into this standardized format, thereby enabling bidirectional communication among heterogeneous components. The central orchestration engine (S802) leverages this communication protocol to dynamically assign transport, picking, or replenishing tasks to robots based on real-time capability, location, and workload data. The adoption of JSON-RPC over MQTT facilitates lightweight and secure message exchanges between the onboard processor (S600) and peripheral devices such as the sensor suite (S104), the sensor fusion module (S106), and the navigation controller (S108), ensuring that real-time sensor data is reliably transmitted and interpreted by various decision-making modules.

Moreover, individual robots, including those with mobile chassis (S200) and associated drive systems (S202), communicate operational statuses and diagnostic information to remote monitoring stations using the same protocol. The standardized JSON-RPC over MQTT protocol also provides an efficient means for integrating the battery module (S400) with the energy optimization controller (S404), enabling dynamic adjustment of robot operating parameters based on current battery levels and energy consumption data acquired from onboard sensors (S402).

In certain embodiments, the JSON-RPC over MQTT framework extends to interactions with external systems, including warehouse management systems (WMS), via an API gateway provided by the middleware translation layer. This permits a seamless exchange of data such as digital maps (S706) and updated sensor fusion outputs generated by the fusion processor (S708), which, in turn, supports enhanced navigation and obstacle avoidance capabilities defined by the reactive path planner (S904) and transient obstacle classifier (S902).

Furthermore, the standardized protocol underpins safety operations wherein the multi-modal proximity detection suite (S500) and safety controller (S502) communicate with intervention modules (S504) to execute prescribed safety procedures. Communication related to safety overrides, such as those conducted by a behavior-based safety governor (S1204) in response to the detection of human presence by thermal/ToF sensors (S1202) or ultra-wideband personnel tags (S1200), is similarly standardized to ensure rapid and coordinated responses.

Additionally, the integration of the onboard camera (S704) with the fusion processor allows for the extraction and alignment of visual landmarks with stored digital maps, further supporting the generation of corrected robot coordinates. These operations, executed within the context of the standardized JSON-RPC over MQTT messaging framework, facilitate a coherent and robust mechanism for disseminating updated positional and hazard-related data throughout the robotic system.

A robot system is provided that incorporates multiple interconnected subsystems, including a chassis S100 coupled with a drive system S102, a sensor suite S104 that comprises a LiDAR sensor, a stereo vision camera, and an ultrasonic sensor, a sensor fusion module S106 for generating a unified environmental map, and a navigation controller S108 responsible for planning and executing collision-avoiding paths in real time. In various embodiments, the system further comprises a mobile chassis S200 with an associated drive system S202, and an adaptive payload handling system S204 that includes a telescopic lift and a variable-width gripper. The machine vision module S206 and the control system S208 are configured respectively to identify item dimensions and orientations and to adjust the telescopic lift height and gripper width accordingly. Task management is achieved by a central task scheduler S300 that assigns initial transport, picking, or replenishing tasks based on current location and battery status, with continuous monitoring S302 and automatic reassignment S304 to address delays or robot faults. Energy management is enhanced by a battery module S400, a set of onboard sensors S402 monitoring consumption by subsystems including drive motors, and an energy optimization controller S404 that dynamically adjusts operating parameters based on battery level, anticipated energy requirements, and charging station availability.

Additional safety and operational features are provided by a multi-modal proximity detection suite S500, a safety controller S502 detecting human presence within a predefined zone, and an intervention module S504 that executes speed reductions, audible warnings, or emergency stops in response to human proximity. An onboard processor S600 executing a neural network model, a sensor interface S602, and a decision engine S604 further enable optimal decision making without continuous communication with a central server. Localization is achieved through an ultra-wideband tag S700, multiple UWB anchors S702, an onboard camera S704 capturing real-time images, a digital map S706, and a fusion processor S708 that integrates UWB coordinates with visual landmark alignment data from modules S710, S712, S714, and S716. A middleware translation layer S800 interconnects robotic subsystems by converting proprietary protocols, while a central orchestration engine S802 and an API gateway S804 facilitate dynamic task assignment and bidirectional communication with warehouse management systems. Additional embodiments include a multi-sensor fusion module S900 using LiDAR, event cameras, and mmWave radar, a transient obstacle classifier S902 employing spatial-temporal graph neural networks, and a reactive path planner S904 generating collision-free trajectories rapidly. Further mechanical and operational interchangeability is provided by a magnetic coupling interface S1000, swappable toolheads S1002 with RFID-encoded capability profiles, and a vision-based toolhead verification system S1004. Wireless charging components S1100, a digital twin S1102 for simulating energy consumption patterns, and an auction-based charging scheduler S1104 minimize fleet downtime. Personnel safety is addressed through ultra-wideband personnel tags S1200, robot-mounted thermal/ToF sensors S1202 detecting humans in blind spots, and a behavior-based safety governor S1204 that overrides robot actions near humans.

In one embodiment, one implementation incorporates role-based access control for vendor-specific parameters to ensure system integrity and secure operation. This mechanism restricts access to vendor-specific configuration parameters so that modifications and retrievals are allowed exclusively for authorized users and subsystems. For instance, when interacting with the central orchestration engine S802 or the middleware translation layer S800, designated user roles validated by secure authentication protocols determine if vendor-supplied parameters, such as those employed in sensor calibration or toolhead operation, are accessed or modified. Authentication utilizes credential verification, token-based systems, or cryptographic measures like digital signatures, thereby ensuring that only authorized system integrators or maintenance personnel can effect changes. The vendor-specific parameters are stored in a secure, auditable repository, and the role-based access control integrates with the API gateway S804, so that external communications involving these parameters remain secure against unauthorized access.

Further, the embodiment leverages role-based access control within a digital twin environment S1102, which simulates energy consumption patterns and coordinates with the auction-based charging scheduler S1104. The simulation uses real-time data from components such as the battery module S400 and the energy optimization controller S404, and any alterations to vendor-specific parameters that could affect operational performance are subjected to the same strict role-based permissions. In multi-vendor settings, a hierarchical database structure maintains vendor-specific parameter sets, with the role-based access control mechanism ensuring that each vendor's configuration data is protected and remains consistent throughout system updates. In particular, when a new toolhead with RFID-encoded capability profiles S1002 is deployed, the role-based access control mechanism necessitates re-authentication and validation from the appropriate roles before any calibration or parameter adjustments are integrated into the system.

By integrating role-based access control for vendor-specific parameters into the broader system architecture, one implementation ensures enhanced security, robust interoperability, and reliable performance across heterogeneous multi-vendor wireless and wired networks. This integration safeguards system operations in dynamic environments where multiple robotic subsystems and external interfaces coexist, thereby maintaining the overall integrity and optimized performance of the warehouse automation system.

In some embodiments, each robot is configured to self-report its operational capabilities through the API gateway, thereby facilitating real-time fleet management and dynamic task assignment. The robot comprises a chassis, a drive system, and one or more sensor suites that include elements such as a LiDAR sensor, a stereo vision camera, and ultrasonic sensors. These robots are further equipped with onboard processors that execute neural network models to prioritize tasks and make navigation decisions. Each robot is in communication with the API gateway, which provides bidirectional data exchange between the robots and the warehouse management system, enabling the robots to report parameters such as battery level, sensor status, and toolhead capabilities. This self-reporting feature supports the seamless integration of heterogeneous robots into a unified automated system, ensuring that each robot's current state is readily available for central orchestration.

Furthermore, the system incorporates congestion-aware task routing to avoid traffic jams in the operating environment. In embodiments employing this routing method, a central task scheduler dynamically assigns tasks to individual robots based on their self-reported statuses, current locations, and real-time energy consumption data collected from onboard sensors. The task scheduler continuously monitors the progress of each robot and detects areas where increased robot density leads to congestion. Upon identifying these areas of potential congestion, the central orchestration engine reassigns tasks and adjusts robot routes using predictive energy optimization and real-time sensor fusion data, such that alternative collision-free trajectories are generated within predefined time intervals. In some instances, the decision engine integrates data from sensor interfaces for LiDAR, vision, and inertial sensors to calculate optimal navigation pathways that minimize the influence of potential traffic bottlenecks. This congestion-aware routing algorithm thereby optimizes the flow of robots throughout the warehouse, ensuring that individual robots maintain efficient operation without encountering delays caused by restricted movement or overlapping trajectories.

The disclosed embodiments thus integrate self-reporting capabilities via the API gateway with congestion-aware task routing, allowing for optimized resource allocation and heightened operational efficiency in environments where many autonomous robots are active.

In addition, the system integrates a blockchain infrastructure that enables auditable and secure cross-vendor operations. This blockchain integration records transactions and operational events generated during task assignments and energy optimization, thereby providing an immutable ledger for tracking system performance and compliance. By leveraging blockchain technology, the system ensures that data exchanged across proprietary control protocols—as translated by middleware translation layer S800—and robot vendors adheres to strict security, traceability, and non-repudiation standards. This integration supports auditability in environments where robots from multiple vendors collaborate, and it guarantees that all operational decisions, including energy optimization strategies employed by the orchestration engine, are verifiable and transparent to stakeholders.

In another embodiment, the system is deployed using a hybrid cloud-edge architecture. In this setup, a portion of the processing tasks, such as real-time sensor data fusion from components like the sensor suite (S104) or multi-sensor fusion modules such as S900, is executed locally on the robot or an associated edge device. More computationally demanding functions, including advanced task scheduling by the central orchestration engine (S802) or data analytics, are offloaded to a cloud computing environment. By distributing processing tasks between the cloud and edge, the system optimizes network bandwidth, reduces latency in time-sensitive functions, and enhances overall system resilience. The orchestration of task allocation between cloud and edge resources enables the system to adjust dynamically to changing network conditions and operational requirements.

In further embodiments, the communication network supporting multi-robot operations incorporates an anomaly detection module to monitor cross-robot communications. This module continuously analyzes data traffic among robots to identify deviations from expected communication patterns, flagging potential malfunctions or security breaches. The module is configured to employ a combination of rule-based algorithms and machine learning techniques to scrutinize data exchanges, detect discrepancies, and discern irregularities in the timing, content, or frequency of messages. Upon detection of an anomaly, the system initiates a predefined response protocol that includes generating alerts, isolating the affected communication channel, or automatically reassigning tasks to unaffected robots to maintain the integrity and continuity of operations. This integrated approach to anomaly detection enhances system reliability by ensuring prompt identification and remediation of potential issues across the robotic network.

In one embodiment, the system includes a plurality of robots configured to negotiate task ownership via smart contracts. Each robot is equipped with communication interfaces that enable direct peer-to-peer interactions, supporting the decentralized determination of task allocation without reliance on a centralized task scheduler. When a task is initiated—such as transport, picking, or replenishing—the associated parameters, including geographic location, battery level, and payload handling requirements, are encoded along with task performance criteria into a smart contract proposal. These proposals are broadcast to nearby robots, each of which independently evaluates its current operational state and capabilities against the proposed task requirements. Upon receipt of a proposal, a robot signals its willingness to assume the task by digitally signing the smart contract, thereby committing to the task upon fulfilling pre-established performance benchmarks.

The smart contracts include dynamic clauses that allow terms to be modified in response to environmental changes detected by onboard sensor suites, such as S104 and S500, and control parameters updated by sensor fusion modules like S106. In addition, the negotiation process leverages decentralized ledger technologies to ensure that all task ownership decisions are recorded immutably, providing traceability and security through cryptographic verification. The negotiation and subsequent assignment of tasks are further enhanced by autonomous decision engines, such as S604, which allow robots to select optimal actions based solely on current sensor data and task priorities. This distributed approach minimizes wait times for task assignment and reduces the impact of unexpected obstacles or delays, thereby improving overall system efficiency.

Furthermore, the smart contract mechanism supports dynamic reallocation of tasks in real time; if a robot that has initially committed to a task becomes incapacitated or experiences a significant deviation from expected performance parameters, the terms embedded in the smart contract allow for immediate reassignment to an alternate robot that satisfies the task requirements. In this manner, robots continuously negotiate task ownership among themselves, allowing for real-time adaptation to transient warehouse conditions and optimizing task distribution across a heterogeneous fleet.

The sandbox environment is configured to provide a controlled testing arena that emulates the operational network and allows for thorough evaluation and debugging of communication protocols prior to deployment. This environment isolates protocol interactions from the live system to ensure that any adjustments, enhancements, or fault conditions can be safely tested without impacting ongoing operations. In one embodiment, simulated inputs from heterogeneous robots are routed through the sandbox, which replicates conditions such as dynamic changes in robot capability, location, and workload. The sandbox environment is designed to integrate with the middleware translation layer (S800) such that proprietary control messages are accurately converted and validated against standardized network messages. Additionally, the sandbox supports the injection of simulated delays, interruptions, and error conditions to evaluate the robust performance of the central orchestration engine (S802) and the API gateway (S804) under adverse conditions.

In one embodiment, the robot navigation system for unstructured warehouses comprises a multi-sensor fusion module (S900) operable to receive and combine data from a LiDAR sensor, one or more event cameras, and a mmWave radar. The multi-sensor fusion module is configured to correlate sensor data inputs to generate a unified situational awareness of the robot's operational environment, thereby improving detection accuracy and robustness under varying operational conditions. The system further comprises a transient obstacle classifier (S902) that employs spatial-temporal graph neural networks to analyze the fused sensor data. The classifier is configured to differentiate between static background structures and transient obstacles that dynamically appear within the robot's navigation path. Upon detection of transient obstacles, the system utilizes a reactive path planner (S904) operable to generate collision-free paths. The reactive path planner is specifically designed to compute and update trajectories in real time, with a target response time of within 200 ms from the point of obstacle detection. The integration of these modules enables the robot to navigate complex and unpredictable warehouse environments effectively by continuously adjusting its path based on real-time sensor inputs and obstacle classification outcomes.

In one embodiment, a classifier implemented within the onboard processor is configured to analyze sensor data and distinguish between humans and inanimate objects with an accuracy exceeding 99%. The classifier operates by processing inputs received from one or more sensing devices, such as LiDAR, stereo vision, and ultrasonic sensors, and further refines its decision using thermal imaging data when available. The algorithm underlying the classifier is based on a convolutional neural network trained on extensive datasets comprising diverse human appearances and various non-human objects under different environmental conditions. During training, the classifier undergoes rigorous validation that includes exposure to varying illumination conditions, occlusions, and background complexities, ensuring robust performance across a wide range of real-world scenarios. The classifier calculates feature maps that represent key attributes indicative of human form, including but not limited to shape contours, motion signatures, and thermal gradients, which are compared against analogous features extracted from inanimate objects. These feature maps are processed through multiple layers of the neural network where weight parameters are adjusted via backpropagation, yielding an optimized network that consistently achieves effective discriminatory performance.

The classifier also benefits from sensor fusion techniques whereby data from multiple sensing modalities are integrated to reduce ambiguities and improve detection confidence. This fusion process leverages the precise spatial information from the LiDAR sensor in conjunction with visual cues from the stereo vision camera and proximity data from the ultrasonic sensor, ultimately enhancing the confidence level in classification decisions. Furthermore, the algorithm incorporates adaptive thresholding mechanisms that dynamically adjust decision criteria based on contextual factors such as ambient illumination conditions, sensor drift, and temporal variations in the observed scene. By continuously recalibrating these thresholds in real time, the classifier maintains its performance even in the presence of fluctuating environmental variables.

Additionally, the output of the classifier can be used to trigger subsequent safety-related actions, such as engagement of a safety controller or intervention module, thereby ensuring that detection of a human within a predefined safety zone prompts immediate protective responses. Overall, the classifier's ability to accurately differentiate between humans and inanimate objects is essential not only for effective operational functionality but also for ensuring compliance with stringent safety requirements in environments where human and robotic activities coexist.

In one embodiment, the path planner includes a velocity obstacles module that computes velocity vectors designed to avoid collisions based on the current positions and velocities of dynamic obstacles. By analyzing the relative motion of nearby objects, the path planner determines a set of forbidden velocity vectors corresponding to potential collisions and computes an alternative velocity that bypasses these collision cones while still progressing toward the target destination. The velocity obstacles module operates by first constructing a velocity space in which each detected obstacle is represented as a region defined by its relative velocity and motion uncertainty. When the robot's current velocity lies within one of these regions, the system determines an adjusted velocity located outside these regions that minimizes deviation from the desired trajectory.

The system further incorporates predictive modeling of obstacle movement patterns. In this implementation, the system leverages historical and real-time sensor data to forecast the future trajectories of detected obstacles. The predictive model utilizes statistical analysis and machine learning techniques to estimate the likely movement patterns over a defined future time window. These forecasts include not only current positions but anticipated changes in speed or direction, allowing the velocity obstacles module to proactively adjust its computations.

The integration of the velocity obstacles methodology with the predictive modeling approach significantly enhances the system's capacity to dynamically avoid collisions in environments with rapidly changing conditions. By continuously updating velocity obstacles using both immediate sensor inputs and predictions of obstacle behavior, the path planner can generate collision-free trajectories in real time. Meanwhile, the predictive modeling component refines the avoidance strategy by providing anticipatory corrections to the robot's path, a feature that proves especially effective in congested or highly dynamic operational scenarios.

This integrated approach ensures that the robot can navigate through complex environments without compromising its operational integrity, accommodate sudden changes in obstacle movement patterns, and maintain efficient progress toward its intended target. The system thus provides a robust solution for dynamic collision avoidance in applications where both reactive and predictive capabilities are essential for secure and efficient performance.

In one embodiment, sensors such as the LiDAR sensor, stereo vision camera, and ultrasonic sensor disclosed in S104 are mounted on articulated joints to mitigate occlusion. In this embodiment, the sensors are secured to a support structure that comprises one or more movable joints, each configured to provide multiple degrees of freedom. Incorporating these articulated joints enables the sensors to be repositioned dynamically relative to the chassis S100, thereby facilitating adjustments to sensor angles and orientations to overcome obstacles that partially or fully block the sensor's field of view. In various implementations the joints are actively driven by actuators, which allow the sensors to pivot in both horizontal and vertical axes in response to commands generated by the navigation controller S108 or the sensor fusion module S106. This dynamic repositioning permits real-time adjustment of the sensor suite's positioning when an occlusion is detected, ensuring that essential environmental data are acquired without degradation due to physical obstructions. The control system continuously monitors the sensor outputs and, upon detecting discrepancies or reduced signal quality indicative of occlusion, commands the respective articulated joints to adjust the sensor's orientation. These adjustments are facilitated by preprogrammed calibration routines that account for energy optimization and task-specific operational requirements as determined by onboard processing elements such as the onboard processor S600 and the decision engine S604. The repositioning feature further ensures that the unified environmental map generated by the sensor fusion module S106 remains accurate and up-to-date, despite varying operational conditions in complex environments. In addition, the mechanical configuration of the articulated joints includes features that allow the sensors to return to an optimal default position once the occlusion has been mitigated, thereby maintaining consistent sensor performance during continuous operation. This arrangement significantly enhances the overall reliability of situational awareness and obstacle detection capabilities in environments where dynamic changes and physical obstructions are common.

The acoustic sensors are selected and arranged such that they complement the other sensors by providing additional environmental data in frequency ranges where optical sensors have diminished performance. In one embodiment, the acoustic sensors function by emitting sound pulses and measuring the time delay and intensity of the reflected signals. The resulting acoustic data is processed to compute range estimates and relative object positions, which are then fused with range and image data from the other components of the sensor suite S104. The sensor fusion module S106 employs algorithms that consider ambient noise levels and potential interference, ensuring reliable detection of hidden obstacles even when traditional sensor modalities provide incomplete views.

Furthermore, the navigation controller S108 utilizes the unified environmental map output by S106 to plan and execute obstacle-avoiding paths in real time. The incorporation of the acoustic sensors strengthens the overall robustness of the system by providing redundancy in sensor inputs, particularly under conditions of reduced visibility or in environments with reflective materials that can lead to ambiguous or insufficient conventional sensor data. Consequently, the integration of acoustic sensors contributes to enhanced situational awareness and ensures safer, more reliable autonomous navigation in complex warehouse environments.

In some embodiments, calibration of the acoustic sensors occurs periodically or continuously based on dynamic environmental feedback to adjust sensitivity thresholds and filtering parameters. These adjustments are executed by the onboard processor S600, which runs calibration routines that account for changes in ambient noise or modifications in obstacle distribution. The calibration data is further utilized by the decision engine S604 to ensure that the sensor fusion process remains optimized for current operational conditions, thereby enhancing detection accuracy for obscured obstacles.

In one embodiment, the system comprises a navigation planner that continuously monitors sensor inputs derived from the sensor fusion module and other onboard sensors to assess the robot's surrounding environment. During operation, the planner evaluates multiple potential trajectories and, in instances where the robot is confronted with a deadlock scenario, prioritizes escape paths that offer minimal obstruction and enhanced safety. The escape path strategy is activated upon detection of a configuration where standard planned routes are impeded by obstacles. In such scenarios, a dedicated deadlock detection routine prompts the planner to shift focus toward paths that enable the robot to extricate itself from the impasse while maintaining operational stability. The planner's decision-making process integrates dynamically weighted sensor data—such as that originating from LiDAR, stereo vision, and ultrasonic sensors—to determine the viability of escape routes in real time.

Additionally, the system incorporates an automatic recalibration functionality triggered by sensor impacts. When the sensor suite detects unexpected physical impacts or disruptions, an impact detection signal initiates a recalibration sequence. This sequence automatically resets sensor baselines and realigns sensor configurations to compensate for any deviations caused by the impact. The recalibration process is managed by the onboard processor in conjunction with the sensor interface and ensures that sensor outputs remain accurate and reliable. The automatic recalibration feature minimizes downtime and prevents cumulative errors in environmental mapping and path planning, thereby ensuring uninterrupted and robust operational performance.

The neural network is trained on synthetic warehouse obstacle datasets that mirror various dynamic and static impediments encountered in typical warehouse environments. By leveraging synthetic datasets, the training process incorporates a wide assortment of obstacle geometries, spatial arrangements, and operational conditions that might be observed during routine and atypical warehouse operations. The synthetic datasets include simulated elements representing shelving, pallets, machinery, and other structures that could obstruct navigation, thereby providing the neural network with exposure to a broad range of conditions. Augmented training techniques are used to boost the network's robustness against variations in illumination, occlusion, and background clutter, ensuring that the system is capable of accurately predicting and responding to obstacles promptly. Furthermore, the system, as detailed, incorporates a processor configured to generate 3D occupancy grids that are refreshed at a frequency of 30 Hz. These 3D occupancy grids offer a volumetric representation of the robot's surroundings by continuously mapping obstacles and clear areas within the warehouse environment. The rapid update rate of 30 Hz enables near real-time responsiveness in path planning and obstacle avoidance, thereby allowing the navigation controller to alter trajectories dynamically and efficiently as the robot advances. The integration of the neural network trained on synthetic obstacle datasets with the frequently updated occupancy grid system significantly improves the overall reliability and accuracy of the robotic navigation system, ensuring optimal performance even under swiftly changing operational conditions.

Altogether, this integrated system combines robust sensor capabilities, dynamic energy management, advanced task scheduling, and a comprehensive safety strategy—including haptic feedback for obstacle proximity—to reliably and safely operate within complex warehouse environments, ensuring efficient task execution while maintaining top-tier safety standards for both human operators and robotic systems.

In one embodiment, the system comprises a planner configured to minimize jerk during evasive maneuvers, thereby reducing abrupt acceleration changes that could contribute to excessive mechanical stress or compromise the chassis's stability. In another embodiment, the system incorporates a failure-prevention mechanism that initiates a freezing procedure when the confidence level of the sensor data used for navigation and decision-making falls below 90%, ensuring that the robot does not operate under uncertain conditions. Additionally, the system is configured to integrate data derived from a digital twin of the warehouse environment, providing contextual information that enhances the accuracy of spatial mapping and improves the planning of obstacle-avoiding paths. When integrated, these features increase the overall reliability and operational security of the mobile robot during its activities within dynamic warehouse environments.

In one embodiment, the classifier identifies spill types (liquid/solid) by processing sensor data from one or more modules, such as the onboard camera (e.g., S704) and complementary sensors. The classifier operates by extracting features from captured images and sensor measurements to differentiate between the reflective, flowing characteristics typically associated with liquid spills and the static, particulate nature of solid spills. The classifier employs a trained neural network model, executed on the onboard processor (e.g., S600), to analyze these features and determine the spill classification. In embodiments where multiple sensor modalities are available, data from thermal or ToF sensors is fused with visual data to enhance discrimination accuracy under varying environmental conditions, particularly when lighting or surface textures complicate visual analysis. The classifier further refines its decision-making process by dynamically adjusting the weighting of sensor inputs based on ambient conditions and historical data, ensuring robust performance even in challenging scenarios. Upon identifying the nature of the detected spill, the classifier outputs a designated label corresponding to either a liquid or solid classification, which informs subsequent remedial actions or alerts within the automated system. This classification process includes pre-processing steps such as noise reduction and background subtraction, followed by feature extraction that captures relevant spill attributes such as edge definition, texture, and movement dynamics, with thresholds calibrated to reduce misclassification, especially in edge cases where characteristics of liquid and solid spills overlap. The outcome of this process facilitates immediate response strategies, such as deploying appropriate cleaning mechanisms or activating targeted notifications to a supervisory control system, thereby enhancing system safety and operational efficiency.

In one embodiment, the robotic system is enhanced with a drone-assisted overhead obstacle mapping module. In this embodiment, an unmanned aerial vehicle (UAV) is deployed over portions of the workspace to capture aerial imagery and sensor data corresponding to overhead obstacles. The UAV is equipped with its own sensor suite, including an imaging device or LiDAR sensor similar to S104, to acquire data regarding obstacles not readily observable by ground-based sensors. The obtained overhead data is transmitted to a processing module where it is analyzed and integrated into the unified environmental map generated by the sensor fusion module S106. This integration provides an augmented data set that assists in planning trajectories that account for overhead hazards, thereby reducing the risk of collisions with obstacles that extend above the typical sensor field of view of ground-level robots.

In another embodiment, the system is further augmented with a collaborative obstacle marking functionality between robots. In this configuration, each mobile robot, equipped with its own sensor suite and navigation controller S108, communicates detected obstacles in real time to surrounding robots and a central orchestration engine S802. Each robot marks obstacles using its onboard sensors and shares precise coordinate data through an established communication protocol. The collaborative obstacle marking process confirms potential obstacles via multiple perspectives, leading to an enhanced and dynamically updated environmental map. This cooperative method minimizes redundancy in sensor scanning, optimizes navigation decisions, and facilitates faster route adjustments to avoid hazards identified by any single unit operating within the fleet.

In another aspect, the system is configured to adapt sensor operation in response to variable ambient conditions encountered during operation. This is achieved through an adaptive sensor performance module that continuously monitors environmental illumination and adjusts sensor parameters to optimize image quality and detection accuracy. For example, under conditions of diminished ambient illumination or excessive glare, the control system modulates exposure settings, signal gains, or introduces supplemental illumination to ensure that the stereo vision camera and other optical sensors consistently provide precise data. Such dynamic adjustments also encompass calibration routines that maintain consistency in sensor outputs, ensuring that the data fed into the sensor fusion module S106 remains reliable for obstacle detection and navigational decision-making in diverse environmental conditions.

In one embodiment, the navigation planner is configured to incorporate human social distancing zones into its path planning algorithms. The planner continuously receives real-time data from onboard sensor suites and protection controllers that identify the presence and location of human workers within the operational environment. Based on these inputs, the planner dynamically calculates trajectories that maintain predefined separation distances to ensure compliance with social distancing requirements. In a typical implementation, the unified environmental map, generated by sensor fusion modules from multiple modalities, is augmented with geographically defined social distancing zones.

These zones represent areas in which the robot must slow down or alter its course to prevent encroachment. The planner then integrates these additional constraints into its obstacle-avoidance and route-optimization computations by adjusting cost functions and path metrics to favor routes that remain entirely outside of the designated zones.

In another embodiment, the system is further enhanced with a self-diagnosis capability for sensor degradation. This diagnostic feature continuously monitors the performance of key sensor components both in real time and over extended operational periods. The onboard processor, in tandem with the sensor interface and decision engine, compares current sensor outputs to baseline performance standards to assess deviations that could indicate sensor degradation. For example, variations in the accuracy of distance measurements from LiDAR sensors or inconsistencies in image data from vision modules trigger the self-diagnosis routines. Upon detecting any performance anomalies that exceed predefined thresholds, the system initiates corrective actions such as recalibration, adjustments to sensor fusion weights, or the issuing of maintenance alerts. In some embodiments, redundant sensor inputs are cross-referenced to further corroborate the suspected degradation, ensuring that any identified issues do not compromise the system's ability to accurately map the environment and execute navigation decisions in dynamic, human-populated environments.

Complementing the coupling interface are swappable toolheads that include grippers, vacuums, forks, or other functional attachments designed for diverse warehouse handling tasks. Each toolhead is equipped with an RFID-encoded capability profile (S1002) that communicates specific operational parameters and compatibility requirements to the onboard control system. This encoded profile enables the system to automatically recognize the type of tool attached and adjust robot operation accordingly, allowing a seamless transition between different payload operations without manual intervention.

The disclosed system includes swappable toolheads configured to self-calibrate upon attachment to the chassis assembly. Upon engagement, the toolhead, which incorporates RFID-encoded capability profiles, initiates an internal calibration routine that aligns its sensors and mechanical interfaces with control system parameters. In one embodiment, once the toolhead attaches to the docking mechanism, electrical contacts and proximity sensors detect the event, triggering a self-calibration sequence that adjusts positional offsets, compensates for minor misalignments, and verifies secure mechanical coupling. This calibration routine ensures that the toolhead operates within predetermined performance tolerances and communicates verified operational status to the control system.

Further, the system is enhanced by incorporating force/torque sensing for adaptive grip control. In this embodiment, integrated force/torque sensors located at the interface between the toolhead and the payload handling assembly continuously monitor the mechanical loads during gripping operations. The sensor readings are processed by the control system, which dynamically adjusts the grip force in response to variations in the physical properties of the object being handled. Any unexpected changes in measured forces trigger an adaptive control response to mitigate potential object slippage or damage, thereby enhancing both the safety and reliability of the handling operation. The control logic utilizes these sensor inputs to modulate the actuation of the drive motors controlling the gripping mechanism, ensuring that the applied force remains within optimal thresholds for secure handling.

The combination of the self-calibrating toolhead and the integrated force/torque sensing module creates a robust tool attachment and handling system that maximizes operational efficiency by reducing downtime from recalibration and minimizing error risks during payload manipulation. This configuration enables seamless task transitions and effective interaction with various types of payloads, as the system autonomously adapts grip parameters based on real-time sensor data while ensuring consistent calibration after each toolhead exchange.

In various embodiments, toolheads—including swappable toolheads such as S1002—are configured to harvest energy during operation. During normal operation, integrated energy harvesting components convert ambient mechanical or thermal energy into electrical energy, which supplements toolhead power requirements or is stored for later use. This energy harvesting process operates concurrently with the toolhead's primary functions, thereby enhancing overall system efficiency without impeding operational performance.

In further embodiments, the system—such as that described—supports hot-swapping of toolheads without incurring robot downtime. In this configuration, the mobile robot employs a magnetic coupling interface (S1000) and a vision-based toolhead verification system (S1004) to facilitate rapid toolhead transitions. The design enables an operator to remove and replace a toolhead during active operation, and the control circuitry seamlessly integrates the new toolhead's capability profile without disrupting any ongoing tasks. This hot-swapping feature ensures that workflow continuity is maintained even when toolhead changes are required mid-operation.

Additionally, embodiments of the system provide predictive toolhead recommendations based on upcoming tasks. The mobile robot utilizes a combination of onboard sensors, task prioritization algorithms, and predictive analytics to assess the requirements of forthcoming tasks. In this manner, the system intelligently recommends the most appropriate toolhead from a pool of swappable toolheads, taking into account factors such as the energy harvesting capabilities of the toolheads, task-specific performance parameters, and real-time operational data. This predictive functionality optimizes task performance by ensuring that the toolhead best suited for the upcoming operation is readily available, thereby further minimizing downtime and improving overall task execution efficiency.

The grippers incorporate jamming transition materials that enable adaptive shape conformation to objects of varying geometries. In one embodiment, the gripper comprises a flexible enclosure containing particulate matter that is free to move within a sealed chamber. When a vacuum is applied or pressure is otherwise modulated, the particulate matter transitions from a fluid-like state to a more rigid, semi-solid state. This jamming transition, achieved through controlled external stimuli, enables the gripper to dynamically conform its contact surfaces to the contour of an object, yielding a grasp that enhances both stability and load distribution. The adaptive behavior of the gripper is further optimized by sensor inputs derived from a sensor suite, similar to S104, which includes LiDAR, stereo vision, or ultrasonic sensors. These sensors provide real-time data regarding the size, shape, and spatial orientation of the object to be manipulated. Subsequently, the onboard control system, which incorporates elements such as the energy optimization controller (S404) and the onboard processor (S600), processes the data and adjusts the pressure control mechanism governing the jamming transition material.

In another embodiment, the system incorporates RFID-encoded capability profiles within the swappable toolheads, as described in S1002, permitting the central control system to automatically determine the appropriate actuation parameters for the jamming transition. The control system, potentially interfacing via the API gateway (S804) and central orchestration engine (S802), factors in the task requirements, object characteristics, and current operating conditions to alter the state of the jamming material. This dynamic adaptation is particularly beneficial in applications where the payload handling system must reliably engage items of irregular or unpredictable shapes while minimizing the risk of slippage or damage.

By incorporating jamming transition materials into the grippers, the system is equipped with a versatile and reliable means of adapting to a wide array of object geometries. This adaptability boosts the overall operational efficiency of the payload handling system (S204) and significantly contributes to augmented performance and flexibility in automated robotic operations within complex environments.

In one embodiment, a mobile chassis S100 includes a drive system S102 designed to move the chassis and a sensor suite S104 incorporating a LiDAR sensor, a stereo vision camera, and an ultrasonic sensor for environmental perception. The sensor fusion module S106 receives data from the sensor suite S104 and dynamically weights sensor inputs in response to detected warehouse conditions to produce a unified environmental map. A navigation controller S108 utilizes this unified environmental map to plan and execute real-time, obstacle-avoiding paths.

In another embodiment, an adaptive payload handling system S204 is integrated with the mobile chassis S200. The adaptive payload handling system S204 comprises a telescopic lift, a variable-width gripper, and anti-vibration mounts for fragile items. These anti-vibration mounts are engineered to absorb and dampen excess kinetic energy encountered during transport, thereby reducing potential damage to fragile items. When handling fragile items, the machine vision module S206 identifies their dimensions and orientation, and the control system S208 adjusts both the telescopic lift and gripper width accordingly while engaging the anti-vibration mounts to provide enhanced stability. The anti-vibration mounts operate by isolating the payload from shock and vibrations transmitted through the drive system S202 and other subsystems during rapid movements or over uneven surfaces, thereby enabling reliable handling of delicate items without compromising the operational speed or accuracy of the mobile robot.

Additionally, the system incorporates feedback from onboard sensors, such as those included in the plurality of onboard sensors S402, to dynamically adjust the damping characteristics of the anti-vibration mounts in response to detected energy consumption and vibration levels, ensuring optimal conditions for payload integrity during transit.

In one embodiment, the system includes at least one vacuum toolhead configured to dynamically adjust its suction force based on the porosity of a surface. The vacuum toolhead incorporates a control module that continuously receives data from embedded sensor elements which measure the porosity of the engaged surface. These sensor elements include pressure sensors, optical sensors, or other proximity detectors that generate signals indicative of the material properties of the surface. Based on the sensor readings, a closed-loop feedback mechanism modulates the suction power to optimize performance; for instance, when the surface is determined to be highly porous, the system reduces suction to prevent excessive material uptake or clogging, whereas for less porous surfaces, the suction force is increased to ensure adequate adhesion or material removal.

In addition to adjusting suction based on surface porosity, the toolhead is further enhanced by an integrated health monitoring system. This system uses embedded sensors to continuously assess key operational parameters of the toolhead, such as motor performance, actuator strain, and sensor functionality. The health monitoring system detects deviations from predetermined performance thresholds and, upon identifying a potential fault or degradation, triggers alerts for maintenance or automatically adjusts operating parameters to mitigate issues. This dual functionality of dynamically adjusting suction in response to surface porosity while simultaneously monitoring the status and health of the toolhead ensures optimized performance and reliability of the robotic system during operation.

In one embodiment, the magnetic coupling interface S1000 is designed to provide a holding force above 150 newtons, thereby ensuring secure attachment between the mobile robot and its associated toolhead or payload. The coupling consists of a set of permanent magnets arranged to produce a magnetic field capable of maintaining a coupling force greater than the prescribed threshold even under dynamic load conditions. The design incorporates auto-alignment features that facilitate precise engagement with a corresponding ferromagnetic surface, reducing misalignment from lateral or angular forces encountered during normal operation. To achieve and sustain the required holding force, materials with elevated coercivity are employed, and the magnet configuration is optimized to maximize the effective contact area while minimizing flux leakage. During operation, the magnetic coupling is tested under simulated load conditions to verify that its holding force consistently exceeds 150 newtons, thereby providing a robust mechanical connection for secure toolhead attachment. This enhanced coupling strength is particularly beneficial in applications where the mobile robot must operate under variable dynamic loads or experience rapid deceleration, ensuring that the coupled components remain securely attached throughout the task cycle.

In one embodiment, the system includes autonomous toolhead storage and retrieval stations that enable the mobile robot to automatically dock with and exchange toolheads as operational requirements change. The toolhead storage and retrieval stations securely hold one or more toolheads and facilitate their identification, handling, and installation on the robot. In certain embodiments, the stations incorporate mechanisms to verify the identity of stored toolheads using RFID-encoded capability profiles and further include vision-based verification systems to ensure proper alignment and secure attachment. In this manner, the system enhances task flexibility by dynamically enabling the robot to select and deploy the most appropriate toolhead for a given operation.

In another embodiment, as recited, one implementation supports 3D-printed custom toolheads specifically designed to meet unique operational needs in a warehouse or industrial environment. The provision for 3D-printed custom toolheads allows rapid customization and on-demand manufacturing of toolheads with specialized functions such as nonstandard gripping geometries or tailored payload interfaces. These custom toolheads are designed with compatibility in mind, ensuring that they can be mechanically and electrically interfaced with the robot's swappable toolhead interface. The system utilizes onboard verification systems to authenticate the toolhead's design parameters and functional capabilities prior to engagement, thereby ensuring that a custom 3D-printed toolhead meets the safety and operational standards required for autonomous operation.

As recited, the system is enhanced by incorporating collision-avoidance features for attached toolheads. In embodiments with an attached toolhead, the robot employs a collision-avoidance module configured to monitor the toolhead's operating environment in real time. Dedicated sensors on the mobile chassis or integrated with the toolhead—for example, LiDAR sensors, ultrasonic sensors, stereovision cameras, or alternative proximity detection techniques—enable the identification of obstacles or potential collisions. When a collision risk is detected, the system's control algorithms dynamically adjust the robot's path or toolhead trajectory to prevent contact with obstacles, thereby maintaining operation in crowded or dynamic environments. The collision-avoidance functionality operates concurrently with other operational modules, such as energy optimization and task prioritization controllers, to maintain overall system integrity while performing toolhead-related tasks.

By integrating autonomous toolhead storage and retrieval with support for custom 3D-printed toolheads and dedicated collision-avoidance features, the system offers a robust and adaptable solution for automated material handling and task execution in complex environments. This integration not only enhances flexibility and efficiency but also ensures reliable operation of the robot during toolhead transitions and while executing delicate tasks that demand precise tool engagement.

In one embodiment, the system is operable to transport non-ferrous items by employing an electrostatic adhesion mechanism that induces a charge differential between the toolhead surface and the non-ferrous item to securely retain the item during movement. The electrostatic adhesion mechanism is configured to generate a controlled electrostatic field at the interface between the toolhead and the item such that the adhesion force can be modulated based on the specific properties of the non-ferrous item. In embodiments where non-ferrous items are handled, the controller, in conjunction with sensor data from the sensor suite, dynamically adjusts the voltage parameters of the electrostatic adhesion system to optimize grip without relying on traditional mechanical gripping forces.

In another aspect, the system includes toolhead sanitization cycles integrated into its operational routines. The sanitization cycles are executed by the control system, which, after completing a handling task or during scheduled idle periods, initiates a sanitization protocol designed to disinfect the toolhead surfaces. The sanitization protocol can incorporate the activation of integrated ultraviolet radiation sources and/or the operation of mechanisms for dispensing disinfectant solutions. The toolhead sanitization cycle is configured to reduce the risk of contamination, particularly in applications where a large number of items are processed and cross-contact between items is possible.

In one embodiment, the system verifies toolhead attachment by employing thermal imaging to assess contact integrity. This is achieved through detecting variations in infrared emissions at the interface between the toolhead and the coupling mechanism. The thermal imaging setup integrates with the vision-based toolhead verification system so that any deviation from expected thermal profiles immediately indicates potential misalignments or imperfections in the physical connection.

In another embodiment, the system supports underwater toolheads specifically adapted for cold storage environments. These underwater toolheads utilize corrosion-resistant materials and sealed components to ensure reliable operation when submerged or exposed to humid conditions, while maintaining performance in chilled temperature settings. The toolheads are designed for compatibility with magnetic coupling interfaces that incorporate auto-alignment features, thereby facilitating secure and repeatable attachment in underwater conditions.

In further embodiments, the system incorporates toolhead leasing inventory management to enable efficient allocation and tracking of toolhead assets. This functionality allows for real-time monitoring of leased toolheads, thereby simplifying inventory control and ensuring that toolheads are available when required. The leasing management system communicates with warehouse management systems via standardized protocols provided by a middleware translation layer, concurrently updating leasing status and availability based on sensor feedback and onboard processing.

Collectively, these embodiments provide enhanced operational flexibility by leveraging thermal imaging for contact verification, supporting specialized toolheads for demanding underwater cold storage applications, and streamlining toolhead logistics via integrated leasing inventory management.

In another aspect, the energy management system incorporates a digital twin that simulates energy consumption patterns of the robots operating within the warehouse environment. The digital twin is configured to replicate, in a virtual environment, the operational parameters and energy usage profiles of individual robots as well as the fleet as a whole. The simulation considers variables including, but not limited to, task load, robot movement, environmental conditions, and battery health. By continuously updating based on real-time data, the digital twin enables predictive analysis of future energy requirements and supports optimization strategies for energy allocation over time. This simulation framework further enables system operators to evaluate the impact of various operational parameters and charging strategies without interrupting warehouse operations.

In one embodiment, the charging pads are implemented using capacitive coupling as disclosed in reference numeral 63, wherein a first conductive surface integrated into the charging pad is arranged in close proximity to a corresponding second conductive element mounted on the robot. In this configuration, an alternating electric field is established across a predetermined gap between the conductive elements, thereby facilitating energy transfer without direct physical contact. The capacitive coupling mechanism offers inherent benefits including reduced mechanical wear and enhanced safety compared to traditional conductive charging interfaces. Further, the system includes solar-recharging docking stations as described in the system. These docking stations integrate one or more photovoltaic modules configured to convert ambient radiance into electrical energy, which is conditioned by onboard charge controllers prior to storage in energy modules. The solar-recharging docking stations are designed to automatically initiate the recharging process upon detection of a depleted battery level in the robot. The combination of capacitive charging pads and solar-recharging capabilities enables efficient and reliable energy replenishment for the mobile system while also minimizing downtime and bolstering overall operational sustainability.

In embodiments, a robot is configured to compete for charging slots based on the urgency of its tasks. When a robot determines that its battery level requires recharging, onboard processors, along with sensor modules such as S402 and decision engines like S604, assess the need to continue its current task relative to the necessity of restoring energy levels. The task urgency is determined by factors including the current assignment, real-time progress, and projected energy requirements provided by simulations (for example, those generated by the digital twin S1102), as well as historical energy consumption data.

The bidding process leverages data transmitted through the middleware translation layer S800 to ensure compatibility among heterogeneous robots and standardized communication protocols between the control system and the charging infrastructure. Furthermore, information on anticipated waiting times at charging points and real-time energy consumption trends, continuously updated by the energy optimization controller S404, is provided to the robots to refine their bids. The outcome of the auction process is a dynamic allocation of charging slots that minimizes overall fleet downtime and enhances operational efficiency by ensuring that robots engaged in time-sensitive tasks obtain timely access to power.

The system includes a deceleration mechanism in which kinetic energy is captured during deceleration through regenerative braking techniques that convert mechanical energy into electrical energy. In one embodiment, when the drive system decelerates the chassis, regenerative circuits temporarily bridge the drive motors with an energy storage pathway, directing the recovered electrical energy into the battery module. Continuous monitoring of the battery module is provided by onboard sensors that measure parameters such as voltage, temperature, and current, ensuring accurate tracking of the battery state. The energy optimization controller uses these sensor inputs to dynamically adjust operational parameters, including modifying the extent of energy recovery based on current load conditions and battery status.

Simultaneously, the system incorporates battery health-aware charging protocols that adjust charging parameters in accordance with the detected battery condition. These protocols involve monitoring battery temperature and state-of-charge so that, during charging, the battery receives a current level optimized to maximize energy input while preserving battery life. For example, when the battery is at a reduced state-of-charge and within an optimal temperature range, the system permits a higher charging current; conversely, when the battery temperature rises or the state-of-charge approaches a defined maximum threshold, the controller decreases the charging current to mitigate thermal stress and reduce overcharging risks.

This integrated approach ensures that the energy recovered during deceleration is effectively utilized to enhance overall energy efficiency while safeguarding battery integrity. The battery health-aware charging protocols are further refined by real-time feedback from multiple onboard sensors, which directs the energy optimization controller to adapt to transient operating conditions and adjust charging profiles accordingly. In embodiments with variable driving conditions, the charging controller implements a staged charging process, initiating with a rapid charging phase when battery conditions prove favorable, then transitioning to a maintenance charging phase to stabilize the battery state.

Thus, the system is enhanced by incorporating both kinetic energy recovery during deceleration and battery health-aware charging protocols that contribute to superior energy efficiency and extended battery life.

In another embodiment, the system, as recited, supports battery-swapping operations that complete in less than 90 seconds. The battery module S400, in combination with a plurality of onboard sensors S402, continuously monitors real-time energy consumption and battery status to trigger swift swap processes when the battery approaches a predetermined discharge threshold. The rapid battery-swapping mechanism involves automated detection of a depleted battery, initiation of a battery exchange routine, and subsequent verification of battery integration, all executed within the specified time frame to minimize downtime and maintain operational continuity.

In an additional embodiment, the system, as recited, provides ambient temperature compensation for battery performance. This functionality is realized through integrated temperature monitoring sensors that capture ambient conditions in the operating environment. When ambient temperatures deviate from optimal ranges, the control system adjusts battery charging and discharging profiles to mitigate performance degradation. Such adjustments include modifications to power draw limits, dynamic recalibration of the energy optimization controller S404, and, if required, activation of auxiliary heating or cooling modules to stabilize battery performance.

Each of these implementations functions together to enhance overall energy management within the system, ensuring efficient operation, rapid battery exchange, and superior battery performance under variable temperature conditions.

The robot incorporates a battery module (S400) together with a plurality of onboard sensors (S402) that monitor energy consumption across essential subsystems, including the drive motors, sensor suite, and payload handling apparatus. To extend operational range and improve energy efficiency, the design also integrates hydrogen fuel cell range extenders. These extenders supplement the battery module by providing an auxiliary energy source that activates when the battery level reaches a predetermined threshold. An energy optimization controller (S404) manages the integration of the hydrogen fuel cell range extenders, dynamically adjusting the robot's operating parameters in real time based on the current battery level, the anticipated energy requirements for upcoming tasks, and the availability of charging stations or hydrogen replenishment points.

Furthermore, the robotic system includes an onboard processor configured to execute neural network models for real-time task prioritization and navigation decisions, supported by a sensor interface that retrieves data from various sensors including LiDAR, vision, and inertial sensors. In cooperative multi-robot arrangements, an ultra-wideband (UWB) localization system is employed, wherein each robot is equipped with a UWB tag and coordinates with multiple UWB anchors distributed throughout the warehouse. This arrangement is further enhanced by onboard cameras and digital maps that enable visual landmark extraction and alignment, ensuring highly accurate robot positioning.

Additionally, the system architecture supports interoperability among diverse robot platforms via a middleware translation layer that converts proprietary control protocols into standardized communication formats. A central orchestration engine assigns tasks dynamically across the fleet based on real-time data such as capability, location, and workload. In summary, incorporating hydrogen fuel cell range extenders in conjunction with conventional battery modules and dynamic energy management systems results in increased operational endurance and efficiency, thereby facilitating seamless integration into warehouse environments with elevated operational demands.

In one embodiment, wireless charging pads—such as those situated at key workflow pause points—are configured to serve a dual function. As a mobile robot approaches a wireless charging pad for energy replenishment, the charging pad simultaneously establishes a secure data communication link with the robot's onboard processor and control modules. In this configuration, the charging pad acts as not only a source of electrical energy for the robot's battery module but also as a data upload point that facilitates the transfer of diagnostic information, performance metrics, and sensor data to a centralized data repository or control system. The data communication is carried out via a communication interface integrated into the charging pad, which utilizes protocols compatible with middleware translation layers and API gateways, thereby enabling bidirectional data flows.

In another embodiment relating to the system, the elevated conveyors incorporate regenerative braking for optimized energy management. During deceleration events, the regenerative braking system captures kinetic energy and converts it into electrical energy. This recovered energy can be fed back into the robot's energy management architecture, thereby reducing overall energy consumption and extending operational runtime. The integration of regenerative braking on elevated conveyors with the dual-function charging pads creates a synergistic effect wherein energy recovery from braking contributes to battery replenishment while the charging infrastructure concurrently facilitates essential data uploads. This approach minimizes downtime by allowing the robot to recharge and transfer key operational data during a single interaction with the charging pad, thereby optimizing both energy efficiency and data continuity in the system.

In certain embodiments, one implementation incorporates piezoelectric floor tiles installed in designated busy traffic zones of an industrial or warehouse environment. When pressure is applied to these floor tiles by moving robots, human operators, or other sources of dynamic weight, the piezoelectric effect generates electrical energy that is harvested and utilized to supplement the power supply of various subsystems within the automation framework. For instance, the electrical energy produced by the piezoelectric floor tiles is routed to an energy storage module, such as battery module S400, or directly supplied to an energy optimization controller, such as S404, which dynamically adjusts robot operating parameters in response to current battery levels, predicted task energy requirements, and charging station availability. The integration of piezoelectric floor tiles in busy traffic zones enhances energy efficiency by providing an additional renewable energy source that reduces dependency on conventional charging methods. Moreover, installing these floor tiles in areas of repetitive movement enables continuous energy harvesting throughout normal warehouse operations, leading to better overall energy management for the robotic fleet. In some implementations, an onboard processor monitors the electrical output from these piezoelectric floor tiles to detect variations in energy production that correlate with changes in traffic patterns, thereby enabling predictive maintenance schedules and adaptive power management. The harvested energy is also used to power energy-efficient sensors or to sustain communications with the central orchestration engine, ensuring robust and uninterrupted operation of the robotic systems across the facility. Additionally, the combination of piezoelectric energy harvesting with sensor fusion modules and adaptive drive systems contributes to a more resilient and self-sufficient operational environment, optimizing performance and reducing the operational downtime associated with energy recharge and battery management.

The system incorporates a scheduler configured to dynamically reserve energy for essential operations by continuously monitoring battery levels and system load demands. In one embodiment, the scheduler determines in real time, based on current operational conditions and predicted energy requirements, the necessary energy reserve thresholds required to support vital functions such as obstacle avoidance, motion control, and communication. When the scheduler detects that the available battery charge is nearing a predefined minimum threshold during periods of intense operational demand, it automatically reserves a portion of the available energy exclusively for indispensable operations, thereby ensuring that these key tasks are maintained regardless of other energy requirements.

Furthermore, the system comprises a battery preconditioning module that is activated prior to anticipated peak load events. In this configuration, the battery preconditioning module proactively adjusts the battery operating parameters, which include temperature regulation and state-of-charge optimization, to prepare the battery module for scenarios involving significant current draw. The battery preconditioning process involves enhancing battery readiness through controlled charging protocols and energy management strategies, thus mitigating the effects of transient power spikes and improving the overall efficiency of energy delivery during periods of elevated operational demand. This proactive conditioning of the battery module ensures that when the system encounters sudden or substantial energy demands, the battery is fully prepared to supplement the energy required, thereby improving system stability and performance under varying load conditions.

In one embodiment, the battery module is integrated with a predictive maintenance system that monitors essential battery parameters using onboard sensors. The system continuously tracks energy consumption, temperature, voltage, and current levels, comparing these measurements against expected operating conditions to identify potential degradation or anomalies. When deviations beyond predetermined thresholds are detected, predictive maintenance alerts are generated and communicated to a central monitoring module. These alerts facilitate early intervention, thereby reducing downtime and extending battery lifespan.

In addition to predictive maintenance, the system supports vehicle-to-grid energy sharing. In this configuration, the energy management subsystem interfaces with external grid communication modules to receive data regarding grid load, voltage stability, and energy pricing. The onboard power control mechanisms coordinate with external signals to discharge excess energy from the battery module to the electrical grid when grid demand is elevated, or to draw energy during periods of reduced demand. This bidirectional energy flow not only optimizes overall energy usage but also contributes to grid stabilization efforts during peak load conditions.

Furthermore, the system incorporates dynamic power throttling during periods of grid constraints. When real-time grid monitoring indicates conditions such as diminished capacity or voltage fluctuations, the energy optimization controller adjusts the power draw and discharge rates of the battery module. By modulating these operating parameters based on continuous feedback from energy sensors and grid condition inputs, the system prevents excessive load on the grid while maintaining optimal and secure performance of the mobile platform.

Accordingly, the system integrates carbon footprint tracking as an inherent feature of its energy management architecture, enabling not only optimized energy consumption but also environmental performance monitoring. By leveraging real-time sensor data and processor-driven analytical modules, the robot continuously assesses its operational carbon emissions, thereby facilitating energy-efficient routing and task allocation through the central task scheduler (S300) and providing valuable insights for fleet-level optimization and sustainability analysis.

In certain embodiments, the wireless charging pads detach automatically to mitigate risks associated with flooding or other emergency conditions. In one example, the charging pads (S1100) are coupled to the mobile robot using a quick-releasing magnetic interface, such as the auto-alignment feature disclosed in S1000. When sensors or external signals indicate the onset of a flood or emergency situation, an emergency control module integrated with the onboard processor S600 and coordinated by the central orchestration engine S802 triggers the detachment mechanism. The control system monitors environmental conditions using redundant sensors and safety controllers, ensuring that the decision to separate the charging pads is based on real-time data such as water levels, moisture detection, or other predetermined thresholds. Upon detection, the system sends a command to disengage the mechanical coupling between the charging pads and the robot chassis, thereby preventing potential water ingress into the charging system, reducing electrical hazards, and facilitating rapid evacuation or maintenance. In some embodiments, an energy optimization controller S404 and a behavior-based safety governor S1204 are configured to override standard charging procedures when flooding or other emergencies are detected, ensuring that the charging pads withdraw before full-scale exposure occurs. The quick release of the charging pads not only enhances safety during emergency conditions but also aids in the rapid reconfiguration of the robot's charging infrastructure, reducing downtime and supporting safer operational protocols under adverse environmental conditions.

Complementing these sensors, the system further incorporates a behavior-based safety governor (S1204) integrated into the robot's control architecture. The safety governor continuously processes sensor inputs in real time and overrides or modifies the robot's current actions when a human is detected within a predefined safety zone. Specifically, the behavior-based safety governor initiates deceleration, halts the robot completely, or redirects its path by applying rule-based logic or machine learning algorithms that consider the proximity, relative motion, and predicted path of the detected human. In some embodiments, the behavior-based safety governor employs a decision algorithm that dynamically adjusts thresholds for intervention based on the robot's speed, the density of nearby human traffic, and the operational context of the warehouse.

The system incorporates predictive path conflict modeling, as disclosed, by processing data from various onboard sensors and navigation controllers. This modeling employs algorithms that forecast potential future conflicts between the dynamic exclusion zones of adjacent robots and predetermined static obstacles. By analyzing real-time positional data and anticipated motion paths, the predictive modeling module computes likely intersection points of exclusion zones and anticipates collision scenarios. As a result, the navigational controller adjusts the robot's trajectory accordingly, either by reassigning routes or by modifying operational parameters to avoid potential conflicts.

Furthermore, the system interacts with a central orchestration engine to dynamically reassign tasks or reroute one or more robots, which reduces the risk of operational delays or collisions. Continuous feedback provided by the UWB tag and its associated processing circuitry enables the system to rapidly update the exclusion zones and recalibrate the predictive model in response to changes in warehouse conditions. This combination of UWB-based dynamic exclusion zone generation and predictive conflict modeling enhances both the safety and operational efficiency of the mobile robot by ensuring that potential zone conflicts are preemptively addressed.

The mobile robot is also equipped with a safety system that incorporates emergency stop gesture recognition. Specifically, the stereo vision camera of the sensor suite S104 captures resolution image data, which is forwarded to an onboard processor and a machine vision module. The machine vision module is programmed to detect specific visual patterns corresponding to an emergency stop gesture—such as a hand or arm raised in a predefined manner—by analyzing a sequence of captured images using a neural network model or other pattern recognition techniques. Upon detecting the emergency stop gesture, the sensor data is further processed by a safety controller S502 configured to verify human presence in a predefined safety zone and to confirm the urgency of the gesture using additional corroborative inputs from proximity sensors or thermal imaging sensors, if available. Once it is confirmed that an emergency stop gesture has been issued, an intervention module S504 initiates immediate safety measures, including but not limited to speed reduction, audible warnings, and an emergency stop command that halts the drive system S102.

In some embodiments, the emergency stop gesture recognition function is further enhanced by integrating data from additional sensors such as event cameras or mmWave radar provided by a multi-sensor fusion module S900, in which spatial-temporal graph neural networks are employed to further classify transient obstacles and human gestures within the robot's operating environment. Real-time processing is performed on an onboard processor S600 that executes the neural network models and carries out overall task prioritization and navigation decisions using input from a sensor interface S602 and a decision engine S604.

The described emergency stop gesture recognition feature is designed to operate independently of continuous communication with a central server, thereby ensuring that the mobile robot can immediately cease operation in the presence of sudden hazardous conditions signaled by a nearby human operator. The integration of emergency stop gesture recognition with existing onboard sensors and processing modules provides an additional layer of safety, reducing the likelihood of collisions or unintended operation in dynamically changing warehouse environments.

In one embodiment, the robot is configured to emit directional audible warnings, such that its audio output device(s) direct sound in specific spatial regions to alert individuals located in the immediate vicinity of its path. For example, the robot includes an integrated audio module coupled to a processing circuit wherein the directional output is controlled based on real-time positional data, environmental conditions, and robot motion parameters. The directional audible warning feature enables the robot to issue warnings that are more discernible to individuals in potential hazard zones while minimizing unnecessary noise in other areas. The audio output is varied in intensity and frequency depending on the proximity and velocity of the robot, as well as on dynamic operational variables within the work environment.

In a complementary embodiment, the system incorporates worker fatigue monitoring through tag sensors. In this configuration, individual workers are equipped with wearable tag sensors that continuously gather physiological or kinetic data indicative of fatigue states. The data is communicated to a central processing unit or an onboard controller, where analysis detects signs of worker fatigue, such as changes in movement patterns, variations in biometric parameters, or other relevant indicators. Upon detecting worker fatigue, the system automatically adjusts operational parameters of nearby robots—reducing speed or altering paths—to enhance safety. Additionally, the system provides supplementary audible warnings or notifications to alert both the fatigued worker and supervisory personnel, thereby introducing an additional layer of safety intervention. This integrated approach, combining directional audible warnings with worker fatigue monitoring via tag sensors, ensures that robotic operation and human factors are continuously managed to reduce risks in dynamic and crowded work environments.

In certain embodiments, the system further comprises a battery module (S400) combined with a plurality of onboard sensors (S402) and an energy optimization controller (S404) that dynamically adjusts operating parameters based on current battery level, predicted task energy requirements, and charging station availability. In these embodiments, a multi-modal proximity detection suite (S500) incorporating a 360-degree LiDAR sensor and at least one thermal imaging sensor also exists. A safety controller (S502) detects human presence within a predefined safety zone and communicates with an intervention module (S504) configured to execute speed reduction, audible warnings, or emergency stops as necessary. Augmented reality visibility aids in these embodiments display the proximity and movement of nearby humans, thereby enhancing an operator's situational awareness.

Additional embodiments include an onboard processor (S600) configured to execute a neural network model for real-time task prioritization and navigation decisions in cognizance of sensor data received via a sensor interface (S602). A decision engine (S604) is operable to select optimal actions based on current sensor readings and an internal task queue without relying on continuous communication with a central server. The decision-making process is visually represented to an operator through augmented reality displays, which show prioritized tasks and navigation decisions in an intuitive overlay.

Are strategically located at workflow pause points, while a digital twin (S1102) simulates energy consumption patterns and an auction-based charging scheduler (S1104) minimizes fleet downtime. In additional embodiments, ultra-wideband personnel tags (S1200) with haptic feedback and robot-mounted thermal/ToF sensors (S1202) detecting humans in blind spots are utilized, along with a behavior-based safety governor (S1204) that overrides robot actions when humans are in close proximity. Augmented reality visibility aids in these embodiments dynamically render safety zones, hazard alerts, and essential sensor data to the operator, thereby facilitating rapid and well-informed decision-making in environments featuring complex human-robot interactions.

Collectively, these embodiments disclose a comprehensive robotic system that integrates advanced sensor fusion, adaptive navigation, and interactive augmented reality visibility aids. The augmented reality aids enable real-time overlay of sensor data, obstacle positioning, navigation plans, and safety alerts onto an operator display, thereby enhancing situational awareness and facilitating safer and more efficient warehouse automation operations.

The safety governor is configured to enforce ISO/TS 15066 limits. 89 by continuously monitoring force and speed parameters during human-robot interactions to ensure that the force exerted by the robot does not exceed levels determined to be acceptable under collaborative conditions. In this embodiment, the governor processes input signals from sensors strategically located on the robot—including proximity sensors and various detection modules—to calculate in real time the dynamic parameters of the robot's motion relative to nearby personnel. When the detected motion or applied force approaches or surpasses the predetermined thresholds, the governor actively modifies the robot's speed or configuration to mitigate potential hazards.

Furthermore, in accordance with the system, the robot is equipped with onboard black boxes that continuously record operational data, sensor inputs, and control signals during its operation. These onboard black boxes facilitate incident replay by storing time-stamped logs of system events and responses, thereby enabling detailed post-incident analysis. The recorded data provides comprehensive insights into the robot's behavior prior to, during, and after any incident where safety limits were challenged or breached. As a result, system operators can reconstruct events with precision, verify adherence to the ISO/TS 15066 limits, and identify any deviations that could have led to an unsafe condition. The incident replay capability also supports validation of safety measures and serves as an effective tool for troubleshooting, refinement of control algorithms, and continual improvement of overall system safety in dynamic operational environments.

In an embodiment addressing safety concerns associated with airborne hazards, one implementation further incorporates a ventilation control feature. The ventilation control for airborne hazards is integrated with the environmental mapping provided by the sensor fusion module S106, enabling detection of abnormal airborne particle concentrations that indicate the presence of hazardous conditions. Upon identifying such conditions, the ventilation control system is activated to direct airflow in a manner that mitigates the concentration of airborne risks and ensures a safer operational environment for both the robotic system and nearby human operators. The ventilation control is automatically engaged based on the threshold levels determined by the sensor suite S104 and further adjusted through coordinated commands issued by the unified control logic, including inputs from other subsystems such as the energy optimization controller S404 in cases where energy consumption must be balanced with safety measures.

In summary, the present embodiment provides an integrated robotic system wherein the combination of mechanical navigation elements, a comprehensive sensor suite, a dynamic sensor fusion module, and actively controlled ventilation for airborne hazards yields a robust solution capable of adapting to both physical obstacles and environmental hazards within complex warehouse settings.

In one embodiment, the system includes one or more mobile robots configured to operate at reduced speeds when a human is detected in proximity. In such embodiments, a multi-modal proximity detection suite, which includes an ultra-wideband (UWB) personnel tag (e.g., S1200) and robot-mounted thermal/ToF sensors (e.g., S1202), is utilized to continuously monitor the immediate environment surrounding each robot. The detection of a human within a predetermined safety zone triggers the safety controller (e.g., S502) to calculate a proportional reduction in robot speed. The reduction in speed is dynamically adjusted based on the distance between the robot and the identified human, such that the closer the human is detected, the greater the reduction in the robot's operational speed. This proportional speed modulation is determined by algorithms stored in the onboard processor (e.g., S600) and executed in real time. The system thereby minimizes the risk of collision or inadvertent contact, while maintaining operational efficiency when no proximate human presence is detected.

In another embodiment, the system further incorporates RFID-based tool safety interlocks to ensure that only compatible and authorized toolheads are attached to and used by the robot. The RFID-based interlock system is integrated into the swappable toolheads, wherein each toolhead, such as those with gripper, vacuum, or fork configurations, is equipped with an RFID tag that encodes its capability and compatibility profile. Upon docking of a toolhead to the magnetic coupling interface, the onboard control system reads the RFID information and cross-references it against the robot's task requirements and safety parameters. If the toolhead is verified as compatible, the system allows initialization of the tool's functions and integration into the overall task execution plan. In contrast, if the RFID information does not meet the predetermined criteria, the system prevents activation of the tool, thereby providing a hardware-level interlock that mitigates the risk of tool misuse or malfunction during operation. This RFID-based interlock mechanism operates in tandem with other verification systems, such as vision-based toolhead verification, to provide a robust safety architecture that ensures operational reliability and adherence to safety standards during automated tasks.

In an embodiment the mobile robot incorporates a panic button integration which is operatively coupled to various subsystems of the robot to enhance emergency response capabilities. The panic button is positioned in an accessible location on the chassis (S100 or S200) to allow an operator or user to initiate an emergency signal. When the panic button is activated, its signal is routed via the onboard processor (S600) to the safety controller (S502) and the intervention module (S504), triggering an immediate override of current tasks and the activation of safety protocols. The safety controller, upon receipt of the emergency signal, communicates with the drive system (S102 or S202) to reduce speed and, if necessary, bring the robot to an immediate stop. The intervention module is configured to implement one or more predetermined responses, such as executing an emergency stop, generating an audible warning, or slowing down the robot, with the specific response selected based on the current operational context.

Additional embodiments incorporate the panic button into the sensor suite (S104) and sensor fusion module (S106) such that the unified environmental map is updated in real time to reflect the emergency condition signaled by the panic button. This integration aids in identifying zones free of obstacles and ensures that the robot's navigation controller (S108) plots an obstacle-avoiding route to the nearest designated unobstructed area upon activation of the panic button. Concurrently, the onboard protection systems, which include a plurality of sensors (e.g., thermal sensors and ToF sensors as in S1202) and the ultra-wideband personnel tags (S1200), further verify the emergency condition and confirm the proximity of human operators, thereby enhancing overall operational integrity.

In one embodiment, the panic button integration is configured to operate reliably in adverse conditions, including instances where the battery is diminished, as monitored by the battery module (S400) and the energy optimization controller (S404). A redundant communication pathway is provided to ensure that the panic signal is transmitted even if subsystem degradation or primary communication link failures occur. This redundancy is achieved by routing the panic signal simultaneously through the onboard processor's sensor interface (S602) and a dedicated safety protocol embedded within the middleware translation layer (S800). The integrated system also performs periodic self-test routines to verify the operational readiness of the panic button circuitry and the associated emergency response subsystems, thereby ensuring that the overall system can execute a coordinated safety response under all operating conditions.

In summary, integrating the panic button creates an extra human-machine interface layer that enhances operational protection by enabling immediate manual intervention. When activated, the panic button initiates a cascade of communications and emergency responses across multiple subsystems, including the drive system, sensor suite, protection controller, and central orchestration engine. This integrated approach allows the mobile robot to swiftly transition to a protected operating state upon detecting an emergency, thereby minimizing risk to human operators and equipment while adhering to the overall system architecture designed for dynamic and secure warehouse operations.

In one embodiment, ultra-wideband personnel tags configured as S1200 include an integrated haptic feedback module that provides a vibration alert when the tag enters a predefined danger zone. In operation, when the location of a tag is determined to be within a hazard area delineated by boundaries established through sensor fusion data—including inputs from UWB anchors (S702), a digital map (S706), and additional sensor inputs—the onboard processor of the personnel tag activates the vibration mechanism to alert the wearer. The determination that a tag is within a designated danger zone is performed using a combination of real-time localization algorithms and spatial data analysis, wherein location information is derived from time-difference-of-arrival (TDoA) measurements and aligned with environmental landmarks. This process minimizes false alerts and ensures that vibration feedback is provided only when necessary for enhanced personnel safety.

Furthermore, the system employs privacy-preserving human tracking by processing location and environmental data in an anonymized, encrypted format. Rather than storing continuous personally identifiable information, only minimum necessary data is retained and used solely for safety-related computations such as geofencing and hazard detection. The location coordinates determined for the personnel tags are managed in accordance with data minimization principles and pseudonymous identifiers, ensuring that tracking does not compromise individual privacy while still enabling the system to compute spatial relationships between the tags and potential danger zones.

The vibration alert functionality is integrated with the system, where privacy-preserving human tracking continuously monitors the position of individuals without capturing explicit biometric information. By dynamically weighting sensor inputs and fusing data from multiple sources, the system reliably identifies risk zones and activates the vibration alert in response to any breach of designated protected boundaries. This integrated approach enhances both the operational security of personnel and the overall reliability of the human tracking system through robust, real-time hazard detection.

In one embodiment, the robots are configured to periodically execute coordinated drills in the presence of human workers. The drills simulate emergency conditions and verify that both the robotic system and the human personnel adhere to predefined emergency procedures. During a drill, the robots navigate predetermined paths within the work area, announcing the drill's initiation with visual and audible alerts while simultaneously monitoring the workers' response actions. The robots are equipped with sensor suites—such as the sensors described in S104 and the multi-modal proximity detection suite of S500—that facilitate the precise detection and tracking of worker positions. Data acquired from these sensors is processed by sensor fusion modules like S106 or S900 to produce a comprehensive environmental map. This map is used to ensure that the routes and movements executed during the drill circumvent collisions and maintain an appropriate distance in accordance with predefined protocols. The system is also configured to provide real-time feedback and post-drill diagnostics, thereby reinforcing proper procedural behaviors and validating the effectiveness of the implemented routines.

In a further embodiment, the system incorporates electromagnetic field shielding for medical devices as disclosed in the system. This shielding is implemented to protect sensitive medical equipment from electromagnetic emissions generated during robotic operation. The electromagnetic shielding includes conductive enclosures, absorbent materials, or coatings integrated into components of the robotic system. It is designed to attenuate unwanted electromagnetic interference by creating a barrier that minimizes the transmission of electromagnetic waves. In some embodiments, localized shielding is employed around subsystems that generate higher levels of electromagnetic emissions, while in other embodiments the shielding is applied to the overall chassis, such as S100 or S200, to offer a comprehensive reduction of the field. The design of the shielding supports compliance with established standards for electromagnetic compatibility, ensuring that the operation of medical devices remains unaffected in environments where robotics and medical technology are co-located. The shielding is engineered to adapt to dynamic changes in electromagnetic conditions, thereby maintaining reliable operation during both routine and anomalous system activities.

Near-miss analytics for process improvement are implemented by aggregating data from multiple subsystems. For example, the unified environmental map produced by the sensor fusion module (S106) is analyzed in conjunction with real-time navigation data from the navigation controller (S108) to detect instances where robot trajectories approach collision thresholds without actual impacts. These near-miss events are further corroborated by data obtained from the multi-modal proximity detection suite (S500) and transient obstacle classifier (S902) to accurately identify events that suggest potential hazards. A reactive path planner (S904) generates corrective trajectories within 200 milliseconds of near-miss detection, and these rapid adjustments provide data points for the near-miss analytics module.

In one embodiment, the near-miss analytics module further interacts with an energy optimization controller (S404) to ensure that energy consumption adjustments do not compromise safety protocols during rapid maneuvering in risk-prone zones. This module communicates detected near-miss events, along with their contextual data, to a middleware translation layer (S800) and an API gateway (S804). This communication facilitates the exchange of standardized data with warehouse management systems and enables the aggregation of historical near-miss data for trend analysis. The historical analysis supports the generation of a digital twin (S1102) that simulates energy consumption and safety events to inform iterative improvements in fleet scheduling and process control.

In one embodiment, the behavior-based safety governor, herein designated S1204, is configured to selectively relax standard safety rules during emergency conditions. Under normal operating circumstances, S1204 continuously monitors proximity and other essential parameters via robot-mounted sensors to ensure adherence to predefined safety margins. However, when an emergency condition is detected—such as an unexpected obstruction, fire, or system malfunction—the governor temporarily suspends or relaxes these constraints to enable rapid execution of emergency response protocols. Detection of emergency conditions is facilitated by auxiliary sensors, including ultra-wideband personnel tags (S1200) and thermal or time-of-flight sensors (S1202), which supply the necessary data for S1204 to determine the presence and severity of a potential hazard.

Upon activation of the emergency relaxation mode, S1204 communicates with other subsystems, such as the central orchestration engine (S802) and the digital twin simulating energy consumption patterns (S1102), to coordinate an appropriate response. For instance, the temporary relaxation of safety parameters allows the reactive path planner (S904) to compute collision-free trajectories that diverge from standard paths, thereby facilitating rapid evacuation or access to emergency areas. These computed trajectories are optimized to balance the need for speed with the maintenance of adequate safety margins, ensuring that while safety rules are relaxed, the risk of additional harm is minimized.

Further enhancements in scheduler 300 incorporate integration with a digital twin simulation (e.g., as referenced in S1102) that simulates energy consumption patterns and assists in predicting potential delays. The scheduler 300 leverages these predictions to refine its task assignments further, adjusting both route planning and task sequencing to maintain overall operational efficiency. Moreover, the scheduler 300 implements algorithms that utilize historical task performance data, thereby adapting to recurring operational patterns and improving its scheduling accuracy over time.

By coordinating task assignments, monitoring task progress in real time, and dynamically reallocating resources based on current performance metrics and energy considerations, the scheduler 300 effectively minimizes overall task completion time. As a result, throughput is elevated, downtime is curtailed, and the overall efficiency of the warehouse automation environment is enhanced.

In certain embodiments, the scheduler integrates data from a middleware translation layer, such as S800, which converts proprietary robot control protocols into a standardized communication format, and from a central orchestration engine, such as S802, that dynamically assigns tasks to heterogeneous robots based on real-time capability, location, and workload data. This integration allows the scheduler to adaptively balance automation with operator input, ensuring optimal performance under varying warehouse conditions.

Furthermore, the scheduler is implemented as part of an integrated control system that communicates with other subsystems, including various sensor suites, drive systems, and energy optimization modules, thereby providing a comprehensive and responsive task management solution suitable for complex automated warehouse operations.

In one embodiment, the energy optimization controller S404 monitors the battery module S400 and receives operating data from the plurality of onboard sensors S402. When it determines that the battery level has fallen below a predetermined threshold, the energy optimization controller S404 selectively disables non-essential sensors to reduce power consumption while ensuring that sensors indispensable for obstacle detection and navigation remain active. For example, sensors within sensor suite S104 that provide enhanced environmental mapping yet are not necessary for immediate obstacle detection or effective maneuvering are deactivated, whereas sensors that maintain basic spatial awareness continue to operate. The energy optimization controller S404 dynamically adjusts the mobile robot's operating profile based on current battery levels, predicted energy requirements for upcoming tasks, and the availability of charging station resources. In certain configurations, the controller S404 further reduces energy draw by restricting data processing tasks that do not directly contribute to immediate operational integrity, thereby extending the run-time of the mobile robot during periods of reduced battery capacity without compromising essential functionality.

In one embodiment, the robot includes an adaptive payload handling system comprising a telescopic lift and a variable-width gripper. A controller is configured to adjust the power consumption of the payload handler in response to the detected load weight. The controller receives a load weight signal from an integrated sensor or sensor suite, which includes sensors dedicated to measuring forces or weights of the handled items, and then determines an optimal power consumption level for the payload handler to ensure efficient and responsive operation. To achieve this, the controller compares the measured load weight with a series of predetermined power consumption profiles stored in memory, each corresponding to a particular load range, and selects the appropriate power level required to operate the payload handling system. The controller then modulates the power delivered to the motors and actuators driving the telescopic lift and gripper via a control signal, ensuring that the system operates within an energy-efficient regime while maintaining the necessary performance characteristics to handle varying loads. This dynamic adjustment minimizes energy wastage during conditions involving reduced load and provides adequate power when heavier loads are encountered, thereby optimizing overall system efficiency and prolonging the operational life of the payload handling components. In certain embodiments, the controller also interfaces with an energy optimization controller responsible for dynamically adjusting operating parameters in real time based on current battery levels, predicted energy requirements, and available charging conditions, further integrating payload handling performance with overall energy management strategies.

In one embodiment, the controller selects energy-efficient routes to minimize travel distance by calculating and comparing the energy consumption associated with various potential trajectories. The controller obtains environmental data from one or more sensors, such as the sensor suite (S104) and onboard sensors (S402), to determine real-time conditions within the operational area. Based on these data, the controller computes an energy consumption profile for each assessed path by incorporating factors such as incline, expected traffic, and dynamic obstacles. The computed energy consumption profiles are then used to generate a cost metric for each route, which is subsequently optimized to identify the least energy-intensive path.

In implementing this functionality, the system utilizes the navigation controller (S108) in conjunction with an energy optimization controller (S404). The energy optimization controller is configured to adjust operating parameters in response to the current battery level, predicted task energy requirements, and the proximity of charging stations. By dynamically weighting sensed warehouse conditions, the controller ensures that the selected path minimizes unnecessary acceleration, deceleration, or excessive maneuvering, thereby reducing overall travel distance. Moreover, integration of the sensor fusion module (S106) enhances the mapping accuracy of the environment, further improving the route optimization process. As a result, the system not only conserves energy but also extends the operational period of the mobile robot before a battery recharge is required.

The system records energy consumption data for each completed task by capturing and storing information generated during task execution. In one embodiment, the system includes a battery module (S400) and a plurality of onboard sensors (S402) configured to monitor energy consumption by various subsystems such as drive motors, sensors, and payload handlers. During operation, the onboard sensors continuously monitor parameters indicative of energy usage, and the data is recorded in association with the task being executed. Upon task completion, energy consumption data is aggregated and logged along with task-specific identifiers to facilitate subsequent analysis. In some embodiments, the energy optimization controller (S404) accesses the logged energy data to dynamically adjust robot operating parameters based on current battery levels, predicted energy requirements, and charging station availability. This logged data is used for diagnostic purposes, performance analysis, and for informing task reassignment decisions in scenarios where energy consumption deviates from expected patterns. The detailed log entries provide a basis for energy efficiency enhancements, enabling the system to compare recorded energy usage against historical data to optimize future task scheduling and operational planning.

In one embodiment, the energy optimization controller (S404) is adapted to forecast peak demand levels at the wireless charging pads (S1100) based on current charging station utilization and the predicted energy requirements of the mobile robots. The controller obtains real-time battery status information from the battery module (S400) and aggregates energy consumption data collected by the plurality of onboard sensors (S402) to establish a charging demand profile over a predetermined time interval. Utilizing a digital twin that simulates fleet-wide energy consumption patterns (S1102), the controller predicts periods during which the charging station demand is expected to be at its maximum. In response to the predicted peak demand, the controller staggers robot charging times by dynamically assigning staggered charging start times to individual robots across the fleet, thereby reducing the likelihood of concurrent charging events that could lead to an overload condition. This scheduling process is further refined through the auction-based charging scheduler (S1104), which minimizes total fleet downtime by allocating charging windows in a manner that optimally balances the operational needs of the warehouse with the charging station capacity. As a result, the intelligent staggering of charging times according to predicted peak demand reduces peak load on the charging infrastructure, enhances the overall efficiency of charging operations, and contributes to the sustained performance of warehouse robotic systems.

In one embodiment, the controller operates to monitor the activity status of the robot and, if the robot remains idle for a predetermined period, enters a hibernation mode designed to conserve energy and reduce wear on system components. The predetermined period is defined by a configurable timer that, upon expiration in the absence of motion or task-related commands, initiates a transition from active operation to an energy-conserving state. During hibernation mode, select subsystems of the controller, including communication interfaces and sensor processing units, are placed in a state of diminished functionality to restrict energy consumption.

Upon detection of external stimuli—such as signals from the sensor suite (e.g., S104) or commands received via the API gateway (e.g., S804)—or the initiation of a new transport, picking, or replenishing task, the controller resumes full operational capacity. In embodiments where the robot is battery-powered (e.g., S400), this approach extends battery life by dynamically adjusting power usage based on real-time operational demands. In some instances, the predetermined period is dynamically modified based on historical activity patterns or environmental conditions, thereby optimizing the timing for entering hibernation mode.

In one embodiment, the controller is configured to adapt energy usage strategies based on ambient temperature detected by the onboard sensors. In operation, the controller receives temperature data from one or more ambient temperature sensors integrated within the plurality of onboard sensors, such as S402, which continuously monitor environmental conditions. The controller utilizes the received temperature information to adjust operating parameters of associated subsystems, including drive motors, sensor suites, and payload handlers, thereby optimizing energy consumption in accordance with current temperature conditions. For instance, if the ambient temperature exceeds a predetermined threshold, the controller implements a strategy that reduces the power supplied to noncritical subsystems or modifies the duty cycle of active components to mitigate the risk of thermal overload and enhance overall system stability. In contrast, when the ambient temperature is within the optimal range or falls below anticipated levels, the controller adjusts subsystem performance to maintain desired functionality while conserving energy. This temperature-responsive energy management approach enables more efficient operation by dynamically balancing performance and power consumption in response to variable environmental conditions.

In certain embodiments, the controller supports over-the-air updates to energy management algorithms, thereby enabling the system to dynamically incorporate improvements and modifications without requiring physical intervention for software updates. The controller is configured to communicate with a remote server or central orchestration engine via a secure wireless interface that facilitates the reception and installation of updated energy management algorithms. The over-the-air update mechanism includes secure boot verification and digital signature checks to ensure that only authenticated and unaltered updates are installed. During an update process, the controller receives a firmware package containing the updated energy management algorithms and initiates an integrity verification process that incorporates decryption and validation against pre-stored certificates. Once verified, the controller installs the updated algorithm, which comprises modules for dynamically adjusting operating parameters such as battery threshold levels, predicted task energy requirements, and charging station availability. The energy management algorithm coordinates with other subsystems, including onboard sensors monitoring energy consumption by drive motors, sensor suites, and payload handlers, to gather real-time operational data. The updated algorithm exploits this data to optimize energy consumption patterns by adjusting operational parameters in accordance with current battery levels and predicted energy demands. In addition, the controller schedules routine health checks and performance comparisons between the newly installed update and previous versions, thereby enabling rollback to a verified prior state if the update results in degraded system performance or inconsistency with pre-defined operational criteria. This over-the-air update capability contributes to enhanced system reliability and efficiency by allowing continuous improvements and rapid deployment of essential energy management adjustments, ensuring that the robot's operational parameters remain aligned with evolving energy efficiency standards and task requirements.

In one embodiment, the controller continually monitors the energy consumption of various subsystems with the help of a plurality of onboard sensors. The controller is configured to collect energy usage data from components such as drive motors, sensor suites, payload handlers, and other essential modules. It then analyzes the gathered data by comparing current energy consumption levels against predetermined baseline values derived from historical performance metrics. When the controller detects deviations from these expected energy consumption patterns over a defined time interval—for instance, an unexpected surge, sustained fluctuation, or progressive drift—it interprets these deviations as indicative of potential system degradation or an impending fault condition. In response to detecting these abnormal energy consumption patterns, the controller generates predictive maintenance alerts designed to inform system operators or an external monitoring platform of possible component or subsystem failure. These alerts are intended to prompt preemptive inspection or maintenance actions to mitigate the risk of catastrophic failure and ensure continuity of operation. Furthermore, in one embodiment, the controller is integrated with an energy optimization module that dynamically adjusts operating parameters in real time, thereby both minimizing energy consumption during normal operation and flagging abnormalities that exceed predefined thresholds. The predictive maintenance functionality not only enhances the reliability of the system but also contributes to a more efficient assignment of maintenance resources by proactively identifying components that could be subject to abnormal wear or stress, allowing for corrective actions to be implemented before complete failure occurs.

In one embodiment, the controller is configured to receive manual override commands for energy management from a supervisor interface. In this embodiment, the controller cooperates with an energy optimization module that, under normal circumstances, dynamically adjusts operating parameters based on current battery levels, predicted task energy requirements, and charging station availability. The supervisor interface provides an external input channel through which a user with appropriate authority transmits override commands directly to the controller. Upon receipt of a manual override command, the controller temporarily suspends its reliance on automatically generated energy management parameters and instead executes the energy management directives specified by the supervisor. For example, the override instructs the controller to prioritize charging operations or adjust operating parameters for subsystems such as the battery module and onboard sensors that monitor energy consumption. The controller is programmed to verify the supervisor's authority via established authentication protocols before accepting and implementing any manual override command. Once authenticated, the controller alters energy utilization priorities, delays tasks that do not demand immediate attention, or adjusts activation thresholds for energy-demanding subsystems. This capability ensures that the system promptly responds to emergent operational requirements as determined by supervisory personnel, thereby enhancing the overall adaptability and resilience of the energy management framework. The manual override function thus serves as a backup mechanism permitting human intervention to adjust energy management strategies in situations where automated decisions do not adequately address immediate operational exigencies.

In one embodiment, the energy optimization controller S404 is configured to utilize a machine learning module that refines energy optimization strategies by analyzing accumulated operational history. The controller receives energy consumption data from a plurality of onboard sensors S402 that monitor energy usage by subsystems such as the drive motors, sensors, and payload handling components. This data, which encompasses battery level fluctuations, energy expenditure during task execution, and variations in energy consumption under different operating conditions, is stored as operational history. The machine learning module processes this historical data using one or more learning algorithms—including supervised, unsupervised, or reinforcement learning techniques—to identify patterns and correlations between task parameters and energy consumption. Based on this analysis, the energy optimization controller dynamically adjusts operating parameters in real time, refining predictive models that estimate near-term energy requirements. For example, the controller modifies parameters such as throttle response, drive motor output, or duty cycling of ancillary systems based on predicted energy needs derived from past operating conditions. Furthermore, the machine learning component incorporates external factors, such as charging station availability and environmental conditions, to further optimize energy usage. Through iterative training and continuous refinement of these strategies, the energy optimization controller improves its ability to manage energy resources efficiently, thereby enhancing overall system performance and extending operational battery life.

In embodiments of the present disclosure, the safety controller (S502) is configured to dynamically adjust the size of the predefined safety zone based on the robot's speed. In one embodiment, the safety controller receives real-time speed data from onboard sensors and drive system feedback, and it utilizes this information to proportionally scale the dimensions of the safety zone. As the robot's speed increases, the controller expands the safety zone to provide a larger margin of error for detecting human presence and potential obstacles, thereby reducing the likelihood of collisions. Conversely, when the robot is operating at decreased speeds, the safety controller reduces the size of the safety zone, minimizing unnecessary interventions and allowing for more efficient task execution. In certain implementations, the dynamic adjustment algorithm factors in additional parameters such as the robot's acceleration, direction of travel, and environmental conditions. The expanded safety zone at higher speeds ensures that the subsequent intervention module (S504) can trigger appropriate mitigative actions, including speed reduction, audible warnings, or emergency stops, in response to the detection of human presence within the adjusted safety zone. This approach enhances both the operational efficiency and overall safety of the mobile robot within dynamic warehouse environments by adapting the safety thresholds to real-time operating conditions.

In one embodiment, a mobile robot includes an intervention module configured to activate a visual warning indicator when a human is detected within the safety zone. In this embodiment, multiple onboard sensors, including those described in S102 and S104, continuously monitor the robot's surroundings. When a human enters the predefined safety zone, the safety controller—such as the one described in S502—detects the presence and sends a signal to the intervention module. Upon receiving this signal, the intervention module initiates a safety response by activating the visual alert indicator. This activation provides an immediate and intuitive signal to nearby personnel that a mobile robot is in close proximity, thereby reducing the likelihood of accidents and enhancing overall workplace safety. The visual alert indicator can operate intermittently or continuously based on the robot's operational parameters and the severity of the detected proximity, with the activation strategy being dynamically adjustable by the intervention module in accordance with predetermined safety protocols.

In one embodiment, the safety controller S502 is configured to log each instance of human proximity detected within a predefined safety zone. The safety controller continuously monitors data from the multi-modal proximity detection suite S500, which comprises a 360-degree LiDAR sensor and at least one thermal imaging sensor, and upon detecting human presence, it records pertinent information associated with the event. This recorded information includes a timestamp, sensor output data, and contextual details such as the intensity of the detected signal and the estimated distance between the mobile robot and the human. The logging function enables real-time responses such as speed reduction, audible warnings, or emergency stops via the intervention module S504, while also supporting subsequent analysis for system safety verification and performance improvement. In addition, the logged data is stored in a local memory module or transmitted to a centralized system for extensive analysis by the onboard processor S600 or the central orchestration engine S802. In various embodiments, the safety controller S502 further categorizes logged events based on parameters such as the duration of human presence or the cumulative frequency of proximity interactions, thereby facilitating dynamic adjustment of operational parameters and safety protocols to mitigate risk. This approach ensures that every human proximity event is systematically documented, providing valuable insight into the interaction between the robot and its environment and contributing to enhanced situational awareness and overall safety in dynamic warehouse operations.

In one exemplary embodiment, the intervention module is configured to issue a pre-recorded verbal warning via a speaker upon detection of a human in a predefined risk zone. The intervention module, implemented as an integrated circuit or a dedicated microcontroller, monitors signals from one or more onboard sensors and, upon determining that a human is within a hazard area, retrieves a pre-recorded message stored in non-volatile memory. The message, which includes cautionary instructions such as "please maintain a secure distance" or "caution: robot approaching," is broadcast through a speaker that is strategically mounted on the mobile platform to ensure effective audibility throughout the operational area. The speaker incorporates an integrated amplifier to deliver the auditory cue at an adequate sound pressure level, overcoming ambient noise within the environment. In certain embodiments, the intervention module also adjusts audio output parameters in response to real-time ambient noise measurements, ensuring that the verbal warning remains audible. Additionally, the intervention module is configured to log each instance of an audible warning, thereby providing data for subsequent hazard analysis or regulatory compliance. In further embodiments, the intervention module operates in concert with a control module that processes inputs from various sensors and issues a command to the intervention module based on detected human proximity. Upon receiving this command, the intervention module automatically initiates the broadcast of the pre-recorded verbal warning through the speaker. Alternate embodiments incorporate redundant audio output systems so that if the primary speaker malfunctions, an auxiliary output device, such as a portable handheld speaker, is activated to ensure continuity of the audible alert function. Moreover, the intervention module is linked to a communication interface that permits remote updates to the pre-recorded messages, thus allowing the warning messages to be modified in accordance with evolving operational or regulatory requirements. This arrangement provides a robust, dynamically responsive mitigation mechanism intended to enhance the overall reduction of collision hazards in human-robot interactions.

The safety controller is configured to detect not only the presence of humans but also to identify specific human gestures that indicate an intention for manual override of the robot's autonomous operations. In one embodiment, the safety controller processes data obtained from a combination of sensors, such as those provided by the multi-modal proximity detection suite and additional onboard vision sensors, to discern human gestures from routine motion or incidental movements. This detection capability is achieved through the integration of real-time sensor fusion algorithms that analyze spatial and temporal patterns associated with predetermined gesture signatures. For example, the safety controller leverages data from an onboard camera and other proximity sensors to capture detailed visual information, which is subsequently processed using machine learning techniques trained on a dataset of operator-initiated gestures. Upon recognition of a gesture indicative of manual override, the safety controller communicates a directive to the intervention module to initiate appropriate safety responses—ranging from a reduction in speed to the execution of an emergency stop operation—to immediately suspend autonomous functions. This configuration ensures that the system remains responsive to operator commands in dynamic operational environments, thereby enhancing the overall safety and flexibility of the robotic system in warehouse or similar settings.

In one embodiment, the proximity detection suite comprises a multi-modal sensor array that includes a 360-degree LiDAR sensor and at least one thermal imaging sensor. The thermal imaging sensor captures temperature differentials in the surrounding environment, while the LiDAR sensor provides precise distance measurements and detailed environmental mapping. The suite is calibrated to distinguish between humans and inanimate obstacles by correlating thermal data with spatial data. In particular, the system incorporates software algorithms that analyze the thermal signature of objects; human bodies, typically emitting a distinctive heat profile, are differentiated from inanimate objects that generally exhibit reduced or more uniform temperature distributions. The calibration process involves setting baseline thresholds for expected temperature variations and implementing adaptive filtering routines that adjust these thresholds based on ambient temperature changes or dynamic environmental conditions. Data from both sensors are fused in real time, enabling the system to confirm that detected objects meet both the thermal criteria indicative of human presence and the spatial criteria, such as movement patterns and dimensional profiles, consistent with humans. When discrepancies arise, the system initiates additional analysis to reduce the risk of false positives or false negatives. Furthermore, periodic recalibration routines are performed by the controller to account for sensor drift and environmental variations, ensuring sustained reliability in object discrimination. This calibration enhances the overall safety features of the system by enabling precise activation of subsequent human-specific interventions, such as audible warnings, speed reduction, or emergency stops, only after an accurate classification of the detected object as a human.

Is designed to detect human presence within a predefined safety zone and supports over-the-air updates for safety algorithms. In various embodiments, the S502 receives updated safety algorithms via a secure wireless communication channel, allowing modifications to be implemented without requiring a manual update or physical access to the robot. The updated safety algorithms incorporate, for example, revised parameters for human detection thresholds, adjustments to trigger conditions for the intervention module (S504), or modifications in timing for executing one or more of the speed reduction, audible warning, or emergency stop functions upon detecting human proximity. The over-the-air update mechanism enables the S502 to verify the integrity and authenticity of the received data prior to integrating the new algorithms into its operational firmware. This functionality guarantees that the system maintains a robust level of safety and responsiveness, even as new or refined safety protocols are developed. Furthermore, integrating the over-the-air update capability allows for real-time updates to be distributed across a fleet of robots, thereby ensuring consistent adherence to the latest safety standards and operational requirements during active warehouse operations.

In one embodiment, the robot includes a safety controller configured to continuously monitor its environment for the presence of a human within a predefined safety zone. Upon detecting a human, the safety controller immediately initiates a payload disabling routine that prevents any operation of the payload handling system, such as a telescopic lift and variable-width gripper. The safety controller receives inputs from one or more sensors, including a multi-modal proximity detection suite that incorporates a 360-degree LiDAR sensor and at least one thermal imaging sensor, to accurately detect the presence and location of a human in the vicinity of the robot. When the sensors indicate a human is located within the safety zone, the safety controller processes the sensor data and activates an intervention module that interrupts or inhibits any commands intended for payload handling. In certain embodiments, the intervention module executes actions such as halting payload actuator signals, ensuring that no payload movement or handling occurs until the human is no longer detected within the risk area. This automated disabling of payload handling provides a protective measure for human operators in the vicinity of the robot during its operational activities.

In one embodiment, the multi-modal proximity detection suite (S500) incorporates redundant sensors to achieve fault-tolerant operation during continuous task execution in a dynamically changing environment. For example, the suite can include a primary 360-degree LiDAR sensor together with at least one thermal imaging sensor arranged so that their fields of view overlap, ensuring that if one sensor fails or produces anomalous readings, an alternative sensor independently confirms the presence of obstacles or human operators. The redundant sensors are interfaced with a control module (S502) that continuously monitors sensor outputs and compares detection signals to verify consistency. In the event of a discrepancy or sensor failure, the system prioritizes reliable sensor data and signals an intervention module (S504) to execute appropriate measures such as speed reduction, audible warnings, or an emergency stop. This redundant configuration not only enhances the reliability of the proximity detection system but also minimizes potential operational hazards by ensuring that backup sensor data is available to support real-time decision-making. In practice, redundant sensors contribute to a layered strategy by offering multiple independent detections of proximate obstacles, thereby allowing the system to maintain proper operational status even in scenarios where one of the sensors is compromised.

In one embodiment, the safety controller records video footage during safety events for incident analysis. The safety controller triggers video recording upon detection of a safety event, capturing a continuous stream of digital video data from one or more onboard cameras. The recorded footage includes pre-event contextual data as well as subsequent footage following the event to provide a comprehensive record for later examination. The captured video data is stored in a local memory module or transmitted to an external data repository for further analysis. The safety controller, in conjunction with onboard imaging devices, synchronizes the recorded video with data obtained from additional sensors, such as LiDAR, stereo vision, and ultrasonic sensors, to create a correlated dataset that illustrates the exact circumstances surrounding the safety event. This approach facilitates incident review and analysis, enabling an accurate reconstruction of the event dynamics, which supports system diagnostics, user training, and the implementation of future safety improvements.

In some embodiments, the intervention module (S504) is configured to detect a human presence in a predefined safety zone and, in response, execute one or more safety measures. For example, in addition to taking remedial actions such as reducing the operating speed or issuing an audible warning, the intervention module is configured to send a notification to a supervisor terminal. In these embodiments, the intervention module utilizes one or more communication interfaces to wirelessly transmit the notification to a remote supervisor terminal, thereby enabling timely human oversight of the robot's operation. The transmitted notification includes data pertaining to the detected human presence, such as proximity measurements, timestamp information, location data of the mobile chassis (S100), and other relevant sensor data. Additionally, the notification indicates the type of remedial action undertaken by the intervention module, thereby providing detailed situational awareness to the operator. The supervisor terminal further displays diagnostic information and logs generated by the intervention module, which facilitates further analysis and potential system recalibration. By integrating the notification functionality into the intervention module, the robotic system ensures that anomalous conditions, such as unauthorized human entry into the safety zone, are promptly communicated to supervisory personnel to allow for immediate intervention and mitigation measures.

In one embodiment, the protection controller (S502) adjusts the protection zone parameters in response to warehouse congestion. In this embodiment, the controller receives real-time data from an array of onboard sensors that monitor the presence and movement of personnel throughout the warehouse. The data originates from the multi-modal proximity detection suite (S500), which includes devices such as a 360-degree LiDAR sensor and at least one thermal imaging sensor, as well as from supplementary sources like overhead cameras or fixed sensors installed across the facility. Based on this input, the controller determines the current congestion level by analyzing the spatial distribution and density of personnel. When the detected congestion level exceeds a predetermined threshold, the controller dynamically modifies the dimensions and boundaries of the protection zone, creating an increased buffer area. Conversely, when congestion decreases, the controller contracts the protection zone parameters to promote more efficient robot operation while still maintaining adequate separation distances between moving robots and personnel.

In certain embodiments, the safety controller processes congestion metrics using algorithms that consider both the number of individuals detected and the velocity at which they are moving. For example, during periods where congestion is considerable and slow-moving crowds are identified near robot operational paths, the safety controller can increase the zone radius to further mitigate potential collision risks. Alternatively, when congestion is moderate or decreases rapidly, the controller can gradually reduce the zone size to restore operational efficiency without compromising system protection. This dynamic adjustment of parameters is accomplished by the controller issuing control commands to the intervention module (S504), which in response can execute actions such as reducing operating speed, issuing audible warnings, or initiating an emergency stop to ensure robot operation in a secure manner.

Furthermore, the safety controller can be interconnected with a central orchestration engine, allowing it to communicate updated safety parameters to other robots within a deployed fleet. In this manner, robots can coordinate their movements based on shared environmental awareness and congestion data provided by the safety controller. The integration of congestion data not only improves the responsiveness of the safety controller to varying warehouse conditions but also contributes to an overall reduction in the risk of human-robot collisions. This adaptive behavior ensures that safety protocols are maintained in both densely and sparsely populated operational scenarios, thereby optimizing safety and throughput in dynamic warehouse environments.

According to one embodiment, the safety controller (S502) is configured to detect human presence within a predefined safety zone and is further modified to support a manual override function operable by authorized personnel. In such embodiments, the manual override feature permits an authorized individual to suspend one or more automatic intervention actions initiated by the safety controller, such as emergency stops, audible warnings, or automatic speed reductions. The manual override function is implemented via a secure communication channel that incorporates authentication protocols to ensure that only personnel with proper authorization can activate this mode. For example, the override mechanism incorporates a physical pushbutton, a keypad entry system, or a remote communication device that verifies the identity of the user through password entry, biometric authentication, or an RFID-enabled access control system. When the manual override is activated, the safety controller transitions from its default automated safety operation to a mode that prioritizes direct human intervention. In this mode, the controller suspends its regular automated responses while maintaining the capacity to monitor environmental conditions and log all manual override events for subsequent analysis. The system is designed to periodically confirm that the authorized override remains valid and to automatically revert to normal safety operations once the override is no longer necessary. Furthermore, the safety controller is configured to generate visual or audible alerts and to record a secure log entry detailing the override event, including time, user credentials, and system state information at the time of override activation. This implementation of manual override functionality provides increased operational flexibility during maintenance or emergency situations while preserving the overall integrity of the automated safety features.

In one embodiment, an edge AI module for an autonomous mobile robot operating in a warehouse is provided. The edge AI module comprises an onboard processor configured to execute a neural network model for real-time task prioritization and navigation decisions. The onboard processor is capable of processing complex algorithms that dynamically assess task queues and environmental conditions encountered within the warehouse. The sensor interface is configured to receive data from multiple sources, including LiDAR, vision sensors, and inertial sensors, and to convert the raw sensor signals into a format suitable for rapid processing. The decision engine is configured to select optimal actions based on the current sensor data and task queue without requiring continuous communication with a central server. By integrating multiple sensor inputs, the decision engine compares real-time data against a predefined set of operational parameters, ensuring obstacle avoidance and efficient path planning. The neural network model executed by the onboard processor is trained with historical operational data to enhance its ability to predict environmental changes and adjust navigation paths dynamically. Additionally, the decision engine utilizes data fusion techniques to process sensor inputs collectively rather than independently, enabling it to generate a holistic situational awareness for the autonomous mobile robot. As a result, the edge AI module supports robust, decentralized decision-making that reduces latency, improves response times, and increases overall operational safety and efficiency in dynamic warehouse environments.

In one embodiment, the neural network model is trained to recognize dynamic obstacles, such as moving objects, other robots, or pedestrians within the operating environment, and to subsequently generate alternative paths that circumvent these obstacles. The model is developed using a training dataset that comprises sensor data captured during a range of operational conditions and environments. The training dataset includes data derived from one or more sensors such as a LiDAR sensor, a stereo vision camera, and an ultrasonic sensor, thereby enabling the model to discern differences between static and dynamic obstacles. The training process incorporates supervised machine learning techniques, where annotated examples of dynamic obstacles and corresponding secure navigational responses are provided, ensuring that the model learns to differentiate between transient obstacles and stationary objects. The model's weights are iteratively adjusted during training so that it can generalize to unseen scenarios by associating particular motion patterns and spatial characteristics with dynamic hazards. Furthermore, the model is implemented on an onboard processor configured to execute the trained neural network in real time. Upon detecting a dynamic obstacle, the neural network is capable of triggering the reactive path planner to generate a collision-free trajectory. Integration with a sensor fusion module enables sensor inputs to be dynamically weighted based on current environmental conditions, ensuring that the environmental map used for navigation reflects the most current status of the robot's surroundings. By continuously comparing real-time sensor data against the learned representations of dynamic obstacles, the neural network model quickly recognizes emerging hazards and automatically adjusts the navigational path. The rerouting operation is executed without requiring continuous communication with a remote server, thus ensuring prompt and autonomous decision-making even under conditions of intermittent external connectivity. In addition, techniques such as reinforcement learning are incorporated during the training phase to further optimize the model's decision process in complex, dynamic scenarios where obstacles exhibit unpredictable movement patterns. These training and integration techniques collectively enable the neural network model to enhance overall navigational security and operational efficiency in environments characterized by continual dynamic changes.

In certain embodiments, the decision engine (S604) is configured to select optimal actions based on current sensor data and an associated task queue, wherein it further prioritizes tasks according to predicted completion times. In one embodiment, the decision engine computes predicted completion times by evaluating parameters such as travel distance, estimated processing requirements, and environmental factors derived from the sensor suite (S104) and onboard inertial sensors. The predicted completion times are also influenced by current battery status as reported by the battery module (S400) and by the performance characteristics of the drive system (S102), ensuring that real-time updates to predicted task durations exist for each task in the task queue. Furthermore, the decision engine dynamically adjusts task prioritization by continually monitoring sensor inputs via the sensor interface (S602) and by integrating data from the onboard processor (S600), which executes the neural network model for real-time task prioritization and navigation decisions. As warehouse conditions change—either due to the emergence of new obstacles detected by the sensor fusion module (S106) or due to updates received from remote central task scheduling (S300)—the decision engine recalculates predicted completion times and reorders the task queue to allocate resources toward tasks that can be completed in a timely manner. This prioritization based on predicted completion times enables the mobile robot to maximize operational efficiency by minimizing idle time and ensuring that tasks with shorter predicted durations are executed promptly, thereby optimizing overall workflow continuity.

Configured to execute a neural network model for real-time task prioritization and navigation decisions includes dedicated hardware acceleration to support neural network inference. In one embodiment, the onboard processor incorporates an integrated neural network processing unit optimized for performing the extensive matrix multiplications and convolution operations inherent in neural network models. This hardware acceleration is designed to reduce inference latency, thereby enabling rapid analysis of incoming sensor data and immediate decision-making in dynamic operational environments. In alternative embodiments, the onboard processor could employ one or more additional hardware acceleration components, such as a graphics processing unit or a digital signal processor, to parallelize computations across multiple neural network layers. The integration of such dedicated hardware minimizes the computational load on the central processing capabilities and allows more efficient handling of real-time data streams derived from sensor suites like element S104 and corresponding sensor interfaces. Furthermore, this hardware acceleration facilitates energy-efficient processing by reducing overall power consumption during intensive neural network inference operations, which is essential for sustaining prolonged robot operation on battery modules such as element S400. The streamlined processing architecture permits the onboard processor to maintain robust throughput for continuous task prioritization and navigation adjustments in response to evolving environmental conditions.

For example, in a typical operation, as new sensor data is received, the decision engine rapidly determines if any changes in the environment necessitate a reordering of tasks. These changes could include the detection of an unexpected obstacle, variations in energy consumption patterns, or the emergence of more time-sensitive tasks. The decision engine then updates the task prioritization structure, ensuring that the most urgent and appropriate tasks are executed without delay, with the update process being completed within 200 milliseconds or less.

This rapid response is indispensable to the overall system's performance, particularly in dynamic environments where conditions can change abruptly. The decision engine's ability to swiftly reassess and adjust priorities leads to superior task efficiency and augmented safety during operation. This rapid update capability is implemented through optimized processing algorithms that leverage parallel processing architectures and dedicated processing resources, such as the onboard processor (S600).

Furthermore, the decision engine is configured to function without constant communication with a central server, allowing it to operate autonomously even in scenarios where network connectivity may be intermittent or latency is a concern. This self-contained capability ensures that task prioritization can be maintained at a rapid pace regardless of external communication delays, thereby sustaining the overall system performance and reliability.

In one embodiment, the module is configured to store in nonvolatile memory a complete or partial digital representation of the warehouse layout for offline use. During operation, the local copy of the warehouse map is continually updated through periodic synchronization with the central server when connectivity is available, ensuring that any modifications or reconfigurations within the warehouse environment are accurately reflected. The module derives the digital representation from sensor data provided by a sensor suite that includes devices such as LiDAR sensors and vision cameras, processing the raw data into a structured map that captures static features like shelving units and permanent fixtures as well as dynamic operational zones. This locally stored map allows the robot to perform navigation, obstacle detection, and path-planning operations reliably even without external communication links by serving as a reference framework for fusing sensor inputs and executing pre-planned trajectories. The module's onboard processor automatically switches from real-time, network-dependent operation to offline operation, during which it uses the locally stored map to generate collision-free paths and support task execution when network connectivity is interrupted. As a result, the module enhances the robustness and autonomy of the robot by ensuring continuous operational capability and enabling essential safety-oriented decision-making in environments where communication disruptions would otherwise compromise navigation and obstacle avoidance performance.

In one embodiment, the neural network model is implemented on the onboard processor S600 and configured to execute real-time task prioritization and navigation decisions by processing data received from various sensors via interface S602. The neural network model is further integrated into the decision engine S604, which facilitates the selection of optimal actions based on aggregated sensor data without requiring continuous communication with a central server. In certain embodiments, the neural network model is updated through secure over-the-air firmware updates to ensure that its performance remains optimal with evolving warehouse conditions and updated obstacle patterns. These secure firmware updates employ cryptographic protocols to authenticate the firmware source and protect the integrity of the update process. Through such secure updates, the neural network model incorporates enhancements in computational efficiency and recognition accuracy, thereby improving real-time navigation and task prioritization capabilities. The firmware update mechanism is designed to operate seamlessly during periods of diminished robot activity to minimize any potential disruption in operations and includes fallback mechanisms to revert to a previous stable version of the firmware if an update fails to meet predefined performance and security benchmarks. By incorporating secure over-the-air firmware updates, the neural network model remains adaptive and resilient to new data patterns and potential security threats, ensuring that the onboard processor continuously executes an optimized model that reflects the latest operational requirements and environmental conditions.

In one embodiment, the decision engine (S604) is further configured to log each decision made during operation for subsequent post-operation analysis. In one example, the decision engine records sensor input data received from interconnected sensor modules (such as S104 and S602), the intermediate variables generated during decision computations, the selected optimal action derived in response to the real-time task queue, and the output command issued to the navigation controller (S108) or other operating modules. The decision engine stores the logged data along with associated metadata, including time stamps, sensor identifiers, decision weights, and environmental context parameters. The logging mechanism includes a buffering scheme that ensures no decision is lost due to operating at a rapid frequency, with the buffered data subsequently committed to either onboard nonvolatile memory or transmitted to an external central repository for analysis. The stored logs facilitate a retrospective analysis of the decision process, enabling system diagnostics by identifying anomalies in sensor performance, latency in decision making, and errors in weighting algorithms. Furthermore, the post-operation analysis undertaken using the logged data assists in optimizing decision thresholds, refining neural network model parameters executed by the onboard processor (S600), and recalibrating sensor fusion routines. The structured logging includes, for example, a timestamp field, a decision identifier, sensor input values, computed decision metrics, and corresponding output actions, thereby providing a comprehensive record of the operational decision history. Such detailed logs contribute to ongoing enhancements of system safety and efficiency and support regulatory and quality assurance requirements by enabling evidence-based evaluations of the decision engine's performance.

In one embodiment, the module comprises a neural network inference engine that receives input data from various sensor interfaces and processes this data to generate control signals. In the event that the neural network inference fails to produce reliable results-due, for example, to anomalous sensor data or computational errors—the module is configured to automatically support a fallback to rule-based logic. This fallback logic is implemented as a deterministic rules engine that processes the same input data to generate predetermined control signals based on established decision criteria. The system continuously monitors the output of the neural network inference engine and compares its confidence level against a preselected threshold. When the confidence level falls below the threshold, the module seamlessly transitions to the rule-based logic mode to maintain real-time system performance. The rule-based logic is encoded with a series of failover instructions that enable operation under degraded conditions, thereby preventing system stalling or erroneous behavior resulting from neural network uncertainties. This dual-mode operational capability ensures that the module maintains robust performance across a range of operational conditions. The module includes programmed instructions stored in non-transitory computer-readable memory that direct an onboard processor to evaluate neural network outputs, initiate the fallback procedure as required, and log events associated with any transition to rule-based logic. Furthermore, the design of the module supports periodic verification of neural network inference outcomes against those derived from the rule-based logic, ensuring ongoing system calibration and reliability. This adaptive fallback mechanism is integrated within the overall control architecture to automatically and unobtrusively ensure continued operation even when neural network inference conditions are compromised.

The system may employ predetermined weighting factors or adaptive feedback control schemes, where the decision engine adjusts its prioritization based on an analysis of the battery status provided by S404 and the demands of the drive system and payload operations. In this manner, the decision engine is capable of deferring tasks that are of lesser urgency when energy reserves are insufficient, or, conversely, accelerating energy-efficient routing of tasks when battery conditions are favorable. Additionally, the integration of the decision engine with the energy optimization controller supports dynamic recalibration of task assignments in response to fluctuating energy metrics, thereby ensuring sustained operational capability while optimizing energy usage.

In embodiments employing centralized orchestration (such as S802), the decision engine is configured to exchange energy metrics and task urgencies with other elements of the fleet management system, enabling a coordinated approach to energy conservation across multiple mobile robots. This system-wide communication further refines the balance between immediate task requirements and sustained energy preservation, ultimately extending operational lifetime and reducing the frequency of unscheduled charging events. The decision engine's firmware or software iteratively adjusts its prioritization logic to ensure that each selected action minimizes energy waste while still fulfilling urgent operational responsibilities in real time.

In some embodiments, the module is configured to operate in conjunction with various sensor inputs to facilitate real-time anomaly detection in sensor data. The module is operatively connected to a sensor suite comprising a LiDAR sensor, a stereo vision camera, and an ultrasonic sensor and is set up to continuously monitor incoming signals. The module analyzes sensor data in real time by comparing each received signal against expected operational parameters and predetermined thresholds. For example, the module conducts statistical analysis, filtering, and pattern recognition to identify abrupt deviations or aberrations in sensor readings that indicate sensor malfunction, environmental interference, or other anomalous conditions. When an anomaly is detected, the module dynamically adjusts the weighting factors applied to sensor inputs during the fusion process to minimize the impact of erroneous data on the unified environmental map generated by the sensor fusion module. The module also triggers remedial actions such as recalibration routines or issues alerts to higher-level control systems, including a navigation controller, thereby ensuring that control decisions are based on reliable sensor information. In embodiments where the module integrates processing components capable of executing neural network models, predictive analytics are performed to further enhance the ability to detect subtle deviations in sensor performance. This real-time anomaly detection capability supports robust operation in dynamic and potentially unpredictable environments by ensuring that the overall system maintains accurate situational awareness even if one or more sensor inputs temporarily deviate from nominal operating conditions.

The decision engine is configured to monitor the confidence level associated with each computed decision during autonomous operation. In one embodiment, the decision engine continuously evaluates the output generated by algorithms executing on the onboard processor and compares the computed confidence level to a predetermined threshold. When the confidence level falls below the threshold, the decision engine initiates a request for human intervention. This request is conveyed either via an onboard communication interface or transmitted to a centralized control system that coordinates human oversight. The intervention includes manual override commands, additional parameter adjustments, or redirecting the task to ensure the safety and efficiency of operations.

In embodiments where the decision engine is integrated within a broader system that incorporates sensor inputs from a LiDAR sensor, a stereo vision camera, and an ultrasonic sensor (S104), the engine employs a neural network model executed by the onboard processor (S600) to generate action candidates. These candidates undergo a confidence evaluation, and if the evaluated confidence does not satisfy the necessary threshold, the decision engine triggers an alert or intervention request. The system logs data related to decisions with insufficient confidence, thereby enabling subsequent analysis to refine the neural network model and enhance overall system robustness.

Furthermore, the decision engine interacts with a sensor fusion module (S106) that continuously updates the unified environmental map, ensuring that decisions remain contextually aware and rely on the latest operational data. By requesting human intervention during periods of reduced decision confidence, the decision engine introduces an additional layer of safety and reliability, particularly in dynamic or unpredictable environments.

In one embodiment, the neural network model is trained on a comprehensive dataset comprising warehouse-specific operational data, wherein the dataset includes historical and real-time sensor inputs obtained from various subsystems such as the sensor suite S104 and sensor fusion module S106. The dataset typically encompasses dynamic environmental information, including but not limited to shelf arrangements, transient obstacles, load distributions, and patterns of robot navigation and task execution within the warehouse. The training process involves collecting extensive operational data over varied time periods and operational conditions, ensuring that the neural network model accurately reflects the specific characteristics, spatial configurations, and activity patterns prevalent within the warehouse environment.

During training, data normalization and augmentation techniques are employed to accommodate fluctuations in sensor readings and external disturbances, while iterative optimization methods such as backpropagation and gradient descent adjust the network weights. The adjusted weights enable the neural network to prioritize tasks and plan navigation paths in real time, taking obstacles and dynamic changes in the operational environment into account. Furthermore, the model is refined using cross-validation and performance metrics that compare predicted outcomes with actual performance data, thereby improving the accuracy and reliability of its decision-making capabilities.

In one embodiment, the module is configured to share learned navigation strategies with other robots in the fleet. The module collects operational data during navigation, including sensor inputs from LiDAR, cameras, ultrasonic sensors, and inertial measurement units, and processes this information to generate navigation strategies that optimize path planning and obstacle avoidance. As the robot traverses the warehouse environment, its onboard processor executes a machine learning algorithm that continually refines navigation tactics based on real-time interactions with dynamic obstacles and environmental conditions. The module encapsulates these strategies in a standardized data format and transmits them via an inter-robot communication protocol to other robots in the fleet. In one embodiment, the transmission occurs directly between robots over a wireless network, while in another embodiment, a central orchestration engine or middleware translation layer acts as an intermediary to facilitate the exchange of navigation strategies. The shared navigation data includes optimized trajectories, adaptive speed profiles, and risk assessments of transient obstacles, thereby enabling each robot to update its local navigation controller based on collective fleet experiences. Furthermore, feedback received from other robots regarding the efficacy of shared strategies is used to further tune and adapt the machine learning model, improving the overall performance of the fleet in real time. This collaborative approach leverages distributed learning, ensuring that improvements realized by one robot are rapidly propagated throughout the fleet and result in enhanced obstacle detection, route optimization, and adaptive responses to changes in warehouse conditions.

In an exemplary embodiment, the module is configured to support encrypted communication that ensures data privacy across the system. The module incorporates industry-standard encryption algorithms such as Advanced Encryption Standard (AES) and public key infrastructure (PKI) methods to securely encode data transmitted among subsystems. For example, when data is exchanged between the sensor interface and the decision engine, encryption is applied to prevent unauthorized access, thereby preserving the integrity and confidentiality of the sensed information. The module also integrates dynamic key management techniques that enable secure key exchange and periodic key rotation, further enhancing communication security across the network. In addition, during interactions with external systems—such as communications with a middleware translation layer or an API gateway—the module establishes secure channels using protocols like Transport Layer Security (TLS), ensuring that proprietary commands, sensor data, and control signals remain protected from interception or tampering. By implementing these encryption measures, the module delivers a robust security framework for inter-module communications while complying with stringent data privacy standards required in complex networked and robotic environments.

In one embodiment, the decision engine S604 is configured to adapt to changes in warehouse layout without retraining by incorporating adaptive algorithms that dynamically adjust decision parameters based on real-time sensor input and updated spatial data. The decision engine receives continuous data from various subsystems such as the sensor interface S602 and the fusion processor S708, which combines positional information from UWB tags, visual landmarks from an onboard camera S704, and digital map features stored in S706. By comparing current environmental observations with its stored spatial configuration, the decision engine identifies deviations indicative of layout changes, such as repositioned shelving or reconfigured aisles. Rather than relying solely on static pre-trained models, the engine leverages heuristic adjustments and parameter tuning routines that modify its decision-making process to account for these detected changes. As dynamic warehouse conditions are sensed, the decision engine recalibrates its algorithms—altering routing cost functions, obstacle avoidance thresholds, and task prioritization criteria—thereby negating the need to perform a complete retraining cycle. This adaptability is further enhanced by modular feedback loops that refine the engine's performance as modifications in layout occur, ensuring that navigation and task execution remain optimized. Integration with subsystems such as the energy optimization controller S404 allows the decision engine to also consider energy consumption patterns when adjusting operational parameters, thereby maintaining efficient operation under evolving warehouse configurations. Overall, the configuration enables the system to recognize, evaluate, and respond to physical changes within the warehouse in real time, ensuring continuous optimal performance without the downtime or resource expenditure associated with retraining.

In one embodiment, the module is configured to include a communication interface that supplies the necessary connectivity for remote access. The module comprises embedded circuitry that supports both wired and wireless communication protocols, enabling it to interface with a supervisor interface located at a remote site. The supervisor interface obtains real-time diagnostic data and operational parameters from the module, including status information such as error codes, performance metrics, and environmental conditions sensed during operation. In operation, the module continuously transmits diagnostic information over a secure communication channel, which enables a remote supervisor to monitor system health and detect potential faults or anomalies without requiring physical access to the module. The remote diagnosis feature further incorporates mechanisms for logging historical performance data and issuing alerts if predetermined thresholds are exceeded. This configuration facilitates proactive maintenance and system updates, reducing downtime and enhancing overall performance. In addition, the supervisor interface can be integrated with a broader network infrastructure, allowing centralized management of multiple modules across various locations and enabling coordinated diagnostics and maintenance scheduling based on aggregated data from the distributed system.

Is configured to monitor real-time sensor inputs received via the sensor interface (S602) and continuously evaluate the navigational status of the vehicle. In one embodiment, while performing task prioritization and path planning based on current sensor data, the decision engine assesses potential navigation conflicts that arise from dynamic obstacles or unexpected environmental changes. If the decision engine determines that a navigation conflict remains unresolved after multiple attempts at recalculating an alternative obstacle-avoiding path, it escalates an alert indicating the persistent conflict. The escalation process involves transmitting an alert signal to the safety controller (S502) and/or intervention module (S504), which in turn implements predefined measures such as speed reduction, audible warnings, or an emergency stop. In embodiments where the decision engine is integrated with a communications framework, the alert is forwarded via a middleware translation layer (S800) or an API gateway (S804) to a central orchestration engine for further action or to notify an operator. Additionally, the decision engine logs diagnostic data related to the conflict that supports subsequent analysis and refinement of navigation algorithms. The implementation of the decision engine ensures that even in complex scenarios where standard navigation resolution fails, the system promptly escalates the issue to maintain operational safety and integrity.

In one embodiment, the neural network module conducts periodic self-assessments of its performance to ensure that outputs remain accurate and reliable in real-time operations. The module initiates a self-assessment routine based on a predetermined time interval or upon detection of significant changes in input sensor data obtained from sensors such as LiDAR, stereo vision cameras, ultrasonic sensors, or other onboard sensing elements. During the self-assessment process, the module compares current performance metrics against historical benchmark data stored in memory or communicated from an external calibration source. The assessment involves evaluating output parameters from the neural network—such as classification confidence levels, decision probabilities, or anomaly detection scores—and determining whether any deviations from expected performance thresholds have occurred. In response to detecting performance drift or suboptimal outputs, the module automatically triggers internal recalibration routines or adjusts network parameters, such as weights or bias terms, to restore optimal functionality. In addition, the periodic self-assessment includes cross-comparison with redundant or complementary sensor systems, ensuring that discrepancies between sensor inputs and model predictions are minimized. The module logs self-assessment data and generates performance reports that are periodically reviewed by a central processing system or an external monitoring entity to facilitate continuous improvement and support maintenance decisions. Furthermore, the neural network performance self-assessment routine operates during periods of decreased workload to avoid interference with essential real-time operations, thereby balancing the need for continuous learning with overall system performance maintenance.

The system exploits the complementary strengths of UWB-based ranging techniques and vision-based landmark detection to overcome potential challenges such as signal multipath effects or occlusions in the visual field. In response to variations in the warehouse environment or transient interference, the fusion processor dynamically adjusts the weighting between the UWB measurements and the visual landmark data to provide robust, real-time positioning information. This heightened positioning accuracy facilitates precise robot navigation within the warehouse, enabling efficient operation in complex layouts with obstacles and changing environmental conditions.

Applies a genetic annealing algorithm to minimize non-line-of-sight (NLOS) errors in UWB data using landmark-matched visual feedback. In one embodiment, the fusion processor receives UWB-based time-difference-of-arrival (TDoA) measurements from the UWB tag (S700) and anchors (S702) while concurrently obtaining visual data from the onboard camera (S704). The processor then extracts visual landmarks from the image data and correlates these landmarks with features stored in the digital map (S706) to generate landmark alignment data. By combining the UWB-based coordinates with the landmark alignment data, the processor employs a genetic annealing algorithm that iteratively refines candidate solutions to correct position estimates.

The genetic annealing algorithm incorporates elements of genetic optimization and simulated annealing whereby an initial population of candidate correction factors is generated and evaluated against a fitness function defined by the discrepancy between UWB-derived coordinates and the landmark-matched coordinates. Random mutations and crossover operations are introduced to expand the candidate solution space, while an annealing schedule is applied to gradually reduce the randomness of the search as the algorithm converges on an optimal solution. In each iteration, candidate solutions that result in reduced coordinate errors under NLOS conditions are selected for further refinement, while those associated with higher discrepancies are discarded. This process continues until the algorithm converges on a set of optimized correction factors that robustly minimize the impact of NLOS errors.

In one embodiment, the digital map (S706) is configured to include predefined interference zones. These zones are areas within the warehouse environment identified as having conditions that degrade the quality of UWB-based positioning, such as multipath effects, electromagnetic interference, or obstructions that impede reliable radio frequency transmission. The digital map stores data corresponding to these zones, allowing the fusion processor (S708) to recognize regions where sensor inputs are less reliable. When the fusion processor calculates UWB-based coordinates using time-difference-of-arrival (TDoA) measurements between the mobile robot's UWB tag (S700) and a plurality of UWB anchors (S702) according to its standard operation, it encounters degraded data within these interference zones. To address this, the fusion processor is programmed to dynamically adjust its sensor weighting; specifically, it increases reliance on image data captured by the onboard camera (S704) and analyzed to extract visual landmarks, as detailed in its processing steps. The processor aligns the extracted landmarks with the structural features stored in the digital map, thereby generating corrected robot coordinates. By prioritizing image data over UWB data within the predefined interference zones, the system enhances positioning accuracy. This adjustment is made in real time based on the location information provided by the digital map, ensuring that the robot maintains navigation precision despite localized degradation of UWB signals. The method integrates both UWB-based positioning and vision-based analysis, with the processor dynamically selecting the optimal sensor inputs in accordance with the environmental conditions as defined in the digital map.

The system further comprises an inertial measurement unit (IMU) operatively connected to the fusion processor such that the processor receives inertial data comprising accelerometer and gyroscope outputs. In operation, the fusion processor integrates the IMU data with the UWB-based coordinate calculations and landmark alignment data to maintain accurate positioning when UWB signals are lost or when misalignment of visual landmarks occurs. The IMU provides supplemental motion and orientation measurements that enable the fusion processor to estimate current coordinates by interpolating between known landmarks and prior UWB-derived positions. During instances in which the UWB signals become temporarily unavailable or when visual landmark extraction fails due to environmental conditions, the inertial data compensates for these deficiencies by supplying continuous feedback on device movement. This integration minimizes positional drift and ensures robust navigation and positioning, thereby maintaining the integrity of the unified environmental map. The fusion processor dynamically weighs the IMU inputs relative to UWB-based coordinates and landmark alignment data based on signal quality, thereby enhancing the overall reliability of the system in environments when sensor signal interruptions or misalignments occur.

In one embodiment, the fusion processor (S708) is configured to update the digital map (S706) in real time by incorporating newly detected visual landmarks. The fusion processor receives image data from an onboard camera (S704) and processes this data to extract visual landmarks that were previously unrepresented within the digital map. The processor then aligns these newly extracted landmarks with corresponding known features stored in the digital map, adjusting for any discrepancies between the newly detected data and the existing structural features. This alignment process involves comparing geometric and spatial relationships of the landmarks to those represented in the digital map and dynamically recalibrating positions to account for changes in the environment. Consequently, the digital map is continuously refined, ensuring that the map reflects an up-to-date representation of the environment which enhances the robot's ability to navigate and plan obstacle-avoiding trajectories in real time.

In embodiments of the present disclosure, the onboard camera, designated S704, is configured as a 360-degree stereo vision sensor that has been meticulously calibrated for depth estimation. The sensor employs a dual-lens setup to capture stereoscopic images from every direction, thereby producing overlapping fields of view that facilitate the reliable computation of depth information in real time. Calibration involves fine-tuning both intrinsic and extrinsic parameters to ensure that the parallax differences between the stereo image pairs are accurately converted into three-dimensional spatial data. The processed depth information is subsequently integrated with inputs from additional sensors, such as the LiDAR sensor and the ultrasonic sensor included in S104, through the sensor fusion module S106. This integration supports the generation of a unified environmental map that is essential for effective obstacle detection and navigation. The resultant depth maps, which depict detailed spatial relationships among objects in the surrounding environment, enable the navigation controller S108 to plan and execute optimized, obstacle-avoiding paths. The stereo vision sensor's complete 360-degree coverage and refined resolution capabilities aid in detecting obstacles within dynamic and cluttered settings, thereby enhancing situational awareness and overall system safety. Calibration procedures are designed to maintain consistent accuracy under varying illumination and environmental conditions, ensuring that depth estimation remains reliable during both static and dynamic operations. The comprehensive capture of environmental imagery and precise depth measurements provided by S704 plays an instrumental role in bolstering the operational performance of the mobile robot and its navigational decision-making processes.

In one embodiment, the robot includes an RFID reader operatively mounted on the chassis, with the RFID reader configured to capture item-level RFID data from tagged items within its vicinity. The captured RFID data is transmitted to the onboard processor, which incorporates elements such as the sensor fusion module S106 and the onboard processor S600. The system fuses the RFID data with robot coordinates that are determined using a combination of UWB-based coordinates generated by components like the fusion processor S708 and sensor data from the sensor suite S104 or the multi-sensor fusion module S900. The fusion of the RFID data with accurate robot location information enables enhanced inventory tracking, facilitating real-time identification and location monitoring of inventory items. In embodiments that further integrate advanced mapping techniques, robot coordinates are refined by aligning visual landmarks extracted from an onboard camera, such as S704, with features stored in a digital map S706, thereby improving the accuracy of the inventory tracking system. The combined system effectively integrates item-level RFID data and dynamic robot coordinates to optimize inventory control and management within warehouse environments.

In one embodiment, the plurality of UWB anchors, such as element S702 from the reference sign table, are configured to achieve precise clock synchronization with one another and with external systems through either wired Ethernet or wireless WiFi connections. Each UWB anchor includes a network interface that, when connected via Ethernet or WiFi, enables it to receive synchronization signals and update its internal clock using established network time protocols. This synchronized clock information is then used to accurately timestamp the Ultra-Wideband (UWB) signals. The anchors subsequently transmit these timestamps to a central real-time location system (RTLS), which operates as a separate processing module within the overall system architecture. The RTLS aggregates timestamp data from multiple UWB anchors and uses the collected information to compute accurate positional data for mobile devices or robots within the operational environment. This network-based synchronization mechanism reduces potential timing errors that could negatively affect coordinate calculations, thereby enhancing the accuracy of robot localization and navigation. In alternative embodiments, the system automatically selects between Ethernet and WiFi based on network availability or quality of service parameters, ensuring robust performance even in fluctuating network conditions. Furthermore, the RTLS incorporates error correction algorithms to adjust for any residual discrepancies in timing information recovered from the UWB anchors. This approach provides enhanced coordination between the UWB anchor network and the central positioning computations, facilitating real-time monitoring and navigation in dynamic environments.

The system includes a real-time location system (RTLS) integrated with one or more mobile robots that continuously traverse the warehouse environment. The RTLS leverages data captured from positioning elements, such as ultra-wideband (UWB) tags and corresponding anchors, to accurately determine the spatial coordinates of each robot during operation. In one embodiment, the RTLS actively monitors robot movements and generates heatmaps that visually depict the frequency, duration, and distribution of robot paths throughout the facility. These heatmaps provide quantitative and qualitative insights into traffic flow density and temporal usage patterns of various areas within the warehouse. The analyzed heatmaps identify potential bottlenecks, underutilized zones, and areas with excessive congestion, thereby facilitating data-driven warehouse layout optimization. In response to the insights derived from the heatmaps, the warehouse management system dynamically adjusts task assignments, modifies the placement of inventory, repositions charging stations, or reconfigures aisle organization to enhance operational efficiency and improve safety. In addition, the system incorporates supplementary sensor data from onboard sensor suites and machine vision modules to refine the positional accuracy of the RTLS, ensuring that the heatmaps accurately reflect the true movement patterns of the robots. The comprehensive analysis enabled by the RTLS heatmaps supports iterative improvements to warehouse layout design and provides a feedback mechanism for continuously optimizing robot routing and task scheduling in real time.

In one embodiment, the digital map (S706) incorporates geofenced regions defined by predetermined spatial boundaries that correspond to various warehouse zones, structural features, and operational conditions. Within these geofenced regions, ultra-wideband (UWB) anchors (S702) are configured to dynamically switch between an active time-of-flight (ToF) mode and a passive time-difference-of-arrival (TDoA) mode. In the active ToF mode, a UWB anchor transmits signals that enable determination of the signal travel time between the anchor and a mobile UWB tag (S700), thereby generating precise distance measurements. Conversely, in the passive TDoA mode, the UWB anchor receives incoming signals and participates in measuring the relative time differences of arrival, permitting location determination by comparing timing data from multiple anchors.

This adaptive switching mechanism is realized by integrating positional data from the mobile robot with the geofenced region parameters stored in the digital map, thereby enabling enhanced coordination between the UWB anchors and the overall navigation controller (S108). Consequently, the digital map functions not only as a static repository of spatial information but also as an active element in dynamically optimizing the UWB localization process to improve real-time navigational accuracy and system efficiency.

In one embodiment, the mobile robot is an autonomous mobile robot (AMR) configured to perform goods transport within a warehouse environment. The AMR comprises a chassis, a drive system operable to move the chassis, and a sensor suite including a LiDAR sensor, a stereo vision camera, and an ultrasonic sensor. Sensor data from the sensor suite is processed by a sensor fusion module that dynamically weights the inputs based on detected warehouse conditions to generate a unified environmental map. The AMR further incorporates a navigation controller configured to plan and execute obstacle-avoiding paths in real time based on the unified environmental map. In addition, the mobile robot is equipped with a fusion processor that generates corrected robot coordinates by combining position data derived from multiple sources. Specifically, the robot includes an ultra-wideband (UWB) tag and communicates with a plurality of UWB anchors deployed in the warehouse to calculate UWB-based coordinates using time-difference-of-arrival measurements. WiFi UWB mode refers to the integration and coexistence of ultra-wideband (UWB) technology with WiFi networks, often within the same device or access point. In this mode, both radios operate in parallel, with UWB providing highly accurate, centimeter-level indoor positioning and ranging through short, low-power pulses across a wide frequency band (typically 3.1-10.6 GHz), while WiFi delivers high-speed data connectivity[123]. Modern enterprise WiFi access points, such as those supporting WiFi 6E or WiFi 7, are now being equipped with UWB modules to enable advanced use cases like precise indoor navigation, asset tracking, and AP-to-AP auto-positioning[3]. Coexistence protocols, such as timesharing or antenna sharing, are implemented to ensure that UWB and WiFi can operate simultaneously without interfering with each other, as real-world studies have shown that UWB transmissions do not measurably impact WiFi performance even in dense environments[45]. This dual-mode approach leverages the strengths of both technologies, enabling robust wireless communication alongside real-time, location-based services within the same infrastructure.

Concurrently, the onboard camera captures real-time image data from which visual landmarks are extracted and subsequently aligned with corresponding features in a digital map that stores structural characteristics of the warehouse. The fusion processor fuses the UWB-based coordinates with the landmark alignment data to produce corrected robot coordinates, thereby minimizing positional errors. These corrected coordinates are utilized by the navigation controller to optimize the AMR's route planning by ensuring that the planned path takes into account the most accurate and up-to-date positional information, reducing the risk of collisions and inefficiencies in the goods transport process. The integration of corrected robot coordinates not only enhances the ability of the AMR to navigate complex environments with dynamic obstacles but also improves the overall efficiency of transport operations by enabling optimized routing that accommodates both static infrastructural layouts and real-time changes in the operational environment.

In one embodiment, the fusion processor is configured to execute a deep reinforcement learning algorithm that enables the robot to continually optimize its positioning and navigation strategies based on real-time sensor inputs. In operation, the fusion processor receives data from multiple sources including UWB anchors, visual sensors, LiDAR, and inertial measurement units, and it initially computes robot coordinates by combining time-difference-of-arrival measurements with visual landmark alignment data. The deep reinforcement learning algorithm then processes this fused sensor data within a multi-layer neural network to evaluate environmental conditions, including the presence and movement of dynamic obstacles. The system assigns reward values to various navigational outcomes, such as collision avoidance, smooth deceleration, and efficient path re-routing, so that in subsequent decision cycles the fusion processor adapts its navigation parameters to reduce risk and optimize trajectory planning. Through repeated interactions with the environment under varying conditions, the fusion processor learns to anticipate changes in dynamic obstacles moving through the operational area and updates its neural network weights accordingly. The learning process is accelerated by incorporating simulation-trained models that reflect realistic warehouse conditions, such as scenarios with elevated traffic density and unexpected obstruction emergence. As a result, the fusion processor not only computes iterative corrections to robot positioning but also proactively recommends navigation adjustments, such as transient speed reductions, altered path curvature, or complete route changes, thereby ensuring continuous secure operation. This adaptive mechanism enhances the overall system performance by allowing the robot to dynamically adjust to obstacles encountered during operation without relying solely on preprogrammed pathways or fixed responses.

In an embodiment, the corrected robot coordinates are generated by a fusion processor that processes inputs from ultra-wideband anchor-based measurements and visual landmark extraction from real-time images. The fusion processor aligns the visual landmarks with corresponding features in a stored digital map and subsequently fuses this information with UWB-based location data to produce corrected robot coordinates. These coordinates are then transmitted to a user interface dashboard that renders a graphical representation of a warehouse environment in real time. The dashboard displays an overlay in which the corrected robot coordinates are shown alongside real-time inventory locations obtained from the warehouse management system. This overlay provides a dynamic visualization in which positional data corresponding to mobile robots, static obstacles, and inventory placement are simultaneously displayed for operator monitoring. In one example, the operator interface supports zooming and panning across the environment and includes interactive controls that allow the operator to select specific robots or inventory items to view detailed information. The integration of the corrected coordinates with the inventory overlay facilitates detection of deviations between planned routes and actual robot positions, thereby enabling rapid responses to potential operational issues. Feedback from the dashboard is used to update the central orchestration engine, which dynamically adjusts tasks and reassigns them among robots based on their corrected positions, inventory needs, and real-time obstacles within the warehouse. Additional features include highlighting discrepancies or generating alerts when a robot's trajectory deviates significantly from its planned path or when inventory locations are not congruent with the expected layout. This visualization enhances situational awareness and supports efficient management of warehouse operations by providing a comprehensive and continuously updated mapping of both robot positions and inventory locations.

In one implementation, the scheduler 300 also integrates data from energy management subsystems, such as energy optimization controller 404 and battery module 400, to evaluate the energy efficiency of each task assignment. This evaluation includes calculating the predicted energy requirements for upcoming tasks and comparing them with the available battery capacity of the assigned robots. Additionally, the scheduler 300 factors in the efficiency of each robot's navigation capabilities—as provided by navigation controller 108 which plans and executes obstacle-avoiding paths in real time based on a unified environmental map—thereby reducing travel time between task locations.

Figure 13A:
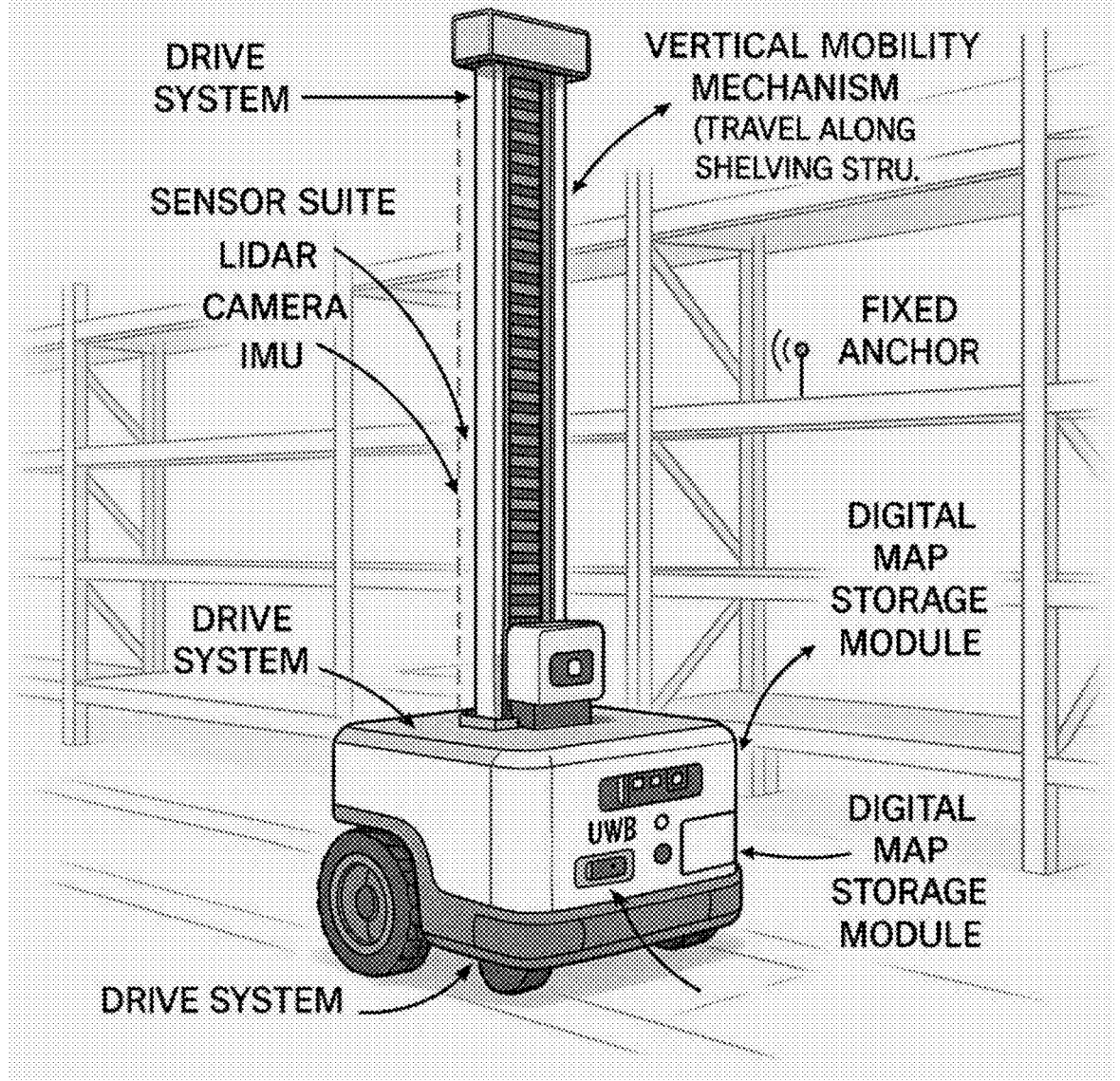
FIGS. 13A-13B illustrate two robots.

FIG. 13A shows an exemplary Mobile Robot with Navigation Sensors, UWB Positioning, Digital Map, and Vertical Mobility, shown in a three-dimensional warehouse aisle environment. The robot features a compact, rectangular wheeled base housing the main drive system. Four omnidirectional wheels are attached to the base, allowing smooth horizontal movement along the warehouse floor. Mounted centrally on the base is a vertical lift column or telescoping mast, which can extend upward to reach different shelf levels. At the top of the mast is a platform or payload module for interacting with inventory. A LiDAR sensor is mounted on the front-top of the chassis, providing 360-degree horizontal scanning for obstacle detection and mapping. One or more cameras are positioned around the chassis for visual recognition of inventory, shelf markers, and environmental features. An inertial measurement unit (IMU) is integrated within the chassis for motion and orientation tracking. Multiple WiFi UWB antennae are visible on the robot's body, communicating with fixed UWB anchors (depicted as small wall-mounted boxes) distributed throughout the warehouse. An onboard computer module is indicated, storing a digital map of the warehouse layout. Internal control electronics are shown, interfacing with the sensors, UWB module, and drive/lift actuators. The robot is depicted navigating between shelving units, with arrows indicating both horizontal travel along the floor and vertical movement up the shelving structure.

Figure 13B:
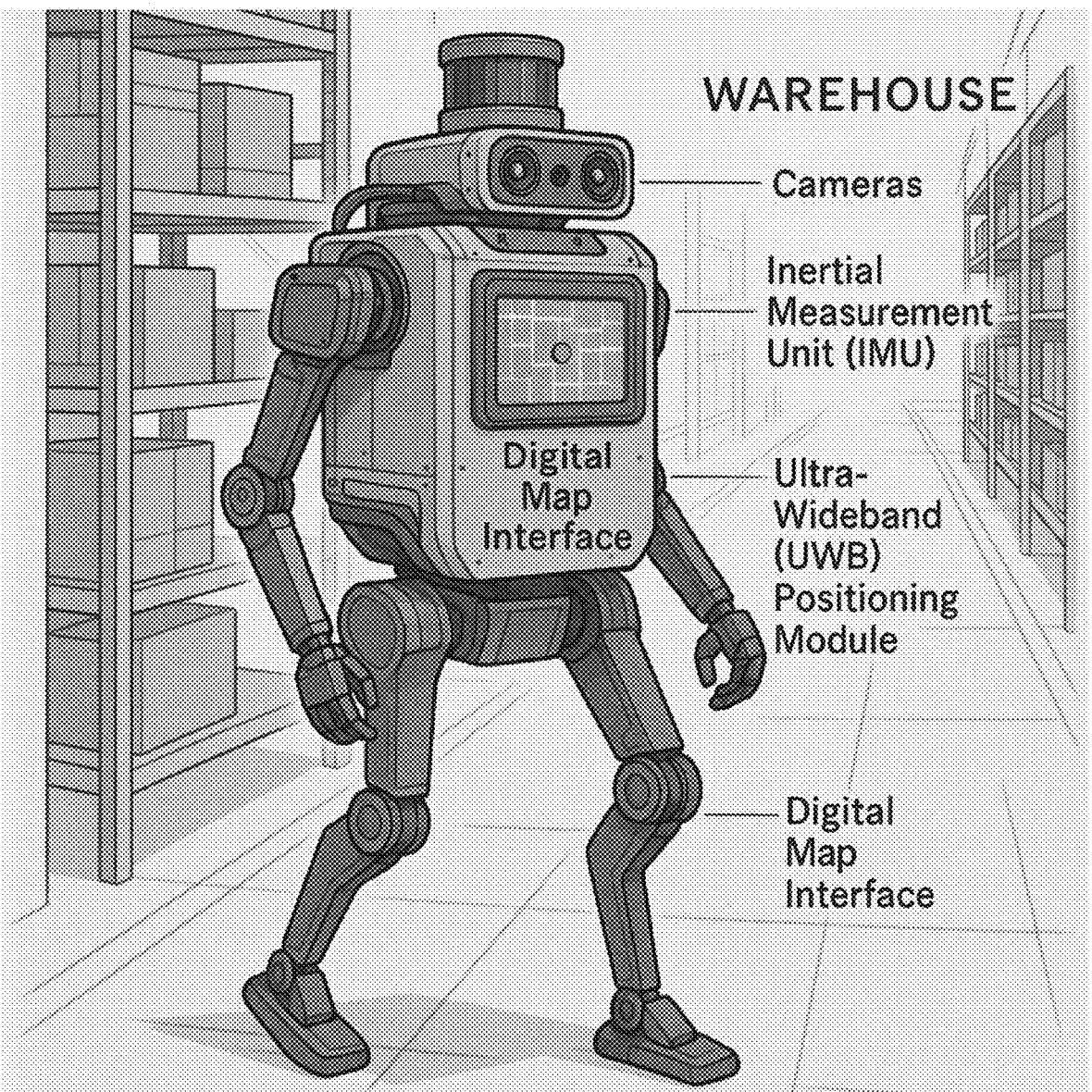

FIG. 13B shows an exemplary bipedal robot with Navigation Sensors, UWB Positioning, Digital Map, and Vertical Mobility. This figure illustrates a humanoid, bipedal robot operating in a warehouse environment, designed for advanced navigation and vertical mobility. The robot has a human-like torso, two articulated arms, and two articulated legs with feet designed for stable walking and climbing. The head contains a panoramic camera system (for visual recognition and mapping) and a LiDAR sensor mounted on top, providing 360-degree environmental scanning. Additional cameras may be mounted on the torso or limbs for close-up inspection and object recognition. UWB antennae are integrated into the robot's shoulders or torso, communicating with fixed UWB anchors mounted at intervals on warehouse walls and ceilings. An internal computer module, housed in the torso, stores the digital map of the warehouse, including shelving layouts and vertical access points. The robot's control system fuses data from the sensor suite and UWB module to localize itself and plan routes. The bipedal robot is shown walking along the warehouse floor, and in a secondary position, climbing a ladder or ascending a set of integrated shelf steps to reach higher inventory locations. The robot's arms are depicted reaching for or carrying inventory items, demonstrating its ability to interact with objects at various heights.

The robot's feet are broad and flat, increasing the contact area with the floor to enhance stability during both stationary and walking phases. The torso and heavier components, such as batteries and the digital map storage module, are positioned close to the robot's hip region. This lowers the center of gravity, reducing the risk of tipping during movement or when carrying loads. The legs are shown with multiple joints (hips, knees, ankles), allowing dynamic adjustments to posture and foot placement. This articulation enables the robot to adapt its stance in response to uneven surfaces or when climbing. The placement of IMUs (inertial measurement units) in the torso and lower limbs is indicated, providing real-time feedback on body orientation and acceleration. These sensors support active balance corrections during walking, climbing, or reaching. The arms are shown capable of moving in coordination with the legs, allowing the robot to shift its mass and counterbalance when lifting objects or extending an arm, further contributing to dynamic stability. When climbing or ascending, the robot maintains at least three points of contact (e.g., both feet and one hand. The overall body structure is symmetrical about the vertical axis, which helps distribute weight evenly and facilitates balanced gait cycles. the bipedal robot is designed to maintain balance and stability during a wide range of warehouse tasks, including walking, climbing, and manipulating objects at various heights.

The navigation controller serves as the central intelligence of the warehouse robot, orchestrating its movement by integrating data from multiple sources to achieve precise and reliable three-dimensional navigation. At the core of its operation is a sophisticated sensor fusion process. The controller continuously gathers data from the robot's LiDAR sensors, cameras, and inertial measurement unit (IMU), as well as from the ultra-wideband (UWB) positioning module. LiDAR provides real-time 3D mapping and obstacle detection, while the cameras contribute visual odometry and object recognition, such as identifying shelf markers or inventory items. The IMU tracks the robot's acceleration and orientation, supporting dead-reckoning and balance. The UWB module communicates with fixed anchors throughout the warehouse, providing absolute position data through time-of-flight measurements. The navigation controller fuses these data streams—typically using a Kalman filter or similar probabilistic algorithm—to generate an accurate, real-time estimate of the robot's position and orientation (pose) within the warehouse, suppressing outliers and compensating for sensor limitations.

Once the robot's current pose is established, the navigation controller references a digital map of the warehouse stored onboard. This map details the structural layout, including aisles, shelving units, vertical travel paths such as lifts or ladders, and restricted or hazardous zones. When given a target location—such as a specific shelf at a particular elevation—the controller plans a three-dimensional route. It first calculates the optimal horizontal path across the warehouse floor, using algorithms like A* to avoid obstacles and minimize travel time. It then identifies the necessary vertical segments, such as the nearest lift or climbing point, and integrates these into a unified 3D trajectory. The controller is capable of dynamic replanning: if it encounters unexpected obstacles, such as a fallen pallet or a blocked aisle, it can rapidly recalculate the route using advanced pathfinding algorithms, ensuring continuous progress toward the goal.

For the actual movement, the navigation controller autonomously manages both the drive system and the vertical mobility mechanism. In wheeled robots, it modulates wheel speeds and directions to follow the planned path, while in bipedal robots, it computes stable gait patterns and coordinates limb movements for both walking and climbing. When vertical movement is required, such as ascending a lift or climbing shelving, the controller synchronizes the vertical and horizontal actuators, carefully monitoring balance and stability through real-time feedback from the IMU and other sensors. Safety is paramount: the controller will halt the robot if it detects a significant deviation between expected and actual position, or if the digital map indicates the robot is approaching a restricted area.

In practice, this integrated approach allows the robot to autonomously navigate to any location within the warehouse, whether on the floor or at different elevations, while dynamically adapting to changes in the environment and maintaining stability and safety throughout its operation.

In a modern warehouse employing a swarm of mobile robots, each robot is equipped with both a camera system and an ultra-wideband (UWB) positioning module. As these robots navigate the warehouse, they continuously collect and stream data: the UWB modules provide precise absolute positioning by communicating with fixed anchors, while the cameras capture visual information about the environment, such as the location of shelves, inventory, and any obstacles or changes in the warehouse layout.

This data is transmitted in real time to a central processing node, which may be a cloud-based service or an edge computing hub within the warehouse. Here, data from all robots is pooled and analyzed collectively. The system employs consensus algorithms to compare overlapping data from multiple robots that have observed the same areas. This redundancy allows the system to filter out anomalies and outliers—such as UWB multipath errors or temporary visual obstructions—by favoring the most consistent and reliable data. For example, if several robots report different positions for a shelf, the system will use statistical analysis to determine which reading is most likely correct, often giving greater weight to data from robots closest to the area in question or from those with a track record of high sensor accuracy.

The central node then uses this high-confidence data to update the warehouse's digital map. Structural changes, such as the movement of shelves or the addition of new barriers, are detected by comparing new camera data against the baseline map. Temporary obstacles, like fallen pallets or misplaced inventory, are identified by fusing LiDAR and UWB data, and these are flagged in the map as transient no-go zones. The map is continuously optimized using pose graph optimization algorithms, which merge local submaps generated by individual robots into a single, globally consistent digital map.

This dynamic mapping process ensures that the warehouse layout remains up to date, even as the environment changes. Permanent changes are incorporated into the base map, while temporary obstacles prompt real-time route recalculations for the affected robots without permanently altering the map. The system's design allows for rapid propagation of map updates across the entire robot fleet, typically within a second, ensuring that all robots have access to the latest environmental information.

By pooling data from a swarm of robots, the system achieves far greater coverage and resilience than a single robot could. If one robot experiences a sensor failure, data from neighboring robots can compensate, maintaining overall localization accuracy. Over time, the system learns to prioritize data from robots with the most reliable sensors, further improving map quality. This collaborative, real-time approach not only enhances navigation safety and efficiency but also dramatically reduces navigation errors and increases the system's adaptability to the dynamic conditions of a busy warehouse.

A robot swarm generates high-definition (HD) maps in a warehouse system through collaborative, decentralized perception and continuous data sharing. A high-definition (HD) map is a highly accurate, three-dimensional digital representation of an environment, offering centimeter-level precision and rich semantic information not found in traditional maps. HD maps are typically created using advanced sensors such as LiDAR, cameras, GPS, and IMUs, and contain multiple layers, including a geometric map (dense 3D point clouds), a semantic map (features like shelving, obstacles, and vertical paths), and real-time updates reflecting dynamic changes in the environment. These maps are designed as ground-truth models for machines, providing a virtual sensor that extends perception far beyond the range of onboard sensors and around occlusions. 3D high-definition digital maps dramatically enhance route planning for both vertical and horizontal tasks in warehouse robotics. Unlike 2D or standard-definition maps, 3D HD maps provide robots with a complete spatial understanding of the warehouse, including the height, width, and depth of shelving, aisles, and access points. This enables robots to localize themselves with centimeter-level accuracy by matching real-time sensor data (from LiDAR, cameras, IMUs, and UWB) against the HD map, even in complex or changing environments.

For horizontal navigation, robots use the HD map to plan optimal routes across the warehouse floor, dynamically avoiding obstacles, blocked aisles, or areas under construction. The semantic layers of the map help robots interpret the environment, recognize temporary changes, and reroute efficiently. For vertical tasks, the 3D geometric and semantic information in the HD map allows robots to plan and execute movements that include elevation changes—such as using lifts, climbing shelving, or accessing multi-level storage— by identifying the precise locations and characteristics of vertical travel paths.

Furthermore, because HD maps are regularly updated with real-time sensor data, they enable robots to adapt instantly to changes in warehouse configuration, such as relocated shelving or new obstacles. This continuous update process ensures that all robots operating in the facility share a consistent, up-to-date understanding of the environment, which is essential for collision-free, coordinated operation and for maximizing efficiency and safety. Each robot in the swarm is equipped with a sensor suite—typically including cameras, IMUs, and sometimes LiDAR or UWB modules— which it uses to scan its immediate environment as it navigates. As robots move independently or in coordinated groups, they collect detailed spatial and semantic data about warehouse features such as shelving, aisles, obstacles, and dynamic elements like humans or other robots. This sensor data is not siloed; instead, it is transmitted in real time to a central server or shared directly among the robots, depending on the system architecture. In collaborative perception mode, robots and any overhead sensors (such as aisle-mounted LiDAR or drones) contribute their observations to a shared costmap or 3D point cloud representation of the warehouse. Advanced algorithms merge these multiple perspectives, filtering out inconsistencies and leveraging redundancy to correct for individual sensor errors or occlusions. For example, if one robot's view of an obstacle is blocked, another's vantage point can fill in the gap, resulting in a much more complete and accurate map than any single robot could produce.

The HD map is continuously updated as the swarm operates. When a robot or overhead sensor detects a new obstacle, a layout change, or a temporary blockage, this information is rapidly incorporated into the shared map. Sophisticated path-planning algorithms, such as ARA* or costmap-based planners, use this live data to optimize navigation routes for all robots, ensuring efficient and collision-free movement even as the environment changes. The swarm's ability to generate and maintain an HD map is further enhanced by distributed exploration strategies— robots may use information-theoretic approaches or randomized search patterns to ensure comprehensive coverage and rapid mapping of unknown or altered areas. This collaborative mapping process allows the system to maintain a high-fidelity, up-to-the-moment digital representation of the warehouse, supporting advanced navigation, dynamic task allocation, and robust adaptation to changing conditions. The result is a resilient and efficient warehouse automation environment where robots can localize themselves precisely, avoid obstacles, and coordinate complex tasks with minimal downtime

The invention claimed is:

1. A mobile robot for warehouse automation, comprising:

a drive system configured for autonomous movement along warehouse floors;

a vertical mobility mechanism configured to enable the robot to travel vertically along shelving structures or rails within a warehouse;

a sensor suite comprising at least at least one camera, and at least one inertial measurement unit (IMU), the sensor suite configured to detect environmental features and obstacles for navigation;

an ultra-wideband (UWB) positioning module configured to determine the position of the robot within the warehouse by communicating with a plurality of fixed UWB anchors;

a digital map storage module containing a digital representation of the warehouse layout including shelving locations and vertical travel paths;

a navigation controller operatively coupled to the sensor suite, the UWB positioning module, and the digital map storage module, the navigation controller configured to:

fuse data from the sensor suite and the UWB positioning module to determine a real-time position and orientation of the robot within the warehouse;

reference the digital map to plan and execute three-dimensional navigation routes, including both horizontal and vertical movements, to target locations in the warehouse;

autonomously control the drive system and the vertical mobility mechanism to transport the robot to selected positions on the floor or at different elevations along shelving structure; and an energy management system, comprising:

a battery module;

a plurality of onboard sensors configured to monitor energy consumption by subsystems including drive motors, sensors, and payload handlers;

an energy optimization controller configured to dynamically adjust robot operating parameters in real time based on current battery level, predicted task energy requirements, and charging station availability.

2. A robot of claim 1, including fuel cell or battery range extenders.

3. A mobile robot for warehouse automation, comprising:

a drive system configured for autonomous movement along warehouse floors;

a vertical mobility mechanism configured to enable the robot to travel vertically along shelving structures or rails within a warehouse;

a sensor suite comprising at least at least one camera, and at least one inertial measurement unit (IMU), the sensor suite configured to detect environmental features and obstacles for navigation;

a digital map storage module containing a digital representation of the warehouse layout including shelving locations and vertical travel paths;

a navigation controller operatively coupled to the sensor suite and the digital map storage module, the navigation controller configured to determine a real-time position and orientation of the robot within the warehouse, reference the digital map to plan and execute three-dimensional navigation routes, including both horizontal and vertical movements, to target locations in the warehouse;

autonomously control the drive system and the vertical mobility mechanism to transport the robot to selected positions on the floor or at different elevations along shelving structure;

a warehouse mapping and navigation system including:

a plurality of mobile robots, each robot comprising a camera configured to capture visual data of the warehouse environment and an ultra-wideband (UWB) positioning module configured to determine a position of the robot within the warehouse by communicating with a plurality of fixed UWB anchors;

a central processing node operatively coupled to the plurality of mobile robots, the central processing node configured to:

receive, in real time, UWB position data and visual data from each of the plurality of mobile robots as the robots traverse the warehouse;

compare overlapping UWB position data and visual data from multiple robots to identify and filter out inconsistent or erroneous data using a statistical consensus algorithm;

update a digital map of the warehouse based on high-confidence data, wherein the digital map reflects recent changes in warehouse configuration or obstacles detected by the robots; and transmit the updated digital map to the plurality of mobile robots to enable autonomous navigation that accounts for recent changes in the warehouse environment.

4. A robot of claim 3 for transporting mixed inventory items in a warehouse, comprising:

an adaptive payload handling system comprising a telescopic lift and a variable-width gripper;

a machine vision module configured to identify item dimensions and orientation on a shelf;

a control system configured to adjust the telescopic lift height and gripper width based on the identified item dimensions and orientation.

5. A robot of claim 3, comprising a dynamic task reallocation module for a fleet of autonomous mobile robots in a warehouse, wherein the module performs:

assigning, by a central task scheduler, initial transport, picking, or replenishing tasks to each robot based on current location and battery status;

monitoring, in real time, the progress of each robot and the occurrence of unexpected delays or obstacles;

automatically reassigning incomplete tasks to other available robots in response to detected delays, robot faults, or changes in warehouse conditions.

6. A robot of claim 3 with a safety system for an autonomous mobile robot operating in a warehouse, comprising:

a multi-modal proximity detection suite including a 360-degree LiDAR sensor and at least one thermal imaging sensor;

a safety controller configured to detect human presence within a predefined safety zone;

an intervention module configured to execute at least one of speed reduction, audible warning, or emergency stop in response to detected human proximity.

7. A robot of claim 3 with an edge AI module for an autonomous mobile robot operating in a warehouse, comprising:

an onboard processor configured to execute a neural network model for real-time task prioritization and navigation decisions;

a sensor interface for receiving data from LiDAR, vision, and inertial sensors;

a decision engine configured to select optimal actions based on current sensor data and task queue without requiring continuous communication with a central server.

8. A robot of claim 3, comprising a positioning system with:

an ultra-wideband (UWB) tag mounted on a mobile robot;

a plurality of UWB anchors deployed in a warehouse environment;

an onboard camera capturing real-time image data;

a digital map storing structural features of the warehouse;

a fusion processor configured to:

(a) calculate UWB-based coordinates using time-difference-of-arrival (TDoA) measurements between the tag and anchors;

(b) extract visual landmarks from the image data;

(c) align the visual landmarks with corresponding features in the digital map;

(d) generate corrected robot coordinates by fusing UWB-based coordinates with landmark alignment data.

9. The robot of claim 8, wherein the fusion processor applies a genetic annealing algorithm to minimize non-line-of-sight (NLOS) errors in UWB data using landmark-matched visual feedback.

10. The robot of claim 8, wherein the robot self-calibrates its position using fixed visual landmarks identified in the digital map.

11. A robot of claim 3 with cross-platform interoperability in a warehouse robot fleet, comprising:
   a middleware translation layer configured to convert proprietary robot control protocols into a standardized communication format;
   a central orchestration engine that dynamically assigns tasks to heterogeneous robots based on real-time capability, location, and workload data;
   an API gateway providing bidirectional data exchange between warehouse management systems (WMS) and robots from different vendors.

12. A robot of claim 3 with a modular payload system, comprising:
   a magnetic coupling interface with auto-alignment;
   swappable toolheads (grippers, vacuums, forks) with RFID-encoded capability profiles;
   a vision-based toolhead verification system ensuring secure attachment.

13. A robot of claim 3 with an energy management system for warehouse robots, comprising:
   wireless charging pads at strategic workflow pause points;
   a digital twin simulating energy consumption patterns;
   an auction-based charging scheduler minimizing total fleet downtime.

14. A robot of claim 13, wherein robots bid charging slots based on task urgency.

15. A robot of claim 3, comprising a digital twin that predicts robot path, task management, or energy bottlenecks.

16. A robot of claim 3 with a safety system for human-robot warehouse cohabitation, comprising:
   ultra-wideband (UWB) personnel tags with haptic feedback;
   robot-mounted thermal or ToF sensors detecting humans in blind spots;
   a behavior-based safety governor overriding robot actions near humans.

17. A robot of claim 3, including emergency stop gesture recognition.

18. A robot of claim 3, comprising:
   a chassis; and
   a sensor fusion module configured to generate a unified environmental map by dynamically weighting sensor inputs based on detected warehouse conditions.

19. A mobile robot for warehouse automation, comprising:
   a drive system configured for autonomous movement along warehouse floors;
   a vertical mobility mechanism configured to enable the robot to travel vertically along shelving structures or rails within a warehouse;
   a sensor suite comprising at least at least one camera, and at least one inertial measurement unit (IMU), the sensor suite configured to detect environmental features and obstacles for navigation;
   an ultra-wideband (UWB) positioning module configured to determine the position of the robot within the warehouse by communicating with a plurality of fixed UWB anchors;

a digital map storage module containing a digital representation of the warehouse layout including shelving locations and vertical travel paths;
   a navigation controller operatively coupled to the sensor suite, the UWB positioning module, and the digital map storage module, the navigation controller configured to;
      fuse data from the sensor suite and the UWB positioning module to determine a real-time position and orientation of the robot within the warehouse,
      reference the digital map to plan and execute three-dimensional navigation routes, including both horizontal and vertical movements, to target locations in the warehouse;
   autonomously control the drive system and the vertical mobility mechanism to transport the robot to selected positions on the floor or at different elevations along shelving structure;
   a multi-sensor fusion module combining LiDAR, event cameras, and mmWave radar;
   a transient obstacle classifier using spatial-temporal graph neural networks; and
   a reactive path planner generating collision-free trajectories within 200 ms of obstacle detection.

20. A system for warehouse automation, comprising:
   a drive system configured for autonomous movement along warehouse floors;
   a vertical mobility mechanism configured to enable a robot to travel vertically along shelving structures or rails within a warehouse;
   a sensor suite comprising at least at least one camera, and at least one inertial measurement unit (IMU), the sensor suite configured to detect environmental features and obstacles for navigation;
   a digital map storage module containing a digital representation of the warehouse layout including shelving locations and vertical travel paths;
   a navigation controller operatively coupled to the sensor suite and the digital map storage module, the navigation controller configured to determine a real-time position and orientation of the robot within the warehouse, reference the digital map to plan and execute three-dimensional navigation routes, including both horizontal and vertical movements, to target locations in the warehouse;
   autonomously control the drive system and the vertical mobility mechanism to transport the robot to selected positions on the floor or at different elevations along shelving structure;
   a warehouse mapping and navigation system including:
      a plurality of mobile robots, each robot comprising a camera configured to capture visual data of the warehouse environment and an ultra-wideband (UWB) positioning module configured to determine a position of the robot within the warehouse by communicating with a plurality of fixed UWB anchors;
      a central processing node operatively coupled to the plurality of mobile robots, the central processing node configured to:
         receive, in real time, UWB position data and visual data from each of the plurality of mobile robots as the robots traverse the warehouse;
         compare overlapping UWB position data and visual data from multiple robots to identify and filter out inconsistent or erroneous data using a statistical consensus algorithm;

update a digital map of the warehouse based on high-confidence data, wherein the digital map reflects recent changes in warehouse configuration or obstacles detected by the robots; and transmit the updated digital map to the plurality of mobile robots to enable autonomous navigation that accounts for recent changes in the warehouse environment.

21. A method for warehouse automation with a drive system configured for autonomous movement along warehouse floors; a vertical mobility mechanism configured to enable a robot to travel vertically along shelving structures or rails within a warehouse; a sensor suite comprising at least at least one camera, and at least one inertial measurement unit (IMU), the sensor suite configured to detect environmental features and obstacles for navigation; a digital map storage module containing a digital representation of the warehouse layout including shelving locations and vertical travel paths; and a navigation controller operatively coupled to the sensor suite and the digital map storage module, the method comprising:

determining a real-time position and orientation of the robot within the warehouse, reference the digital map to plan and execute three-dimensional navigation routes, including both horizontal and vertical movements, to target locations in the warehouse;

autonomously controlling the drive system and the vertical mobility mechanism to transport the robot to selected positions on the floor or at different elevations along shelving structure;

performing warehouse mapping and navigation with a system including: a plurality of mobile robots, each robot comprising a camera configured to capture visual data of the warehouse environment and an ultra-wideband (UWB) positioning module configured to determine a position of the robot within the warehouse by communicating with a plurality of fixed UWB anchors, further including:

receiving, in real time, UWB position data and visual data from each of the plurality of mobile robots as the robots traverse the warehouse;

comparing overlapping UWB position data and visual data from multiple robots to identify and filter out inconsistent or erroneous data using a statistical consensus algorithm;

updating a digital map of the warehouse based on high-confidence data, wherein the digital map reflects recent changes in warehouse configuration or obstacles detected by the robots; and transmitting the updated digital map to the plurality of mobile robots to enable autonomous navigation that accounts for recent changes in the warehouse environment.

* * * * *